(12) United States Patent
Willinger

(10) Patent No.: US 10,572,829 B1
(45) Date of Patent: Feb. 25, 2020

(54) SYSTEMS AND PROCESSES FOR LABELING HYDRAULIC FRACTURE DATA USING ACOUSTIC EMITTERS FOR SUPERVISED LEARNING ALGORITHM MAPPING AND CLASSIFYING OF HYDRAULIC FRACTURES IN WELLS

(71) Applicant: Jonathan R Willinger, Moore, OK (US)

(72) Inventor: Jonathan R Willinger, Moore, OK (US)

( * ) Notice: Subject to any disclaimer, the term of this patent is extended or adjusted under 35 U.S.C. 154(b) by 0 days.

(21) Appl. No.: 15/913,251

(22) Filed: Mar. 6, 2018

Related U.S. Application Data

(60) Provisional application No. 62/467,806, filed on Mar. 6, 2017.

(51) Int. Cl.
| | |
|---|---|
| *G06N 20/00* | (2019.01) |
| *E21B 49/00* | (2006.01) |
| *G01V 1/28* | (2006.01) |
| *G01V 1/34* | (2006.01) |
| *E21B 43/267* | (2006.01) |
| *E21B 43/26* | (2006.01) |

(52) U.S. Cl.
CPC .............. *G06N 20/00* (2019.01); *E21B 49/00* (2013.01); *G01V 1/288* (2013.01); *G01V 1/34* (2013.01); *E21B 43/26* (2013.01); *E21B 43/267* (2013.01); *G01V 2210/1234* (2013.01); *G01V 2210/646* (2013.01); *G01V 2210/72* (2013.01)

(58) Field of Classification Search
None
See application file for complete search history.

(56) References Cited

U.S. PATENT DOCUMENTS

2018/0259668 A1* 9/2018 Gu .......................... E21B 43/26

* cited by examiner

*Primary Examiner* — Daniel Swerdlow

(57) ABSTRACT

The new art includes a system, process and means to label microseisms generated by hydraulic fracture operations and detected by acoustic sensors so a that machine learning process may be trained to perform mapping of propped hydraulic fracture dimensions in real-time or near-real time. This labeling process creates a labeled training set that enables any supervised machine learning process to be tested and trained whereby the process may perform real-time mapping of propped and unpropped fractures in subsequent treatment stage(s).

7 Claims, 92 Drawing Sheets

FIG. 3D

| $\lambda_P^{(1)}$ | $f_P^{(1)}$ | $\lambda_S^{(1)}$ | $f_S^{(1)}$ | $C_X^{(1)}$ | $C_Y^{(1)}$ | $C_Z^{(1)}$ | $M_{XX}^{(1)}$ | $M_{XY}^{(1)}$ | $M_{XZ}^{(1)}$ | $M_{YX}^{(1)}$ | $M_{YY}^{(1)}$ | $M_{YZ}^{(1)}$ | $M_{ZX}^{(1)}$ | $M_{ZY}^{(1)}$ | $M_{ZZ}^{(1)}$ | ... |
|---|---|---|---|---|---|---|---|---|---|---|---|---|---|---|---|---|
| $\lambda_P^{(2)}$ | $f_P^{(2)}$ | $\lambda_S^{(2)}$ | $f_S^{(2)}$ | $C_X^{(2)}$ | $C_Y^{(2)}$ | $C_Z^{(2)}$ | $M_{XX}^{(2)}$ | $M_{XY}^{(2)}$ | $M_{XZ}^{(2)}$ | $M_{YX}^{(2)}$ | $M_{YY}^{(2)}$ | $M_{YZ}^{(2)}$ | $M_{ZX}^{(2)}$ | $M_{ZY}^{(2)}$ | $M_{ZZ}^{(2)}$ | ... |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋱ |
| $\lambda_P^{(m)}$ | $f_P^{(m)}$ | $\lambda_S^{(m)}$ | $f_S^{(m)}$ | $C_X^{(m)}$ | $C_Y^{(m)}$ | $C_Z^{(m)}$ | $M_{XX}^{(m)}$ | $M_{XY}^{(m)}$ | $M_{XZ}^{(m)}$ | $M_{YX}^{(m)}$ | $M_{YY}^{(m)}$ | $M_{YZ}^{(m)}$ | $M_{ZX}^{(m)}$ | $M_{ZY}^{(m)}$ | $M_{ZZ}^{(m)}$ | ... |
| $W_P^{(1)}$ | $T_W^{(1)}$ | $P_{Mesh}^{(1)}$ | $P_{Dens}^{(1)}$ | $\mu_F^{(1)}$ | $P_{Treat}^{(1)}$ | $\sigma_{clos}^{(1)}$ | $\lambda_{AME}^{(1)}$ | $f_{AME}^{(1)}$ | $C_{XAME}^{(1)}$ | $C_{YAME}^{(1)}$ | $C_{ZAME}^{(1)}$ | $\theta_N^{(1)}$ | | | | ... |
| $W_P^{(2)}$ | $T_W^{(2)}$ | $P_{Mesh}^{(2)}$ | $P_{Dens}^{(2)}$ | $\mu_F^{(2)}$ | $P_{Treat}^{(2)}$ | $\sigma_{clos}^{(2)}$ | $\lambda_{AME}^{(2)}$ | $f_{AME}^{(2)}$ | $C_{XAME}^{(2)}$ | $C_{YAME}^{(2)}$ | $C_{ZAME}^{(2)}$ | $\theta_N^{(2)}$ | | | | ... |
| ⋮ | ⋮ | ⋮ | ⋮ | ⋮ | ⋮ | ⋮ | ⋮ | ⋮ | ⋮ | ⋮ | ⋮ | ⋮ | | | | ⋱ |
| $W_P^{(m)}$ | $T_W^{(m)}$ | $P_{Mesh}^{(m)}$ | $P_{Dens}^{(m)}$ | $\mu_F^{(m)}$ | $P_{Treat}^{(m)}$ | $\sigma_{clos}^{(m)}$ | $\lambda_{AME}^{(m)}$ | $f_{AME}^{(m)}$ | $C_{XAME}^{(m)}$ | $C_{YAME}^{(m)}$ | $C_{ZAME}^{(m)}$ | $\theta_N^{(m)}$ | | | | ... |

(3e)

Pad, Proppant & Closure Window

Data Write Process:

Via first operations performed by the plurality of processors, write the training set to a second plurality of persistent, electronic storage media, (i.e., 4008, 4108 and 4208).

Write speed approximately 82.8 GBps. Input stream volume for 7 secs = (7 s)(0.55 Gbps) = 3.85 GB
Write latency: 3.85 GB/ 82.8 GBps = 0.047 seconds.

(3g)

(3i)

Inter-stage Time

Input Feature Label In Whole Process, Step 2:

Via second operations performed by the plurality of processors, scan the training set which is stored in the second plurality of persistent, electronic storage media, to a third memory.

Via second operations performed by the plurality of processors, label the training set which is stored in the third memory using the labels stored in the second memory. This is performed sequentially.

- Embodiment 1: second plurality of persistent, electronic storage media:
  o Size: 69 SSDs, 185.4 TB
  o Scan speed approximately 82.8 GBps

- Embodiment 1: third memory:
  o Size: (3)(384 GB) = 1,152 GB

- Embodiment 1: Latency:
  o Approximate Data Volume Size: 10,240 GB
  o Approximate Data Volume Size per server: 3,413 GB
  o Number of scans: 3,413 GB / 384 GB = 8.9
  o Scan 1 latency: 384 GB/ 27.6 GBps = 13.9 seconds.
  o Estimated CPU time on Scan 1: (4) (384 GB/ (2*76.8 GBps)) = 10 seconds.
  o Estimated Write 1 latency: (1.25) (384 GB/ 27.6 GBps) = 17.4 seconds.
  o Estimated Total Scan 1 cycle: 13.9 + 10 + 17.4 = 41.3 seconds.
  o Full Scans Latency: (8.9)(41.3 seconds) = 368 seconds.

Inter-stage Time

Training the Machine Learning Algorithm from the labeled training set:

This embodiment's labeled training set may be deployed with various machine learning processes.

- Hypotheses may be developed from the following models using:
  o Logistic regression
  o Naive Bayes
  o Neural Networks
  o Support Vector Machine, and so forth

- Minimization methodologies may be deployed to minimize the objective function:
  o Batch gradient Descent
  o Stochastic Gradient Descent
  o Newton's Method, and so forth.

- The machine learning algorithm can be tested as follows:
  o Step 1: Separate labeled training set data into three categories, approximately: 60% training set, 20% cross-validation (CV) set, 20% Test set.
  o Step 2: Create Hypothesis(es)
  o Step 3: Fit parameters on the training set, minimizing cost function, maximizing likelihood function, or other methodology.
  o Step 4: Minimize on the CV set.
  o Step 5: Select the hypothesis that best fits the CV set.
  o Step 6: Test on the test set to estimate the generalization error
  o Step 7: Reiterate Steps 2-6 until predetermined, acceptable generalization error estimate reached, (e.g., 5%)
  o Step 8: Prepare to deploy to map the next stage through big data processing engine.

- Results are displayed on a display, (i.e., 2004).

Inter-stage Time
Training the Machine Learning Algorithm from the labeled training set:

This embodiment's labeled training set may be deployed with various machine learning processes.

- Hypotheses may be developed from the following models using:
  o Logistic regression
  o Naive Bayes
  o Neural Networks
  o Support Vector Machine, and so forth

- Minimization methodologies may be deployed to minimize the objective function:
  o Batch gradient Descent
  o Stochastic Gradient Descent
  o Newton's Method, and so forth.

- The machine learning algorithm can be tested as follows:
  o Step 1. Separate labeled training set data into three categories, approximately: 60% training set, 20% cross-validation (CV) set, 20% Test set.
  o Step 2: Create Hypothesis(es)
  o Step 3: Fit parameters on the training set, minimizing cost function, maximizing likelihood function, or other methodology.
  o Step 4: Minimize on the CV set.
  o Step 5: Select the hypothesis that best fits the CV set.
  o Step 6: Test on the test set to estimate the generalization error
  o Step 7: Reiterate Steps 2-6 until predetermined, acceptable generalization error estimate reached, (e.g., 5%)
  o Step 8: Prepare to deploy to map the next stage through big data processing engine.

- Results are displayed on a display, (i.e., 2004).

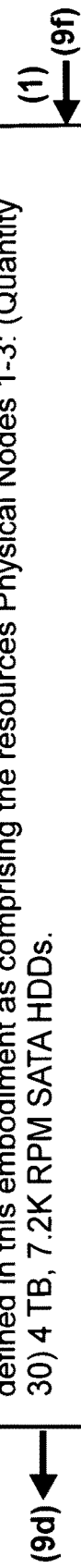

$$\begin{matrix}
\lambda_P^{(1)} & f_P^{(1)} & \lambda_S^{(1)} & f_S^{(1)} & C_X^{(1)} & C_Y^{(1)} & C_Z^{(1)} & M_{XX}^{(1)} & M_{XY}^{(1)} & M_{XZ}^{(1)} & M_{YX}^{(1)} & M_{YY}^{(1)} & M_{YZ}^{(1)} & M_{ZX}^{(1)} & M_{ZY}^{(1)} & M_{ZZ}^{(1)} \\
\lambda_P^{(2)} & f_P^{(2)} & \lambda_S^{(2)} & f_S^{(2)} & C_X^{(2)} & C_Y^{(2)} & C_Z^{(2)} & M_{XX}^{(2)} & M_{XY}^{(2)} & M_{XZ}^{(2)} & M_{YX}^{(2)} & M_{YY}^{(2)} & M_{YZ}^{(2)} & M_{ZX}^{(2)} & M_{ZY}^{(2)} & M_{ZZ}^{(2)} \\
\cdots \\
\lambda_P^{(m)} & f_P^{(m)} & \lambda_S^{(m)} & f_S^{(m)} & C_X^{(m)} & C_Y^{(m)} & C_Z^{(m)} & M_{XX}^{(m)} & M_{XY}^{(m)} & M_{XZ}^{(m)} & M_{YX}^{(m)} & M_{YY}^{(m)} & M_{YZ}^{(m)} & M_{ZX}^{(m)} & M_{ZY}^{(m)} & M_{ZZ}^{(m)} \\
\hline
W_P^{(1)} & T_W^{(1)} & P_{Mesh}^{(1)} & P_{Dens}^{(1)} & \mu_F^{(1)} & P_{Treat}^{(1)} & \sigma_{clos}^{(1)} & \lambda_{AME}^{(1)} & f_{AME}^{(1)} & C_{X_{AME}}^{(1)} & C_{Y_{AME}}^{(1)} & C_{Z_{AME}}^{(1)} & \theta_N^{(1)} \\
W_P^{(2)} & T_W^{(2)} & P_{Mesh}^{(2)} & P_{Dens}^{(2)} & \mu_F^{(2)} & P_{Treat}^{(2)} & \sigma_{clos}^{(2)} & \lambda_{AME}^{(2)} & f_{AME}^{(2)} & C_{X_{AME}}^{(2)} & C_{Y_{AME}}^{(2)} & C_{Z_{AME}}^{(2)} & \theta_N^{(2)} \\
\cdots \\
W_P^{(m)} & T_W^{(m)} & P_{Mesh}^{(m)} & P_{Dens}^{(m)} & \mu_F^{(m)} & P_{Treat}^{(m)} & \sigma_{clos}^{(m)} & \lambda_{AME}^{(m)} & f_{AME}^{(m)} & C_{X_{AME}}^{(m)} & C_{Y_{AME}}^{(m)} & C_{Z_{AME}}^{(m)} & \theta_N^{(m)}
\end{matrix}$$

(9e)

Pad, Proppant & Closure Window

Data Write Process:

Via first operations performed by the plurality of processors, write the training set to the second plurality of persistent, electronic storage media, (i.e., 10008, 10108 and 10208). defined in this embodiment as comprising the resources Physical Nodes 1-3: (Quantity 30) 4 TB, 7.2K RPM SATA HDDs.

- Write speed approximately 1,800 Mbps.
- Input stream volume for 7 secs = (7 s) (550/1024 Gbps) = 3.76 GB.
- Write latency, approximately: 3,850 MB/ 1,800 MBps = 2.14 seconds.

Inter-stage Time
Input Feature Label In Whole Process, Step 2:

Via second operations performed by the plurality of processors, scan the training set which is stored in the second plurality of persistent, electronic storage media, to a third memory, (i.e., 11012). This is performed sequentially.

Via second operations performed by the plurality of processors, label the training set which is stored in the third memory using the labels stored in the second memory. This is performed sequentially.

- Embodiment 3: second plurality of persistent, electronic storage media:
  o Size: 30 HDDs, 112 TB
  o Scan speed approximately 1.76 GBps
  o Scan input features to memory

- Embodiment 3: third memory:
  o Size: (3)(72 GB) + (2)(36 GB) = 288 GB
  o Memory Bandwidth per Physical Node per CPU: 51.2 GBps

- Embodiment 3: Latency:
  o Approximate Data Volume Size: 10,240 GB
  o Number of scans of second plurality of persistent, electronic storage media: 10,240 GB / 288 GB = 35.6
  > Perform CPU operations labeling the training set, approximately: 4*(56 GB/ (2*51.2 GBps)) = 1.2 seconds.
  > Perform Memory sub-transfer of data, (i.e., 11020), in second memory on Node 5 to Node 4 and Node 4 to Node 5: 56 GB/ 5 GBps = 11.2 seconds.
  > Perform CPU operations labeling the training set, approximately: 4*(56 GB/ (2*51.2 GBps)) = 1.2 seconds.
  > Total: (224 + 1.2 + 11.2 + 1.2) seconds = <u>237.6 seconds</u>.

Inter-stage Time
Input Feature Label In Whole Process, Step 2 (continued):

o Perform Memory Transfer, (i.e., 11018), on the Nodes and continue labeling until all the input features in the third memory have been labeled by all the labels in the second memory (3 iterations):
- Memory Transfer: (112 GB/ 5 GBps) = 22.4 seconds
- Perform CPU operations labeling the training set, approximately: 4*(56 GB/ (2*51.2 GBps)) = 1.2 seconds.
- Perform Memory Transfer of data in second memory on Node 5 to Node 4 and Node 4 to Node 5: 56 GB/ 5 GBps = 11.2 seconds.
- Perform CPU operations labeling the training set, approximately: 4*(56 GB/ (2*51.2 GBps)) = 1.2 seconds.
- Total: 3*(22.4 + 1.2 + 11.2 + 1.2) seconds = <u>108 seconds</u>.

o Scan new labels from the third plurality of persistent, electronic storage media:
- Remaining label volume: (1024-448) GB/ 448 GB = 1.3
- All of the labels (448 GB + 576 GB) are scanned into the memory to label a 288 GB volume: ((237.6 + 108) secs + remaining volume.
- Remaining volume, 1): [(72*3+36*2)/(30*60/1024) + 1.2 + 11.2 + 1.2] = 177.4 seconds.
- Remaining volume, 2): = 3*(22.4 + 1.2 + 11.2 + 1.2) seconds = 108 seconds
- Time for the remaining volume: 1.3*(177.4 + 108) secs = <u>371.2 seconds</u>.

o Write the modified, labeled input features stored in the third memory to second plurality of processors, overwriting the unmodified input features:
- (1.25)*(288 GB / (28 * 60 MBps / 1024)) = <u>219.4 seconds</u>.

o The total labeled volume is now: 288 GB at 237.6 s + 108 s + 371.2 s + 219.4 s = 936 seconds.

o Fully labeling the stage's training set:
- (10,240 GB - 288 GB) / 288 GB = 34.6 more times.
- Total Labeling Time: 35.6 * (936 seconds) = 33,321 seconds = 9 hrs and 15 minutes.

Inter-stage Time

Training the Machine Learning Algorithm from the labeled training set:

- Embodiment 3: Total Labeling Time: = 9 hrs and 15 minutes.
- Clear Memory Cache per Physical Node: (288 GB + 488 GB) / (2 * 51.2 GBps) = 7.19 seconds.
- Begin Training (9k)

(9l)

(9k)

Inter-stage Time
Training the Machine Learning Algorithm from the labeled training set:

This embodiment's labeled training set may be deployed with various machine learning processes.

- Hypotheses may be developed from the following models using:
  o Logistic regression
  o Naive Bayes
  o Neural Networks
  o Support Vector Machine, and so forth

- Minimization methodologies may be deployed to minimize the objective function:
  o Batch gradient Descent
  o Stochastic Gradient Descent
  o Newton's Method, and so forth.

- The machine learning algorithm can be tested as follows:
  o Step 1 Separate labeled training set data into three categories, approximately: 60% training set, 20% cross-validation (CV) set, 20% Test set.
  o Step 2: Create Hypothesis(es).
  o Step 3: Fit parameters on the training set, minimizing cost function, maximizing likelihood function, or other methodology.
  o Step 4: Minimize on the CV set.
  o Step 5: Select the hypothesis that best fits the CV set.
  o Step 6: Test on the test set to estimate the generalization error.
  o Step 7· Reiterate Steps 2-6 until predetermined, acceptable.
  o generalization error estimate reached, (e.g., 5%).
  o Step 8: Prepare to deploy to map the next stage through big data processing engine.

- Results are displayed on a display, (i.e., 2004).

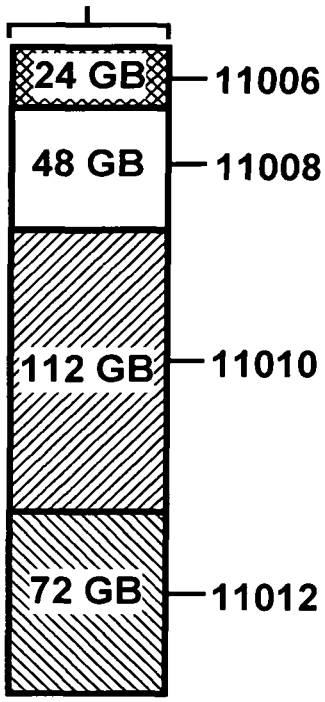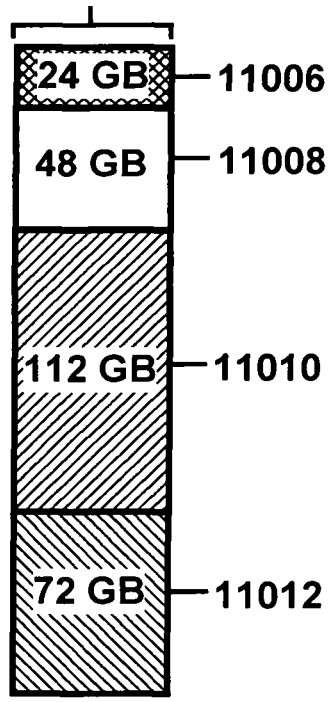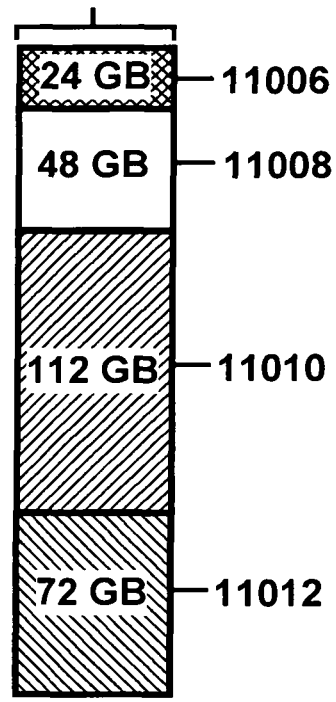
FIG. 11C  FIG. 11D  FIG. 11E
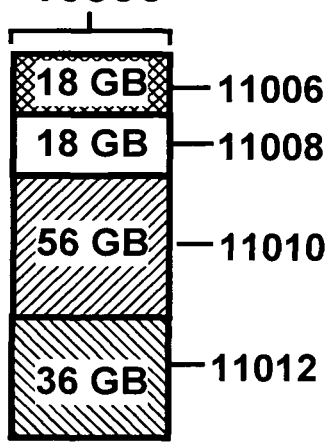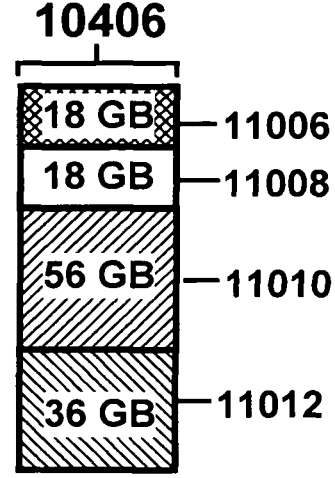
FIG. 11F  FIG. 11G

Inter-stage Time
Input Feature Label In Whole Process, Step 2 (continued):

- Embodiment 4: Latency:
  - Approximate Data Volume Size: 10,240 GB
  - Number of remaining scans of second plurality of persistent, electronic storage media: (10,240 - (5*368))/ (5*368) GB = 5.47
  - Labeling:
    - Perform CPU operations labeling the training set, approximately: 4*(368 GB/ (2*76.8 GBps)) = 9.58 seconds.
    - Perform memory transfer 14018 on the nodes: 208 GB/ (5 GBps) = 41.6 seconds.
    - Continue labeling until all the input features in the third memory have been labeled by all the labels in the second memory (4 iterations):
    - 4*(9.58 + 41.6) seconds = 204.7 seconds.
  - Write latency for 1,840 GB approximately:
    - Write: (1.25)(368 GB)/ (24*(85/1024)) = 231 seconds
    - Clear: 368 GB/ (2*76.8 GBps) = 2.40 seconds
    - Memory Transfer of input features: (368 GB)(2)/ 5 GBps = 147.2 seconds.
    - Write: (1.25)(736 GB/ 3 Nodes)/ (24 * 85/1024) = 154 seconds
    - Clear: 245.3 GB/ (2 * 76.8 GBps) = 1.6 seconds.
    - Total: (147.2 + 9.58 + 41.6 + 204.7 + 231 + 2.40 +147.2 + 154 + 1.6) = <u>939.3</u> seconds.
  - New Data Scan from disk:
    - Scan: 368 GB/ (24*(85/1024)) GBps = 184 seconds.
  - Repeat aforementioned operations: 5.47* (147.2 + 9.58 + 41.6 + 204.7 + 231 + 2.40 +147.2 + 154 + 1.6) = 5.47 * 939.3 seconds = <u>5,138 seconds</u>.
    - Total Labeling Time: (205 + 939 + 5,138) = 6,282 seconds = 1 hr and 45 minutes.

Inter-stage Time

Training the Machine Learning Algorithm from the labeled training set:

This embodiment's labeled training set may be deployed with various machine learning processes.

- Hypotheses may be developed from the following models using:
  o Logistic regression
  o Naive Bayes
  o Neural Networks
  o Support Vector Machine, and so forth

- Minimization methodologies may be deployed to minimize the objective function:
  o Batch gradient Descent
  o Stochastic Gradient Descent
  o Newton's Method, and so forth.

- The machine learning algorithm can be tested as follows:
  o Step 1: Separate labeled training set data into three categories, approximately: 60% training set, 20% cross-validation (CV) set, 20% Test set.
  o Step 2: Create Hypothesis(es).
  o Step 3: Fit parameters on the training set, minimizing cost function, maximizing likelihood function, or other methodology.
  o Step 4: Minimize on the CV set.
  o Step 5: Select the hypothesis that best fits the CV set.
  o Step 6: Test on the test set to estimate the generalization error.
  o Step 7: Reiterate Steps 2-6 until predetermined, acceptable.
  o generalization error estimate reached, (e.g., 5%).
  o Step 8: Prepare to deploy to map the next stage through big data processing engine.

- Results are displayed on a display, (i.e., 2004).

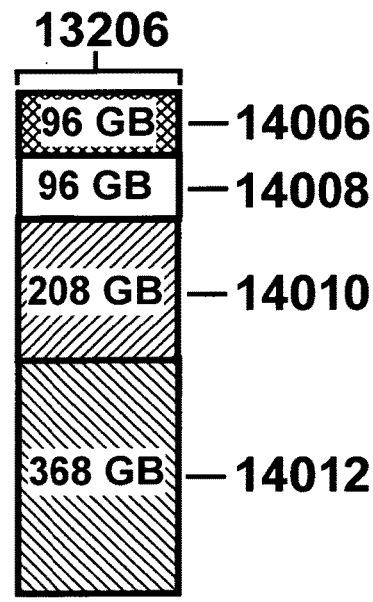
FIG. 14C    FIG. 14D    FIG. 14E
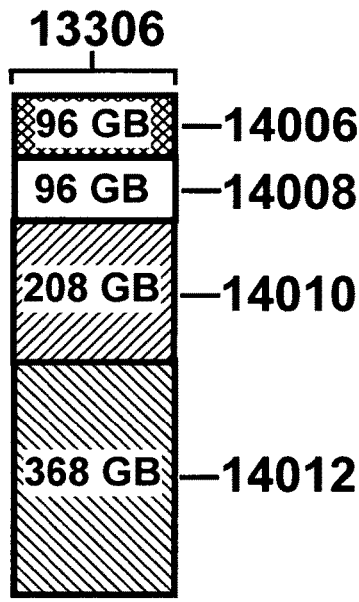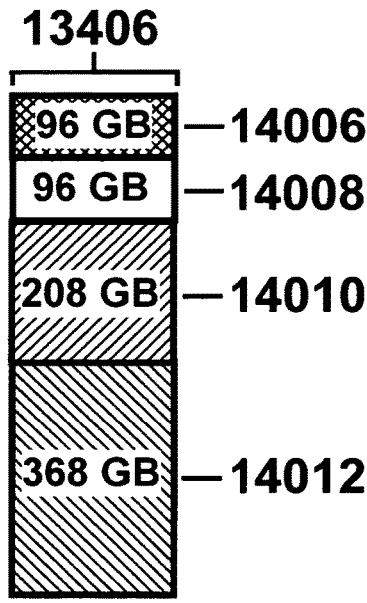
FIG. 14F    FIG. 14G

SYSTEMS AND PROCESSES FOR LABELING HYDRAULIC FRACTURE DATA USING ACOUSTIC EMITTERS FOR SUPERVISED LEARNING ALGORITHM MAPPING AND CLASSIFYING OF HYDRAULIC FRACTURES IN WELLS

CROSS-REFERENCE TO RELATED APPLICATION(S)

This present application claims priority from the provisional patent application and provisional patent application Ser. No. 62/467,806 filed 2017 Mar. 6 by Jonathan R. Willinger.

APPLICANT INFORMATION

Citizenship: U.S. Citizen
Residence: Moore, Okla.

TECHNICAL FIELD

The present invention relates to hydraulic fracturing in oil and gas wells, and more particularly to hydraulic fracturing diagnostics.

BACKGROUND ART

The following is a tabulation of some prior art that presently appears relevant:

| U.S. Patent Application Publications | | | |
| --- | --- | --- | --- |
| Publication Number | Kind Code | Publ. Date | Applicant |
| 2012/0257475 | A1 | 2012 Oct. 11 | Luscombe et al. |
| 2003/0217886 | A1 | 2003 Nov. 27 | Bjorn Paulsson |

Nonpatent Literature Documents

Barree, R. D., Fisher, M. K., & Woodroof, R. A. (2002 Jan. 1). A Practical Guide to Hydraulic Fracture Diagnostic Technologies. Society of Petroleum Engineers. doi:10.2118/77442-MS Bosman, K., Preiksaitis, M., Baig, A., & Urbancic, T. (2015 Dec. 17). From Microseismic to Induced Seismicity: Monitoring the Full Band of Reservoir Seismicity. Society of Exploration Geophysicists.

Ghanizadeh, A., Clarkson, C. R., Deglint, H., Vahedian, A., Aquino, S., & Wood, J. M. (2016 Aug. 1). Unpropped/Propped Fracture Permeability and Proppant Embedment Evaluation: A Rigorous Core-Analysis/Imaging Methodology. Unconventional Resources Technology Conference.

Khadhraoui, B., Leslie, D., Drew, J., & Jones, R. (2010 Jan. 1). Real-time Detection And Localization of Microseismic Events. Society of Exploration Geophysicists.

Liu, S., Valkó, P. P., McKetta, S., & Liu, X. (2016 Nov. 1). Microseismic Closure Window Characterizes Hydraulic-Fracture Geometry Better. Society of Petroleum Engineers. doi:10.2118/179116-PA Maxwell, S. C., & Cipolla, C. L. (2011 Jan. 1). What Does Microseismicity Tell Us About Hydraulic Fracturing? Society of Petroleum Engineers. doi:10.2118/146932-MS McKenna, J. P. (2013 Sep. 30). Magnitude-Based Calibrated Discrete Fracture Network Methodology. Society of Petroleum Engineers. doi:10.2118/166446-MS Michael, K., Orlando, T., & Thornton, M. (2015 Jul. 20). Use of Automatic Moment Tensor Inversion in Real Time Microseismic Imaging. Unconventional Resources Technology Conference. doi:10.15530/URTEC-2015-2149949

Ning, I. L. C., & Sava, P. (2016 Jan. 1). Multicomponent distributed acoustic sensing. Society of Exploration Geophysicists.

Pei, D., Verkhovtseva, N., Doucette, J., & Stark, P. (2016 Aug. 1). Impact of Seismic Attenuation on Downhole Microseismic Moment Tensor Inversion. Unconventional Resources Technology Conference.

Paulsson, B. N., Toko, J. L., Thornburg, J. A., Slopko, F., He, R., & Zhang, C. (2013). A High Performance Fiber Optic Seismic Sensor System. In Proc. of Thirty-Eighth Workshop on Geothermal Reservoir Engineering. Stanford, Calif.: Stanford University. Retrieved Jan. 28, 2017, from https://www.geothermal-energy.org/pdf/IGAstandard/SGW/2013/Paulsson.pdf Paulsson, Inc., & Fluidion SAS. (2016, August). Fiber Optic Seismic Vector Sensor tracking of Acoustic Micro Emitters (AME) to Optimize Unconventional Oil and Gas (UOG) Development (Rep.). Retrieved Jan. 28, 2017, from Research Partnership to Secure Energy for America website: rpsea.org Raymer, D., Rutledge, J., & Jaques, P. (2008 Jan. 1). Semiautomated Relative Picking of Microseismic Events. Society of Exploration Geophysicists.

Sharma, M. M., Brick, Y., Zhang, P., Shiriyev, J., Yilmaz, A. E., & Torres-Verdin, C. (2016 Aug. 24). Fracture Diagnostics Using Low Frequency EM Induction and Electrically Conductive Proppant (Rep.). Retrieved Feb. 11, 2017, from Department of Energy website: http://www.netl.doe.gov/File %20Library/Events/2016/fy16%20cs%20rd/Wed/Sharma.pdf Shemeta, J. E., Maxwell, S. C., Warpinski, N. R., Waltman, C. K., Phillips, Z. D., Riebel, T. G., . . . Green, T. W. (2009 Feb. 1). Stacking Seismograms to Improve Microseismic Images. Society of Petroleum Engineers. doi:10.2118/108103-PA Spain, D. R., Gil, I. R., Sebastian, H. M., Smith, P., Wampler, J., Cadwallader, S., & Graff, M. (2015 Jan. 26). Geo-Engineered Completion Optimization: An Integrated, Multi-Disciplinary Approach to Improve Stimulation Efficiency in Unconventional Shale Reservoirs. Society of Petroleum Engineers. doi:10.2118/172921-MS Tan, Y., Yu, J., Feng, G., & He, C. (2014 Oct. 29). A Combined Method for Automatic Microseismic Event Detection and Arrival Picking. Society of Exploration Geophysicists.

Van der Baan, M., Eaton, D., & Dusseault, M. (2013 May 20). Microseismic Monitoring Developments in Hydraulic Fracture Stimulation. International Society for Rock Mechanics.

Warpinski, N. R., & Wolhart, S. (2016 Feb. 1). A Validation Assessment of Microseismic Monitoring. Society of Petroleum Engineers. doi:10.2118/179150-MS Webster, P., Wall, J., Perkins, C., & Molenaar, M. (2013 Jan. 1). Micro-Seismic Detection Using Distributed Acoustic Sensing. Society of Exploration Geophysicists.

Wu, W., Kakkar, P., Zhou, J., Russell, R., & Sharma, M. M. (2017 Jan. 16). An Experimental Investigation of the Conductivity of Unpropped Fractures in Shales. Society of Petroleum Engineers. doi:10.2118/184858-MS It is known in the prior art to measure microseisms during hydraulic fracturing of oil and gas wells in order to estimate the induced hydraulic fracture geometry in the subsurface. Various sensing arrays are available to measure microseismic phenomena in wells. Common applications of microseismic sensing often include hydraulic fracturing of petroleum and/or geothermal wells, $CO_2$-injection wells, and water disposal wells. Specifically, microseisms induced by hydraulic fracturing typically have subzero moment magnitudes and are commonly monitored by 1) surface sensing arrays that include 4.5 Hz natural frequency, 3-component geophone arrays, forced band accelerometers, and/or 2) downhole sensing arrays that may include 10-15 Hz natural frequency geophone arrays, 3-component-capable fiber optic distributed acoustic sensing cables, 3-component fiber optic vector sensors and so forth (Baam, Eaton & Dusseault, 2013; Bosman, Preiksaitis, Baig & Urbancic, 2015; Ning & Sava, 2016; Paulsson et al., 2013).

Analysis of microseisms measured from these sensing arrays has evolved and been corroborated with other hydraulic fracture diagnostics to determine the hydraulic fracture dimensions created by hydraulic fracture treatment, with the propped fracture length being understood as the primary control on production in multi-fractured, horizontal, unconventional wells (Warpinski & Wolhart, 2016). Discrete Fracture Networks (DFNs) may be modeled from the measured microseismicity and corroborated with additional hydraulic fracture diagnostics as a constraint for fracture propagation models employed to characterize the total and propped fracture regions; however, these DFN models include fracture geometry assumptions that must be augmented to corroborate the injected slurry volumes to the hydraulic fracture deformation since it is primarily considered to be aseismic and tensile-opening. (McKenna, 2013; Barree, Fisher, & Woodroof, 2002; Maxwell, S. C., & Cipolla, C. L. 2011). Therefore, the state of the art process for determining the propped fracture dimensions in a fractured well contains indelible uncertainty and easily may have a propped fracture half-length error greater than one hundred feet due to a lack of direct measurement and questionable modelling assumptions. Many efforts have been made to create a reliable workflow to accurately estimate the propped fracture dimensions from current diagnostics, and although current diagnostics either yield great uncertainty or cannot measure a dimension of the propped fracture network, improvements in analysis methodologies with direct and indirect diagnostics have continued developing. For example, industry has shown that microseisms measured during the closure-window of a pump stage show less overlap between adjacent pump stages and estimated corresponding fracture geometry may provide a post-treatment history match that is better than total fracture length; of course, a more meaningful comparison would be between the measurement of microseisms in the closure-window and the proppant-window. (Liu, Valkó, McKetta & Liu, 2016). These incremental improvements are useful; however, they cannot substitute for the ability to yield a distinct signal that can delineate the propped fracture dimensions from the total fracture dimensions.

Improving the quality and deployment of the sensing arrays is certainly beneficial in characterization of the total and propped hydraulic fracture geometries from the microseismic event mapping. More accurate determinations of the moment tensors may be made and more high frequency, low moment magnitude shear events may be surveyed if 1) the sensing array proximity to events is closer and thus reducing seismic attenuation, 2) the ambient noise floor is lowered, 3) there is greater sensing aperture with an increased number of sensors allowing stacking of the measured microseismic events 4) better sensing signal-to-noise ratio of the equipment itself and so forth (Pei, 2016; Shemeta et al., 2013). Moreover, many algorithms have been developed to enable geophysicists to filter noise and pick microseismic events in real-time during hydraulic fracturing operations (Raymer, Rutledge & Jaques, 2008; Khadhraoui, Leslie, Drew & Jones, 2010; Tan, Yu, Feng & He, 2014; Michael, Orlando, & Thornton, 2015). However, these hardware and processing improvements in the signal fidelity and speed at which the microseisms can be identified are still limited and cannot map the propped fracture region—the primary control on production in multi-fractured, horizontal wells in unconventional resource plays (Warpinski & Wolhart, 2016). That is, without proppant in the induced hydraulic fractures, the conductivity of the fracture and thereby the productivity of the well will be diminished (Ghanizadeh et al., 2016). Therefore, due to the assumptions of the DFN and fracture-propagation modelling workflows and post-treatment history matching methods, there lies large uncertainty in the propped fracture dimensions and complexity for each stage despite these hardware and processing improvements. This has created an impetus to develop proppant-form-factor diagnostics that enable distinct signals to be measured from a sensing array, thereby delineating the propped fracture dimensions from the unpropped fracture dimensions (Paulsson, Inc., & Fluidion SAS, 2016; Sharma et al., 2016). These proppant-form-factor diagnostics are currently being developed and pose great value; however, there currently remains no real-time analysis protocol to map the propped fracture dimensions with certainty and delineate them from the total fracture network as the propped fractures propagate in the subsurface—a process that often exceeds two hours—for industry-standard proppants. While industry has conventionally relied on models to estimate the propped fracture dimensions, some have begun to develop proppant-form-factor diagnostics to yield distinct signals to delineate the propped fracture network upon conclusion of a treatment stage. However, perhaps due to the high noise floor that occurs during treatment and the physical limit of the magnitude of the signal a proppant-form-factor diagnostic can yield, industry has not perceived how to improve on the prior and current art successfully. For example, deployment of acoustic micro-emitters (AMEs) require that the operator wait perhaps an hour until the pre-determined time delay for the AMEs to actuate and the AMEs give a distinct signal after each stage.

Therefore, prior art process inventions used to estimate the propped fracture dimensions require augmenting the microseismic event dimensions through arguably arbitrary fracture geometry assumptions that correspond to the induced, propped fracture—yielding a map of what is known as the Discrete Fracture Network (DFN). These DFNs are used to calibrate a fracture propagation and proppant transport model with its own set of assumptions in order to model the fracture treatment and proppant transport. However, these modelling techniques are clearly not sufficient to reliably reduce the propped fracture half-length estimate error to less than 100 feet because there was not a direct diagnostic technology to provide a unique measurement of the propped fracture length. These facts are evident and are exhibited by occurrences such as operating companies drilling an intersecting well through another well's hydraulic fracture network in a limited but sure effort to determine if said intersecting well intersects with the frac'ed wells propped hydraulic fracture dimensions. Again, the dearth of direct diagnostics has prompted development of new seismic sensing technologies with increased downhole measurement apertures, signal-to-noise ratios 100 times greater than conventional 15 Hz geophones and an ultra-wide bandwidth that can measure frequencies from 0.03 Hz to 6000 Hz—capturing a robust soundfield of microseismic activity even at minute amplitude events with moment magnitudes of −4.0. (Paulsson, Inc. & Fluid SAS, 2016). This has correspondingly led to the development of proppant-form-factor diagnostics such as acoustic micro-emitters which have a time delay and emit a unique signal that delineates the propped fracture half-length from the total fracture half-length. Another proppant-form-factor diagnostic is a conductive proppant that is measured using electromagnetic induction. (Sharma et al., 2016). However, a real time analysis methodology of the propped dimensions using these proppant-form-factor diagnostics in conjunction with repeatedly-used, economical, conventional proppants has not been developed despite the tremendous effort to 1) understand the propped fracture dimensions and 2) create a workflow to optimize well completion design from propped fracture dimensions and contact within the reservoir. It is well understood that if such a real time methodology were developed and could be validated, then it would almost certainly generate billions of dollars in economic value in the unconventional, multi fractured horizontal well industry in U.S. alone.

SUMMARY OF THE EMBODIMENTS

1. A first embodiment includes a system comprised of four Dell R730XD servers defined as four physical nodes. Three physical nodes, each including the following hardware:
   a. A server chassis with (Quantity 24) 2.5-in drive slots and (Quantity 2) 2.5-in system drive slots.
   b. (Quantity 2) Dell, 2.5-in, 960 GB Solid State Drive SATA Mix Use MLC 6 Gbps Flex Bay Drive.
   c. (Quantity 24) Dell, 2.5-in, 3.84 TB Solid State Drive SAS Mix Use MLC 12 Gbps Hot-plug drive.
   d. (Quantity 2) Intel® Xeon® E5-2699A v4 2.4 GHz, 55M Cache, 9.60 GT/s QPI, Turbo, HT, 22C/44T (145W) Max Mem 2400 MHz.
   e. (Quantity 2) Intel XL710 Dual Port 40G, QSFP+, rNDC with SR Optics.
   f. (Quantity 24) 32 GB RDIMM, 2400 MT/s, Dual Rank, x4 Data Width.

The fourth physical node of the first embodiment includes the following hardware:
   a. A server chassis with (Quantity 12) 3.5-in drive slots and (Quantity 2) 2.5-in system drive slots.
   b. (Quantity 2) Dell, 2.5-in, 960 GB Solid State Drive SATA Mix Use MLC 6 Gbps Flex Bay Drive.
   c. (Quantity 12) Dell, 3.5-in, 10 TB 7.2K RPM, NLSAS, 12 Gbps 512e Hot-plug Hard Drive.
   d. (Quantity 2) Intel® Xeon® E5-2683 v4 2.1 GHz, 40M Cache, 9.60 GT/s QPI, Turbo, HT, 16C/32T (120W) Max Mem 2400 MHz.
   e. (Quantity 2) Intel XL710 Dual Port 40G, QSFP+, rNDC with SR Optics.
   f. (Quantity 12) 32 GB RDIMM, 2400 MT/s, Dual Rank, x4 Data Width.

The first embodiment also includes a computing switch such as Mellanox SX6012 and switching cables that have a bandwidth of at least 40 Gbit/s.

2. A second embodiment includes a system comprised of three Dell R930 servers and one Dell R730XD server defined as four physical nodes. The three Dell R930 physical nodes, each include the following hardware:
   a. A server chassis with (Quantity 24) 2.5-in drive slots and R930 PCIe Risers with up to (Quantity 2), x4 and up to (Quantity 2), x8 Gen 3 PCIe Slots.
   b. (Quantity 2) Dell 1.6 TB, NVMe, Mixed Use Express Flash, HHHL PCIe Cards.
   c. (Quantity 24) Dell, 2.5-in, 3.84 TB Solid State Drive SAS Mix Use MLC 12 Gbps Hot-plug drive.
   d. (Quantity 4) Intel® Xeon® E7-8890 v4 2.2 GHz, 60M Cache, 9.6 GT/s QPI 24C/48T, HT, Turbo (165W) DDR4 1:1 MaxMem 1866 Hz.
   e. (Quantity 2) Intel XL710 Dual Port 40G, QSFP+, rNDC with SR Optics.
   f. (Quantity 96) 32 GB RDIMM, 2400 MT/s, Dual Rank, x4 Data Width.

The fourth physical node, the R730XD, of the second embodiment includes the following hardware:
   g. A server chassis with (Quantity 12) 3.5-in drive slots and (Quantity 2) 2.5-in system drive slots.
   h. (Quantity 2) Dell, 2.5-in, 960 GB Solid State Drive SATA Mix Use MLC 6 Gbps Flex Bay Drive.
   i. (Quantity 12) Dell, 3.5-in, 10 TB 7.2K RPM, NLSAS, 12 Gbps 512e Hot-plug Hard Drive.
   j. (Quantity 2) Intel® Xeon® E5-2683 v4 2.1 GHz, 40M Cache, 9.60 GT/s QPI, Turbo, HT, 16C/32T (120W) Max Mem 2400 MHz.
   k. (Quantity 2) Intel XL710 Dual Port 40G, QSFP+, rNDC with SR Optics.
   l. (Quantity 16) 32 GB RDIMM, 2400 MT/s, Dual Rank, x4 Data Width.

The second embodiment also includes a computing switch such as Mellanox SX6012 and switching cables that have a bandwidth of at least 40 Gbit/s.

3. A third embodiment includes a system comprised of five Dell R730XD servers defined as five physical nodes. The first three Dell 730XD physical nodes, each include the following hardware:
   a. A server chassis with (Quantity 12) 3.5-in drive slots and (Quantity 2) 2.5-in system drive slots.
   b. (Quantity 2) Dell, 2.5-in, 960 GB Solid State Drive SATA Mix Use MLC 6 Gbps Flex Bay Drive.
   c. (Quantity 12) Dell, 3.5 in 4 TB 7.2K RPM SATA 6 Gbps Hot-plug Hard drive.
   d. (Quantity 2) Intel® Xeon® E5-2650 v4 2.2 GHz, 30M Cache, 9.60 GT/s QPI, Turbo, HT, 12C/241 (105W) Max Mem 2400 MHz.
   e. (Quantity 2) Intel XL710 Dual Port 40G, QSFP+, rNDC with SR Optics.
   f. (Quantity 8) 32 GB RDIMM, 2400 MT/s, Dual Rank, x4 Data Width.

The fourth physical node of the third embodiment includes the following hardware:
   g. A server chassis with (Quantity 12) 3.5-in drive slots and (Quantity 2) 2.5-in system drive slots.
   h. (Quantity 2) Dell, 2.5-in, 960 GB Solid State Drive SATA Mix Use MLC 6 Gbps Flex Bay Drive.
   g. (Quantity 12) Dell, 3.5 in 4 TB 7.2K RPM SATA 6 Gbps Hot-plug Hard drive.
   i. (Quantity 2) Intel® Xeon® E5-2650 v4 2.2 GHz, 30M Cache, 9.60 GT/s QPI, Turbo, HT, 12C/24T (105W) Max Mem 2400 MHz.
   j. (Quantity 2) Intel XL710 Dual Port 40G, QSFP+, rNDC with SR Optics.
   k. (Quantity 4) 32 GB RDIMM, 2400 MT/s, Dual Rank, x4 Data Width.

The fifth physical node of the third embodiment includes the following hardware:
- l. A server chassis with (Quantity 12) 3.5-in drive slots and (Quantity 2) 2.5-in system drive slots.
- m. (Quantity 2) Dell, 2.5-in, 960 GB Solid State Drive SATA Mix Use MLC 6 Gbps Flex Bay Drive.
- h. (Quantity 10) Dell, 3.5 in 4 TB 7.2K RPM SATA 6 Gbps Hot-plug Hard drive.
- n. (Quantity 2) Dell, 2.5-in, 1.6 TB Solid State Drive SAS Mix Use MLC 12 Gbps Hot-plug Drive, 3.5-in HYB CARR.
- o. (Quantity 2) Intel® Xeon® E5-2650 v4 2.2 GHz, 30M Cache, 9.60 GT/s QPI, Turbo, HT, 12C/24T (105W) Max Mem 2400 MHz.
- p. (Quantity 2) Intel XL710 Dual Port 40G, QSFP+, rNDC with SR Optics.
- q. (Quantity 4) 32 GB RDIMM, 2400 MT/s, Dual Rank, x4 Data Width.

The third embodiment also includes a computing switch such as Mellanox SX6012 and switching cables that have a bandwidth of at least 40 Gbit/s.

4. A fourth embodiment includes a system comprised of five Dell R730XD servers defined as five physical nodes. The first three Dell 730XD physical nodes, each include the following hardware:
- a. A server chassis with (Quantity 24) 2.5-in drive slots and (Quantity 2) 2.5-in system drive slots.
- b. (Quantity 2) Dell, 2.5-in, 960 GB Solid State Drive SATA Mix Use MLC 6 Gbps Flex Bay Drive.
- c. (Quantity 24) Dell, 2.5-in, 1.8 TB, 10K RPM SAS, 12 Gbps 512e 2.5-in Hot-plug Hard Drive.
- d. (Quantity 2) Intel® Xeon® E5-2699A v4 2.4 GHz, 55M Cache, 9.60 GT/s QPI, Turbo, HT, 22C/44T (145W) Max Mem 2400 MHz.
- e. (Quantity 2) Intel XL710 Dual Port 40G, QSFP+, rNDC with SR Optics.
- f. (Quantity 24) 32 GB RDIMM, 2400 MT/s, Dual Rank, x4 Data Width.

The fourth physical node of the fourth embodiment includes the following hardware:
- g. A server chassis with (Quantity 12) 3.5-in drive slots and (Quantity 2) 2.5-in system drive slots.
- h. (Quantity 2) Dell, 2.5-in, 960 GB Solid State Drive SATA Mix Use MLC 6 Gbps Flex Bay Drive.
- i. (Quantity 12) Dell, 3.5-in, 8 TB 7.2K RPM NLSAS 12 Gbps 512e Hot-plug Hard Drive.
- j. (Quantity 2) Intel® Xeon® E5-2683 v4 2.1 GHz, 40M Cache, 9.60 GT/s QPI, Turbo, HT, 16C/32T (120W) Max Mem 2400 MHz.
- k. (Quantity 2) Intel XL710 Dual Port 40G, QSFP+, rNDC with SR Optics.
- l. (Quantity 24) 32 GB RDIMM, 2400 MT/s, Dual Rank, x4 Data Width.

The fifth physical node of the fourth embodiment includes the following hardware:
- m. A server chassis with (Quantity 12) 3.5-in drive slots and (Quantity 2) 2.5-in system drive slots.
- n. (Quantity 2) Dell, 2.5-in, 960 GB Solid State Drive SATA Mix Use MLC 6 Gbps Flex Bay Drive.
- o. (Quantity 6) Dell, 3.5-in, 8 TB 7.2K RPM NLSAS 12 Gbps 512e Hot-plug Hard Drive.
- p. (Quantity 6) Dell, 2.5-in, 480 GB Solid State Drive, SAS Mix Use MLC 12 Gbps 2.5 in Hot-plug Drive, 3.5-in HYB CARR.
- q. (Quantity 2) Intel® Xeon® E5-2683 v4 2.1 GHz, 40M Cache, 9.60 GT/s QPI, Turbo, HT, 16C/32T (120W) Max Mem 2400 MHz.
- r. (Quantity 2) Intel XL710 Dual Port 40G, QSFP+, rNDC with SR Optics.
- s. (Quantity 24) 32 GB RDIMM, 2400 MT/s, Dual Rank, x4 Data Width.

The fourth embodiment also includes a computing switch such as Mellanox SX6012 and switching cables that have a bandwidth of at least 40 Gbit/s.

The four embodiments including the systems also include a method and a means to label the input features of the training set gathered during a hydraulic fracture stage, wherein a predetermined machine learning process—which may be trade secret—trains from the said training set, wherein the training set is labeled in whole, to determine the propped and unpropped fracture dimensions as measured in real-time.

ADVANTAGES

The fiber optic seismic sensor, acoustic micro-emitters and electromagnetic induction process and apparatus to measure conductive proppant are great, developing improvements, but they did not show any development of a stage by stage, granular, conditional testing analysis protocol that maps the rate of the propped fracture dimension growth in real-time as measured from these new, improved sensing technologies and proppant-form-factor diagnostics for widely-used, industry-standard proppants. That is, the prior art omits a solution for directly, accurately and rapidly monitoring the rate of growth of the primary control on hydraulically fractured, multi stage, unconventional wells—the propped fracture half length (Warpinski & Wolhart, 2016). Moreover, because the prior art does not exhibit a solution to monitor all of the propped fracture dimensions in real-time, their direct contribution to phenomena such as fracture height containment, stress shadowing and so forth is vague on a per well basis (Warpinski & Wolhart, 2016). Thirdly, it is desirable to reduce the quantity of acoustic micro-emitters necessary to analyze and distinguish the propped fracture dimensions from the unpropped fracture dimensions in order to reduce costs to the oil and gas operator. Thus, the embodiments of this process and apparatus invention provide a real-time labeling protocol so that the propped fracture growth can be measured and analyzed in real time as it occurs—not just merely the final dimensions at the end of the pumped stage—so that stage by stage, conditional testing may be performed and the results visualized during pumping. These embodiments of this invention enable the stage spacing of a hydraulically fractured well to be optimized as the pump rate, proppant density, proppant mesh size, fluid viscosity, treating pressure and other treatment parameters can be varied and their effect on the propped fractures' dimensions measured from microseisms recorded by highly sensitive seismic sensors and processed in real time through a machine learning algorithm that was trained from previously labeled stage data. This enables oil and gas operators to test stage spacing granularly in real-time, and for the first time in the industry's history, to use a direct, distinct signal delineating the propped fracture dimensions to initialize a machine learning process that directly maps the propped fracture network growth with certainty obtained from labeled input features of (a) prior stage(s). Thus, these embodiments will almost certainly enable operators realize multi-million dollar savings per field in stage spacing design and implementation since they re-evaluate their selection of pump rates, proppant densities, proppant mesh sizes, fluid viscosities, treating pressures and other treatment parameters. Operators will much more efficiently determine if it is more economical to design fewer, larger stage treatments and create larger volumes of high fracture conductivity, producing reservoir rock or instead design more, smaller, lower cost stage treatments that yield comparable production.

Moreover, these embodiments also enable well spacing to be optimized for the same reasons, and these embodiments enable operators to correlate the observed propped fracture growth to the acquired input features and conduct a post treatment analysis of the effective fracture lengths of the propped fracture lengths. This will allow the operators to plan new well tests which can measure the propped fracture dimensions with sufficient accuracy and precision to evaluate the loss of the conductivity in the propped fracture dimensions due to proppant crushing, proppant embedment, gel damage and so forth. This will ultimately lead to a lower completion and production cost per hydraulically fractured well per volume of hydrocarbon production, and it will stimulate more innovation.

BRIEF DESCRIPTION OF THE DRAWINGS

FIGS. 6A-6M illustrate the second embodiment's system, method and means with labeling process flowcharts.

FIGS. 11A-11G illustrate the third embodiment's second memory, a third memory, memory transfer and sub-transfer process, wherein labeled input features are scanned to the second memory of the five physical nodes, and unlabeled input features are scanned from a second plurality of persistent, electronic storage media to the third memory to be labeled.

FIGS. 14A-14G illustrate the fourth embodiment's second memory, a third memory, and memory transfer process, wherein labeled input features are scanned to the second memory of the five physical nodes, and unlabeled input features are scanned from a second plurality of persistent, electronic storage media to the third memory to be labeled.

TECHNICAL GLOSSARY

Figure 1A:
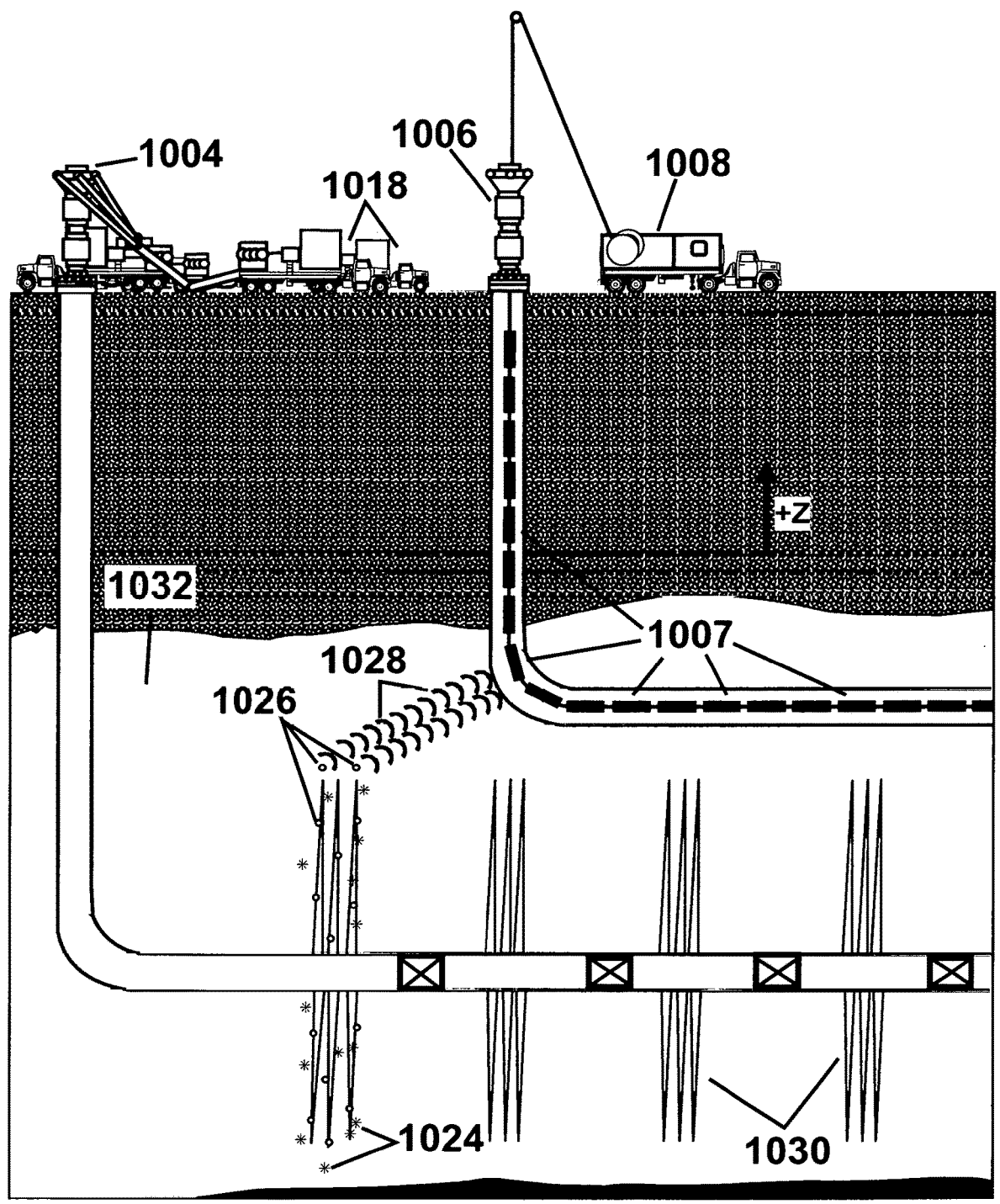
FIGS. 1A & 1B illustrate a cross-sectional and an aerial view of well hydraulic fracturing operations with simultaneous downhole seismic sensing from the borehole of a nearby monitoring well.

Input feature(s): these are the parameters that are input into a mathematical relationship known as the hypothesis. As a standard machine learning term, there is a predetermined "n" number of input features for the embodiments.
Label(s): these are the parameters that classify if the training example is propped or not propped.
Mbps: megabits per second.
MBps: megabytes per second.
Gbps: gigabits per second.
GBps: gigabytes per second.
Tbps: terabits per second.
TBps: terabytes per second.
Gbit: gigabit
SSD(s): solid state drive(s)
HDD(s): hard disk drive(s)
Interstage time: time between hydraulic fracture stages in a well.

DRAWINGS—REFERENCE NUMERALS 1002 mobile compute cluster stepvan/truck
1004 treatment well
1006 monitoring well
1007 seismic sensing array
1008 seismic sensing array deployment truck
1010 wireline truck
1012 frac' water tanks
1014 frac' water supply line
1016 mobile proppant storage containers
1017 t-belt and blenders
1018 pump trucks
1020 frac' manifold or missile
1022 mobile command center
1024 microseisms
1026 acoustic micro-emitters (AME)
1028 acoustic micro-emitters' distinct signals
1030 main, induced, hydraulic fracture
1032 reservoir
2002 physical compute nodes or servers
2004 computer display
4000 compute node 1 of embodiment 1
4002 two system drives of compute node 1 of embodiment 1
4004 two central processing units of compute node 1 of embodiment 1
4006 dynamic, non-persistent, memory modules of compute node 1 of embodiment 1
4008 persistent, electronic storage media of compute node 1 of embodiment 1
4010 persistent, electronic storage media of compute node 1 of embodiment 1
4100 compute node 2 of embodiment 1
4102 two system drives of compute node 2 of embodiment 1
4104 two central processing units of compute node 2 of embodiment 1
4106 dynamic, non-persistent, memory modules of compute node 2 of embodiment 1
4108 persistent, electronic storage media of compute node 2 of embodiment 1
4110 persistent, electronic storage media of compute node 2 of embodiment 1

4200 compute node 3 of embodiment 1
4202 two system drives of compute node 3 of embodiment 1
4204 two central processing units of compute node 3 of embodiment 1
4206 dynamic, non-persistent, memory modules of compute node 3 of embodiment 1
4208 persistent, electronic storage media of compute node 3 of embodiment 1
4210 persistent, electronic storage media of compute node 3 of embodiment 1
4300 compute node 4 of embodiment 1
4302 two system drives of compute node 4 of embodiment 1
4304 two central processing units of compute node 4 of embodiment 1
4306 dynamic, non-persistent, memory modules of compute node 4 of embodiment 1
4308 first plurality of persistent, electronic storage media of embodiment 1
5002 network cables connecting the physical nodes to the switch of embodiment 1
5004 network switch of embodiment 1
5006 second memory of embodiment 1
5008 third memory of embodiment 1
5009 initialization of labeling unlabeled training set of embodiment 1
5010 memory transfers of embodiment 1
7000 compute node 1 of embodiment 2
7002 two system PCIe cards of compute node 1 of embodiment 2
7004 four central processing units of compute node 1 of embodiment 2
7006 dynamic, non-persistent, memory modules of compute node 1 of embodiment 2
7008 persistent, electronic storage media of compute node 1 of embodiment 2
7100 compute node 2 of embodiment 2
7102 two system PCIe cards of compute node 2 of embodiment 2
7104 four central processing units of compute node 2 of embodiment 2
7106 dynamic, non-persistent, memory modules of compute node 2 of embodiment 2
7108 persistent, electronic storage media of compute node 2 of embodiment 2
7200 compute node 3 of embodiment 2
7202 two system PCIe cards of compute node 3 of embodiment 2
7204 four central processing units of compute node 3 of embodiment 2
7206 dynamic, non-persistent, memory modules of compute node 3 of embodiment 2
7208 persistent, electronic storage media of compute node 3 of embodiment 2
7300 compute node 4 of embodiment 2
7302 two system drives of compute node 4 of embodiment 2
7304 two central processing units of compute node 4 of embodiment 2
7306 dynamic, non-persistent, memory modules of compute node 4 of embodiment 2
7308 first plurality of persistent, electronic storage media of embodiment 2
8002 network cables connecting the physical nodes to the switch of embodiment 2
8004 network switch of embodiment 2
8006 second memory of embodiment 2
8008 third memory of embodiment 2
10000 compute node 1 of embodiment 3
10002 two system drives of compute node 1 of embodiment 3
10004 two central processing units of compute node 1 of embodiment 3
10006 dynamic, non-persistent, memory modules of compute node 1 of embodiment 3
10008 persistent, electronic storage media of compute node a of embodiment 3
10100 compute node 2 of embodiment 3
10102 two system PCIe cards of compute node 2 of embodiment 3
10104 two central processing units of compute node 2 of embodiment 3
10106 dynamic, non-persistent, memory modules of compute node 2 of embodiment 3
10108 persistent, electronic storage media of compute node 2 of embodiment 3
10200 compute node 3 of embodiment 3
10202 two system drives of compute node 3 of embodiment 3
10204 two central processing units of compute node 3 of embodiment 3
10206 dynamic, non-persistent, memory modules of compute node 3 of embodiment 3
10208 persistent, electronic storage media of compute node 3 of embodiment 3
10209 persistent, electronic storage media of compute node 3 of embodiment 3
10300 compute node 4 of embodiment 3
10302 two system drives of compute node 4 of embodiment 3
10304 two central processing units of compute node 4 of embodiment 3
10306 dynamic, non-persistent, memory modules of compute node 4 of embodiment 3
10308 persistent, electronic storage media of compute 4 of embodiment 3
10400 compute node 5 of embodiment 3
10402 two system drives of compute node 5 of embodiment 3
10404 two central processing units of compute node 5 of embodiment 3
10406 dynamic, non-persistent, memory modules of compute node 5 of embodiment 3
10408 persistent, electronic storage media of compute node 5 of embodiment 3
10409 third plurality of persistent, electronic storage media of embodiment 3
11002 network cables connecting the physical nodes to the switch of embodiment 3
11004 network switch of embodiment 3
11006 a memory volume reserved for the nodes' system of embodiment 3
11008 a memory volume reserved for memory transfers, CPU operations and so forth of embodiment 3
11010 second memory of embodiment 3
11012 third memory of embodiment 3
11016 initialization of the second memory of embodiment 3
11018 memory transfers of embodiment 3
11020 memory sub-transfers of embodiment 3
13000 compute node 1 of embodiment 4
13002 two system drives of compute node 1 of embodiment 4

13004 two central processing units of compute node 1 of embodiment 4
13006 dynamic, non-persistent, memory modules of compute node 1 of embodiment 4
13008 persistent, electronic storage media of compute node 1 of embodiment 4
13100 compute node 2 of embodiment 4
13102 two system drives of compute node 2 of embodiment 4
13104 two central processing units of compute node 2 of embodiment 4
13106 dynamic, non-persistent, memory modules of compute node 2 of embodiment 4
13108 persistent, electronic storage media of compute node 2 of embodiment 4
13200 compute node 3 of embodiment 4
13202 two system drives of compute node 3 of embodiment 4
13204 two central processing units of compute node 3 of embodiment 4
13206 dynamic, non-persistent, memory modules of compute node 3 of embodiment 4
13208 persistent, electronic storage media of compute node 3 of embodiment 4
13300 compute node 4 of embodiment 4
13302 two system drives of compute node 4 of embodiment 4
13304 two central processing units of compute node 4 of embodiment 4
13306 dynamic, non-persistent, memory modules of compute node 4 of embodiment 4
13308 persistent, electronic storage media of embodiment 4
13400 compute node 4 of embodiment 4
13402 two system drives of compute node 4 of embodiment 4
13404 two central processing units of compute node 4 of embodiment 4
13406 dynamic, non-persistent, memory modules of compute node 4 of embodiment 4
13408 persistent, electronic storage media of embodiment 4
13409 third plurality of persistent, electronic storage media of embodiment 4
14002 network cables connecting the physical nodes to the switch of embodiment 4
14004 network switch of embodiment 4
14006 a memory volume reserved for the nodes' system of embodiment 4
14008 a memory volume reserved for memory transfers, CPU operations and so forth of embodiment 4
14010 second memory of embodiment 4
14012 third memory of embodiment 4
14016 initialization of the second memory of embodiment 4
14018 memory transfers of embodiment 4

DETAILED DESCRIPTION OF SPECIFIC EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1B:
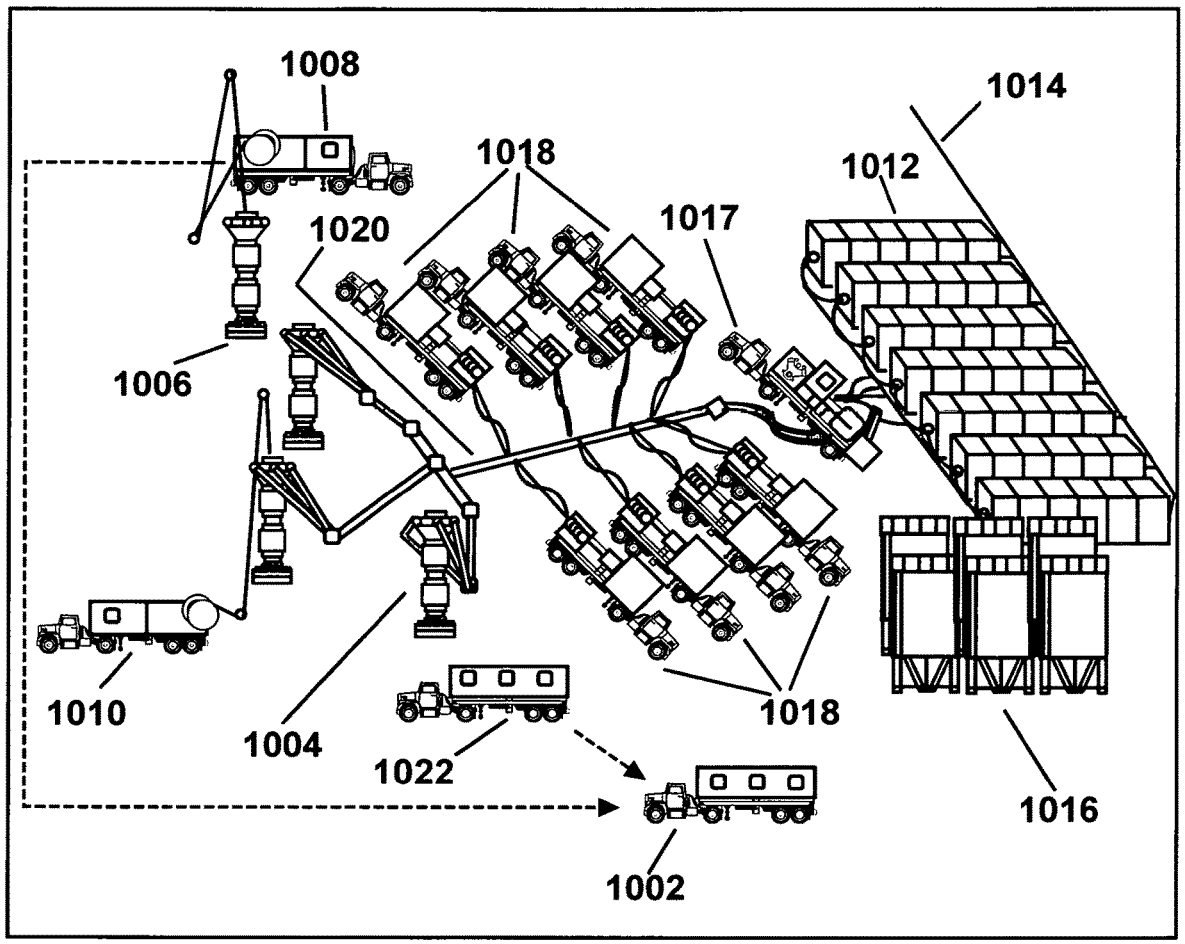

Hydraulic fracturing operations and microseismic sensing deployments vary per well but certain equipment common or essential to hydraulic fracturing is included in FIGS. 1A & 1B which illustrate the operations from a cross-sectional and an aerial view. These embodiments are housed within a mobile compute cluster 1002 transported within a temperature-controlled and humidity-controlled stepvan or truck. Operations encompass the treatment well 1004, and downhole microseismic sensing equipment is deployed in the wellbore within a nearby monitoring well 1006, wherein a seismic sensing truck 1008 deploys the sensing array 1007, and associated equipment records the acoustic data measured from the array. Hydraulic fracture operations also commonly include at least one crane and a wireline truck 1010 for operations such as setting isolation plugs if the job is a "plug and per?" job and so forth. Frac tanks 1012 store water to be pumped downhole and are supplied by a water line 1014 from a water well, frac pond or other water source. Proppant of various mesh sizes may be stored in mobile containers 1016 and are conveyed by a T-belt to the mobile blender 1017 which mixes water, chemicals and the proppant to form a slurry. The slurry is conveyed to the suction side of the pump trucks 1018 through the low pressure side of a large manifold commonly referred to as the "missile" 1020. Treatment data such as proppant density, treating pressure, pump rate, chemical concentrations, proppant mesh size and so forth are transmitted to the mobile command center 1022. Data is transmitted from the mobile command center 1022 and the seismic sensing truck 1008 to the mobile command center 1002.

FIG. 1A illustrates a cross-sectional view of the same hydraulic fracture operations and microseismic sensing deployment. In these embodiments, the hydraulic fracturing treatment of a stage may be divided up into three broad time intervals or windows. These windows are the pad-window, the proppant-window and the closure-window. The microseisms measured in the pad-window occur when the fluid pad is pumped and correspond to the total fracture dimensions and connectivity that will have most likely have negligible conductivity if not later sufficiently propped with proppant. The microseisms measured in the proppant-window correspond to 1) re-stimulated rock of a previous stage, 2) fractures where fluid can induce shear deformation in unstimulated rock but proppant is not within a predetermined distance of approximately 15 or more feet, and 3) the propped main hydraulically induced fractures. The microseisms 1024 measured in the closure-window are when the stage treatment is completed and operations are being performed to set the next frac plug or drop and seat next frac ball which will isolate the next stage treatment within the wellbore from the previous stage treatment. These microseisms that occur during the closure-window correspond to the main, induced hydraulic fractures that generate shear events as the hydraulic fractures closed around the proppant during leak off. Also, acoustic micro-emitters (AME) 1026, which have a proppant-form-factor, may be pumped downhole with the proppant. At a predetermined time within the closure-window, the AME emit distinct signals 1028 that delineate the propped fracture dimensions from microseisms that occur outside the propped fracture dimensions. The well completion and conductive, propped fracture dimensions 1030 are designed to economically optimize contact with the reservoir 1032. Other mobile surface equipment and chemicals such as loss control additives are common in hydraulic fracture operations but have not been illustrated in FIGS. 1A & 1B.

Figure 2:
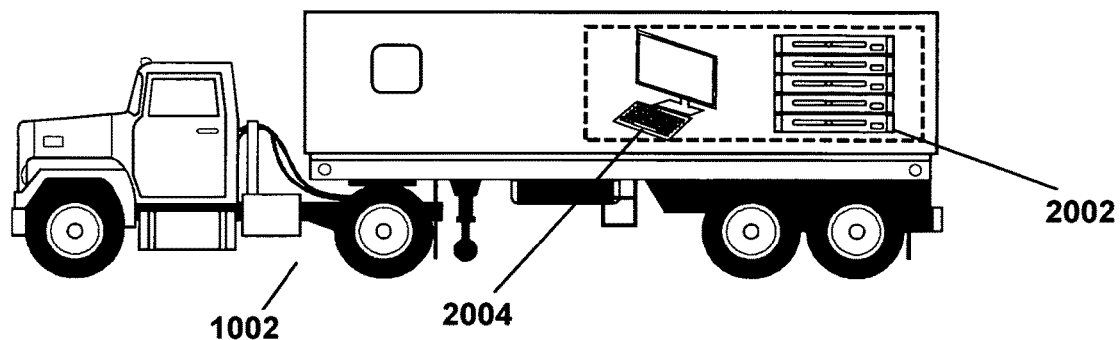
FIG. 2 illustrates a mobile compute cluster having various embodiments with a display in a truck or a stepvan.

These embodiments include systems, methods and means to label the microseisms measured in the treatment windows and thereby construct (a) labeled training set(s) which enable training of (a) machine learning process(es) to map the propped fracture dimensions of (a) subsequent stage(s) in the fracture treatment. The training process may be implemented with 1) open source terabyte- and petabyte-scale data processing engines within the public domain, 2) trade-secret training algorithms and processes, 3) patented training algorithms and processes or 4) or commercial data processing engines. FIG. 2 illustrates that these embodiments each consist of physical compute nodes 2002 or servers and a display 2004 contained within a stepvan or truck 1002 supplied with electric power from a source such as a diesel generator.

Detailed Description—First Embodiment

This embodiment includes a system (FIGS. 3A & 3B) comprised of four physical compute nodes 4000, 4100, 4200 and 4300, a networking switch and other hardware which have the structure of or closely similar to the following described hardware manufactured by Dell® and other manufacturers. Four Dell R730XD servers are defined as the four physical nodes illustrated in FIGS. 4A & 4B.

The first three physical nodes (nodes) are each comprised of a server chassis 4000, 4100 and 4200 with (Quantity 24) 2.5-in drive slots and (Quantity 2) 2.5-in system drive slots. The (Quantity 24) drive slots each contain a Dell®, 2.5-in, 3.84 TB Solid State Drive SAS Mix Use MLC 12 Gbps Hot-plug drive. Each of these (Quantity 72) drives have an approximate sequential scan rate of 1.2 GBps and (Quantity 69) of these drives comprise a second plurality of persistent, electronic storage media 4008, 4108 and 4208. The remaining (Quantity 3) drives comprise the third plurality of persistent, electronic storage media 4010, 4110 and 4210. The system drive slots are occupied with (Quantity 2) Dell, 2.5-in, 960 GB Solid State Drive SATA Mix Use MLC 6 Gbps Flex Bay Drive. 4002, 4102 and 4202. System configuration files and protocols are stored on these system disks. The three nodes each have (Quantity 2) Intel® Xeon® E5-2699A v4 CPUs 4004, 4104 and 4204 with the following specifications: 2.4 GHz, 55M Cache, 9.60 GT/s QPI, Turbo, HT, 22C/44T (145W) Max Mem 2400 MHz. Nodes 1-3 4000, 4100 and 4200 each have 768 GB of registered memory, specifically (Quantity 24) 32 GB RDIMM, 2400 MT/s, Dual Rank, ×4 Data Width 4006, 4106 and 4206.

The fourth physical node is comprised of a server chassis 4300 with (Quantity 12) 3.5-in drive slots and (Quantity 2) 2.5-in system drive slots. The (Quantity 12) drive slots each contain a Dell, 3.5-in, 10 TB 7.2K RPM, NLSAS, 12 Gbps 512e Hot-plug Hard Drive. Each of these (Quantity 12) drives comprise the first plurality of electronic, persistent storage media 4308, and each have an approximate sequential scan rate of 60 MBps for a total sequential scan rate of 720 MBps. The system drive slots are occupied (Quantity 2) Dell, 2.5-in, 960 GB Solid State Drive SATA Mix Use MLC 6 Gbps Flex Bay Drive 4302. The fourth node has (Quantity 2) Intel® Xeon® ES-2683 v4 CPUs 4304 with the following specifications: 2.1 GHz, 40M Cache, 9.60 GT/s QPI, Turbo, HT, 16C/32T (120W) Max Mem 2400 MHz. The CPUs of Nodes 1-4 4004, 4104, 4204 and 4304 comprise the plurality of processors for this embodiment. Also, Node 4 has 384 GB of registered memory, specifically (Quantity 12) 32 GB RDIMM, 2400 MT/s, Dual Rank, ×4 Data Width 4306. Nodes 1-4 registered memory 4006, 4106, 4206 and 4306 total volume is 2,688 GB for the compute cluster.

Each of the four compute nodes have (Quantity 2) Intel XL710 Dual Port 40G, QSFP+, rNDC with SR Optics network cards and (FIG. 5) are connected by two network cables 5002 per node both having a minimum 40 Gbps or 5 GBps bandwidth. These network cables connect to a computing switch 5004 such as Mellanox SX6012 which has 12 ports, 1.3 Tbps and a link speed of 56 Gbps. The second memory 5006 is comprised of 256 GB on each of the four compute nodes to accommodate a maximum of 1024 GB of AME closure labels. The third memory 5008 is comprised of 384 GB on each of the nodes 1-3 to accommodate a maximum of 1152 GB of unlabeled input features scanned from the second plurality of persistent, electronic storage media 4008, 4108 and 4208. Moreover, the nodes' operating systems for this embodiment is Red Hat Enterprise Linux but other professional production grade Linux distributions, (e.g. SUSE Enterprise Linux, Ubuntu LTS, etc.) may be substituted. Windows Server operating systems and other production grade alternatives may be used in other embodiments.

Operation of First Embodiment—FIGS. 3A-3S, 4A & 4B, and 5.

Figure 3A:
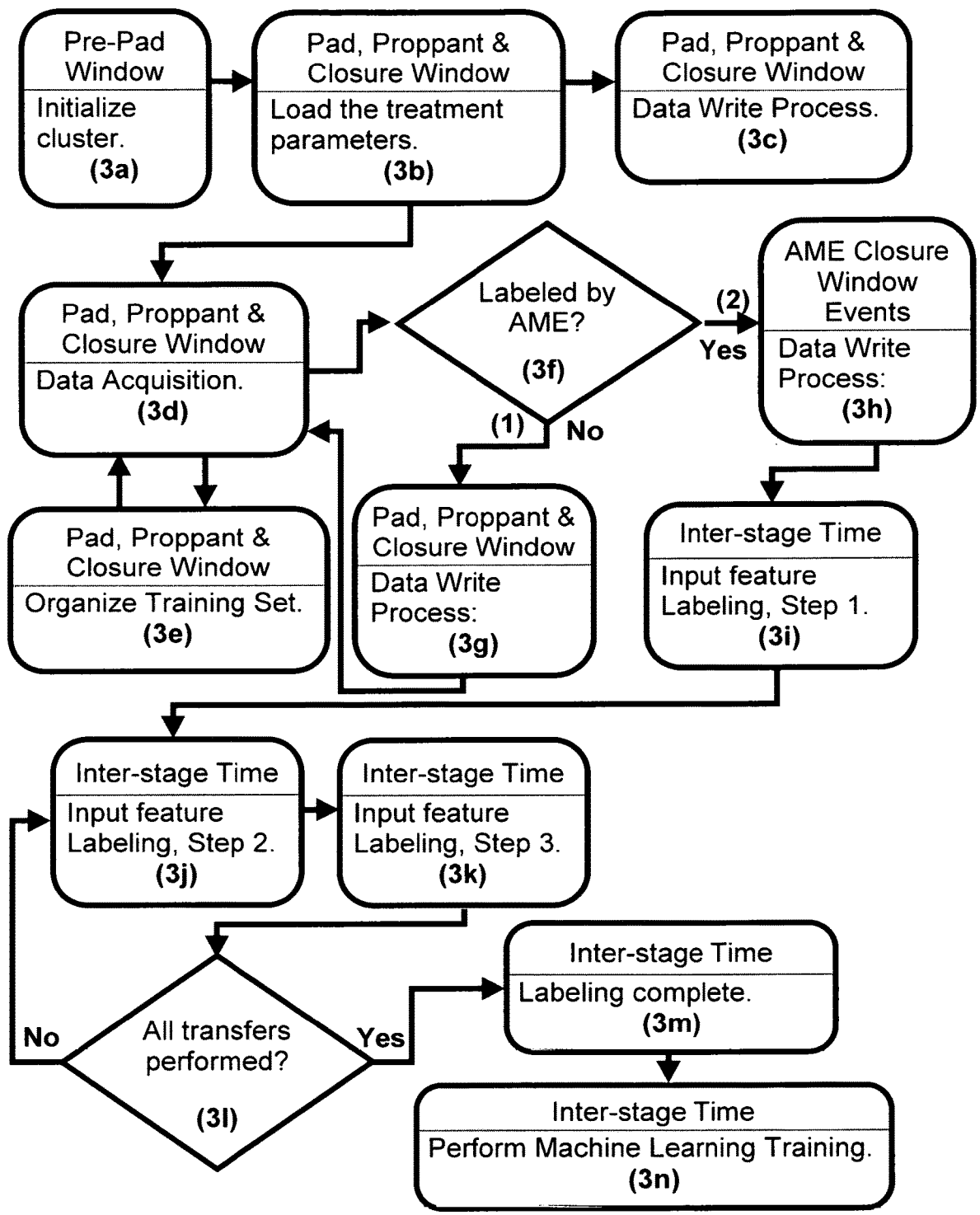
FIGS. 3A-3S illustrate the first embodiment's system, method and means with labeling process flowcharts.
Figure 3B:
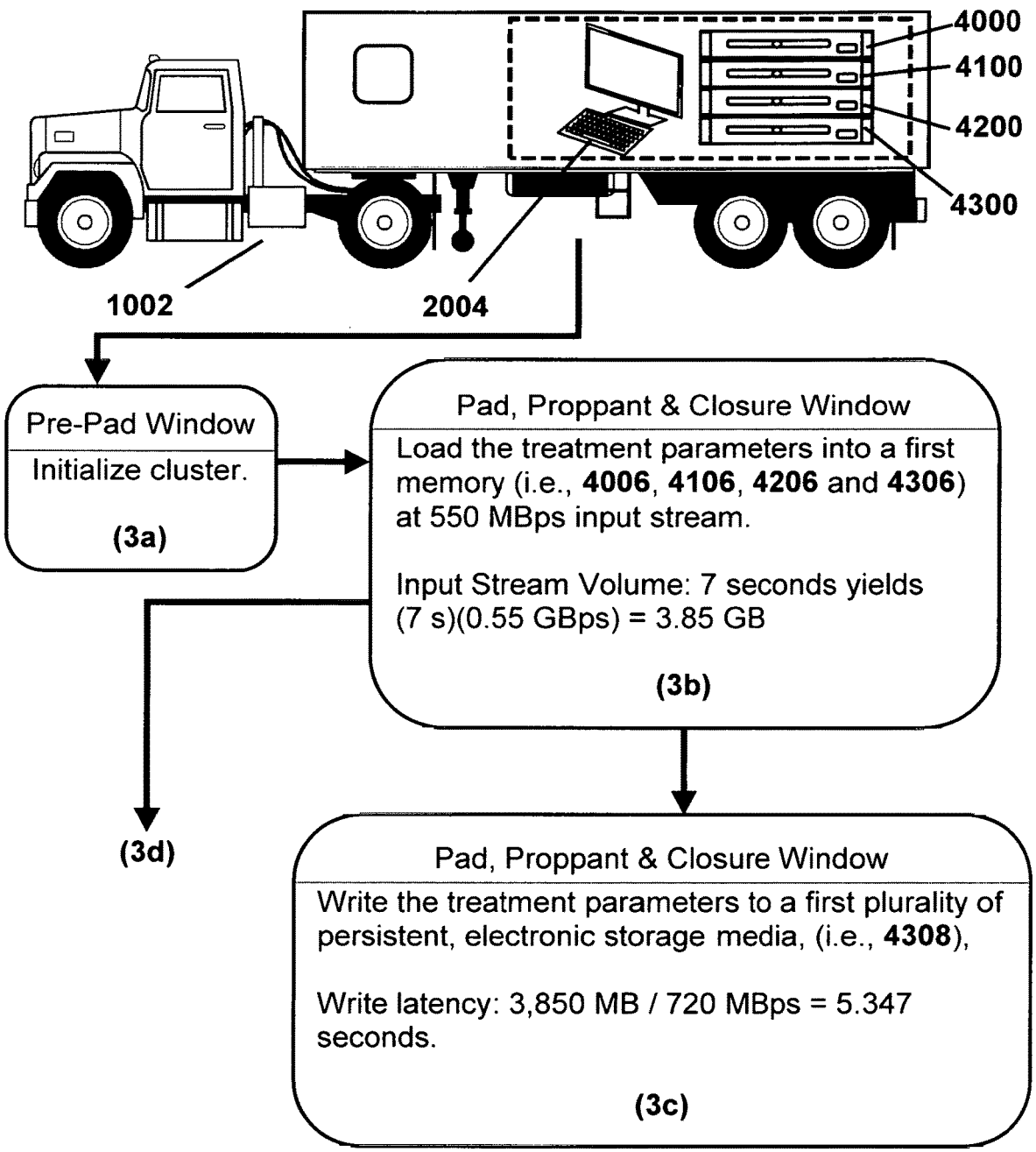
Figure 3C:
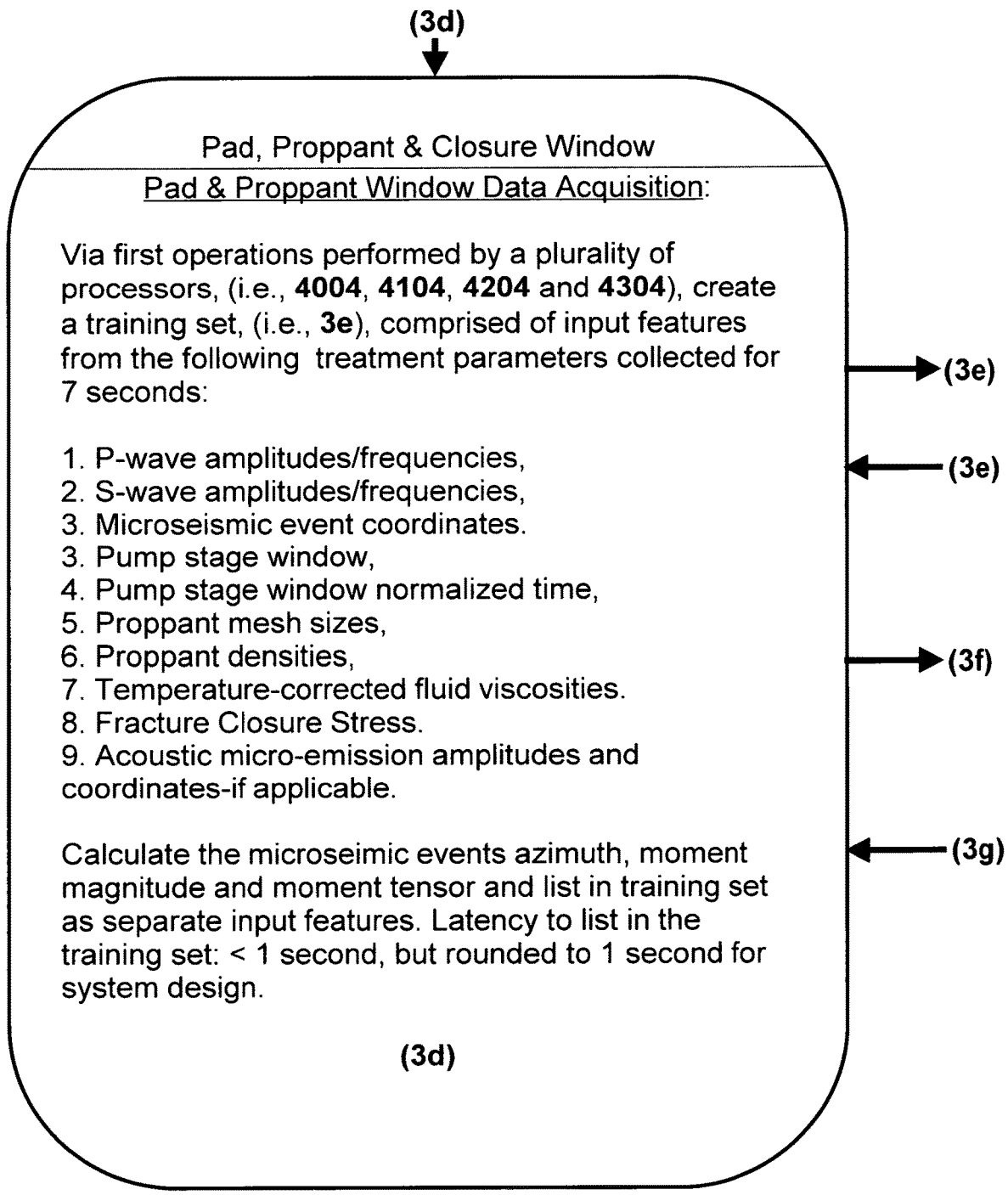
Figure 3E:
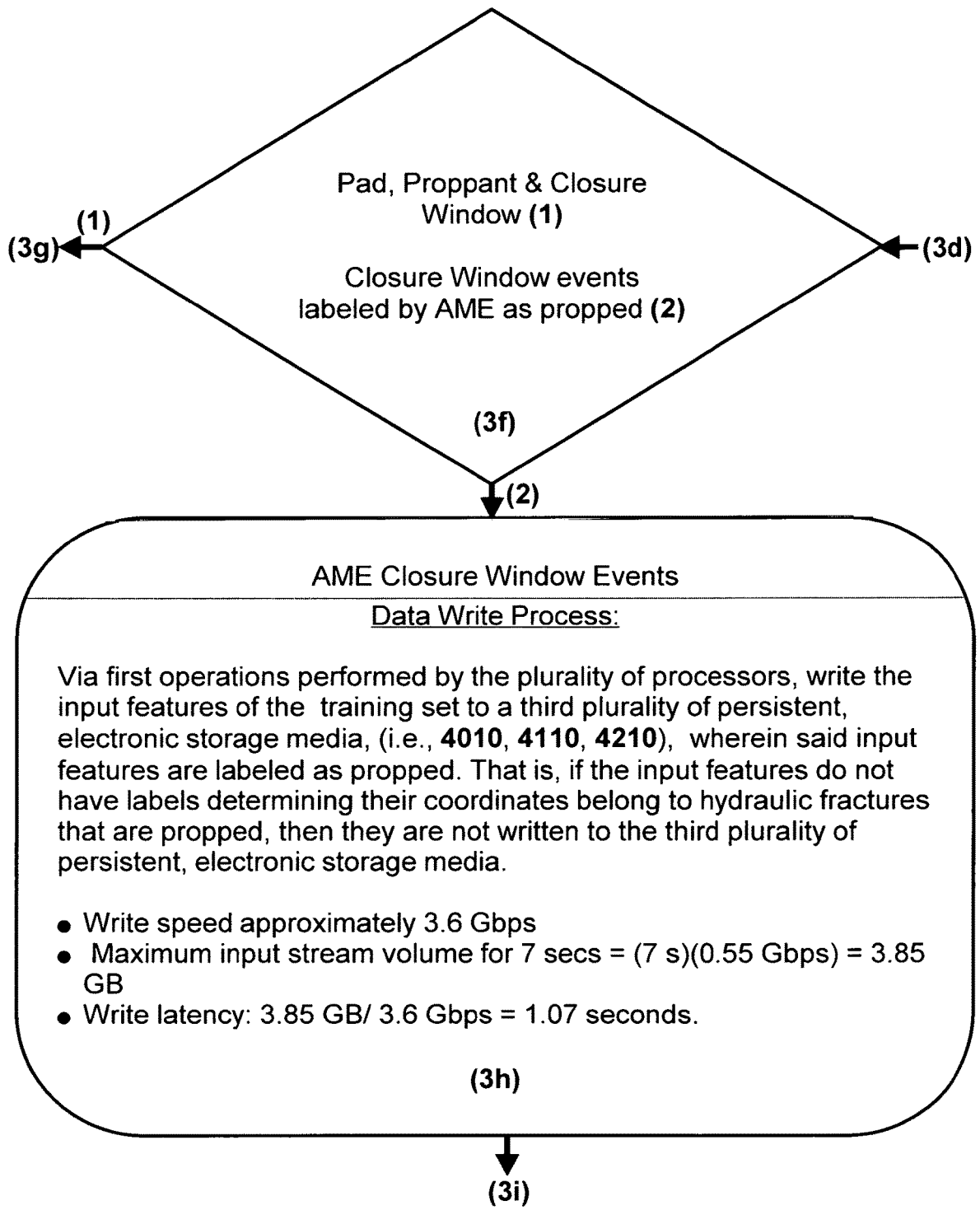

FIG. 3A presents a small-scale view of FIGS. 3B-3I. As illustrated in FIG. 3B, the cluster is first initialized (3a) ensuring the computing resources and hardware are sufficient for the job's 1) designed stage data volumes and bandwidth for the pad-, proppant- and closure-window, and 2) the data volume and bandwidth of AME closure labels. The cluster may be designed to have double the volume of data to be collected in the three windows and for the AME closure labels detected in the closure-window. This embodiment is designed for 100 TB data for the total job and a maximum of 1 TB of AME labels. At a predetermined real-time data input, (this embodiment uses 550 MBps), the treatment parameters are acquired and loaded (3b) into the system first memory which has been predetermined from the job data volume and bandwidth, provisioned and initialized in the previous step. The system first memory is comprised of registered memory provisioned from the memory modules which may include (FIGS. 4A & 4B) 4006, 4106, 4206 and 4306. This embodiment loads the treatment parameters into the system first memory in 7 second batches before the plurality of processors 4004, 4104, 4204 and 4304 perform any operations or the data is written to disk space. As illustrated in FIGS. 3B-3E & 3J-3N, the treatment parameters are loaded (3b) into the system memory at a predetermined iterative batches, (this embodiment uses 7 seconds). As the treatment parameters are loaded, first operations (3d) performed by the plurality of processors simultaneously create a training set (3e) of input features from the loaded treatment parameters. These first operations (3d) have a latency approximated to one second and are compiled predominantly from C++ and MPI source code into machine code. Upon the conclusion of step (3b), the raw treatment parameters (3c) are written to a first plurality of persistent, electronic storage media 4308 comprised of the said 12 hard disk drives with a total approximate write rate of 720 MBps which yield an approximate write latency of 5.35 seconds for the 7 second iterative batches. FIGS. 3J-3N show that once step (3b) of sub-processes (3A) and (3B) conclude, step (3b) instantaneously continues in sub-processes (3C) and (3D). Thus, real-time batch processing of the treatment parameters is performed as defined by this schema. Moreover, sub-processes may use 1000 instead of 1024 to convert MBps to GBps and so forth for simplicity.

FIGS. 3B-3E, 3K-3N show that this embodiment calculates the microseismic moment magnitude, microseismic events azimuth and moment tensor of the microseisms (3d). Source mechanisms may be estimated and quantified as input features by using moment tensor inversion techniques such as the full-waveform method, the amplitude method or the first-arrival method. These methods are well understood and publicized (Bowers & Hudson, 1999; Jiao et al., 2014). Shown in FIG. 3D, the training set (3e) may include mathematically transformed quantities and the original treatment parameters themselves. Each of these transformed quantities or treatment parameters is defined as an input feature that is input into a mathematical relationship defined as a hypothesis. These terms, (e.g., input feature(s), label(s), hypothesis, and so forth), are standard nomenclature in machine learning theory. These input features may correspond to labels, (this embodiment uses the AME emissions from the closure window as labels), and then be used to train and test a supervised learning algorithm hypothesis which maps the propped fracture dimensions as in real-time. Machine learning theory is well-understood and widely publicized, but this embodiment enables these machine learning algorithms to be deployed on the next stage's data and thereby map the propped fracture dimensions in real-time by creating a system, process and means to label the training set via the AME signals. Without labeling the training set, real-time mapping—corroborated against the proppant-form-factor direct diagnostics of the previous stage(s)—could not be performed. This embodiment labels the training set during interstage time, which enables machine learning training and testing protocols to be performed and then real-time mapping to be implemented upon the same well's proceeding stages' data. This is superior to, yet not exclusive of, data aggregation from nearby wells because the geologic, reservoir rock and fluid properties are spatially dependent and increasingly differ with offset well distance. Thus while labeling of the input features may be performed with developing correlations from other wells' data, this embodiment's solution is superior in precision, time and cost and robustness of offset or nearby wells (e.g., within several miles and in the same lithological unit) may be integrated as well.

Training set input features are derived from the physical quantities or treatment parameters measured by field instruments during the hydraulic fracturing operation. The physical quantities include: p-wave amplitudes/frequencies, s-wave amplitudes/frequencies, proppant mesh sizes, proppant densities, pump stage window, microseismic event coordinates, microseismic moment magnitudes, temperature-corrected fluid viscosities, pump stage window normalized time (normalized from the start of the pad-, proppant-, closure-window) and fracture closure stress. Again, acoustic micro-emission amplitudes and coordinates—or the lack thereof—are used to label corresponding input features as belonging to propped or unpropped fracture deformation within the reservoir.

The training set (3e) is a m×n matrix where m is the number of training examples, and n is the number of input features in the training set. The input features of the training set illustrated in FIG. 3D are defined for microseismic event "i": P-wave amplitude, $\lambda_P^{(i)}$, P-wave frequency, $f_P^{(i)}$, S-wave amplitude, $\lambda_S^{(i)}$, S-wave frequency, $f_S^{(i)}$, X-coordinate of microseismic event "i", $C_X^{(i)}$, Y-coordinate of microseismic event "i", $C_Y^{(i)}$, Z-coordinate of microseismic event "i", $C_Z^{(i)}$. The moment tensor force couple $M_{jk}^{(i)}$ is and input feature and is composed of opposing forces pointing in the j-direction, separated by an infinitesimal distance in the k-direction for microseismic event "i": $M_{xx}^{(i)}$, $M_{xy}^{(i)}$, $M_{xz}^{(i)}$, $M_{yx}^{(i)}$, $M_{yy}^{(i)}$, $M_{yz}^{(i)}$, $M_{zx}^{(i)}$, $M_{zy}^{(i)}$, and $M_{zz}^{(i)}$. Remaining input features as listed in (3e) are the window class (i.e., pad-, proppant- or closure-window) $W_P^{(i)}$, the time from the start of the window, $T_W^{(i)}$, proppant mesh size, $P_{Mesh}^{(i)}$, proppant density, $P_{Dens}^{(i)}$, temperature-corrected viscosity, $\mu_F^{(i)}$, surface treating pressure, $P_{Treat}^{(i)}$, and closure stress, $\sigma_{clos}^{(i)}$.

If the input features have labels for AME emission event (i) or can be determine if they are or are not within the predetermined proximity of an AME emission event, approximately 15 feet for this embodiment: AME amplitude, $\lambda_{AME}^{(i)}$, AME frequency, $f_{AME}^{(i)}$, AME event X-coordinate, $X_{AME}^{(i)}$, AME event Y-coordinate, $Y_{AME}^{(i)}$, and AME event Z-coordinate, $Z_{AME}^{(i)}$.

The existence of the AME within the predetermined proximity labels the corresponding microseismic events as propped and the nonexistence of AME within the predetermined proximity labels the microseismic event as non-propped. Additional treatment parameters (pump rate, etc.) may also be included in this embodiment. Moreover, the pump stage window normalized time is defined as the time in a window initialized at the start of a new window: pad, proppant or closure. The pad-window begins when fluid is first pump to initiate breakdown and initiate fracture geometry and concludes at the end of the start of the proppant-window. The proppant-window begins when the proppant density exceeds 0.1 ppg for a proppant mesh size of 40/70, or the start of the proppant-window may be user-defined. The proppant-window concludes at the end of the pumped slurry volume when the proppant density is reduced below 0.1 ppg. The closure-window begins when the surface treating pressure is released and ends being monitored when the next stage begins to be pumped.

FIGS. 3C-3D, 3J-3N also illustrate that the training set (3e) created in step (3d) by first operations by the plurality of processors are written (3g) from the first memory to a second plurality of persistent, electronic storage media 4008, 4108 and 4208. The second plurality of persistent, electronic storage media has an approximate write rate of 82.8 GBps determined from an approximate write rate of 1.2 GBps per SSD; thus, step (3g)'s write latency for 3,850 MB is approximately 0.05 seconds. However, this write latency will likely be greater and is thus conservatively designed for 1 second as shown in FIGS. 3J-3N. This write process is repeated until AME closure-window events are detected (3f). As illustrated in FIGS. 3E & 3O-3S, upon detecting AME closure-window events, the now labeled input features from the training set are written (3h) to a third plurality of persistent, electronic storage media 4010, 4110 and 4210. The write latency for a volume of 3,850 MB is approximately 1.07 seconds but this embodiment conservatively designs for 2 seconds.

Figure 3F:
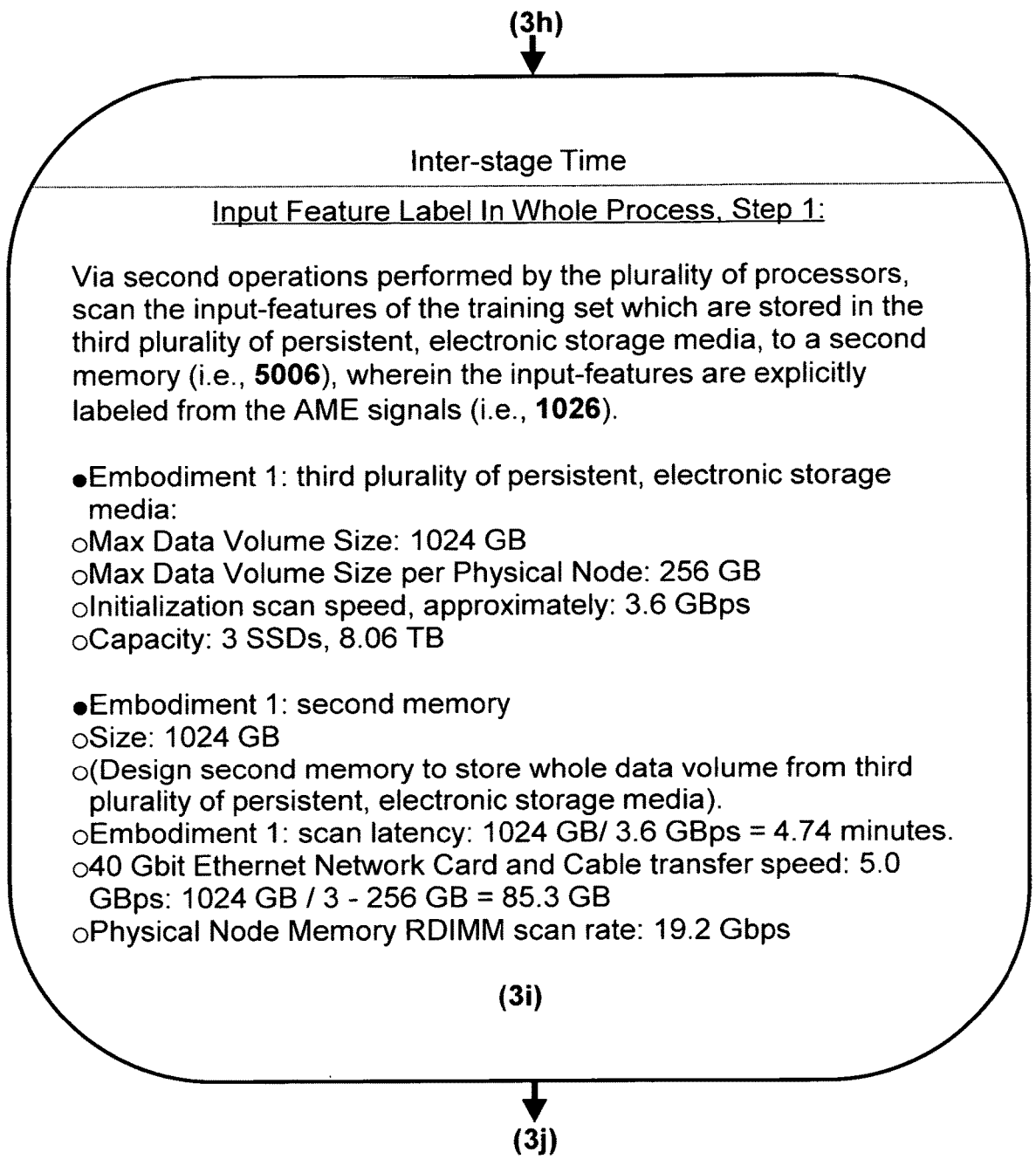
Figure 3H:
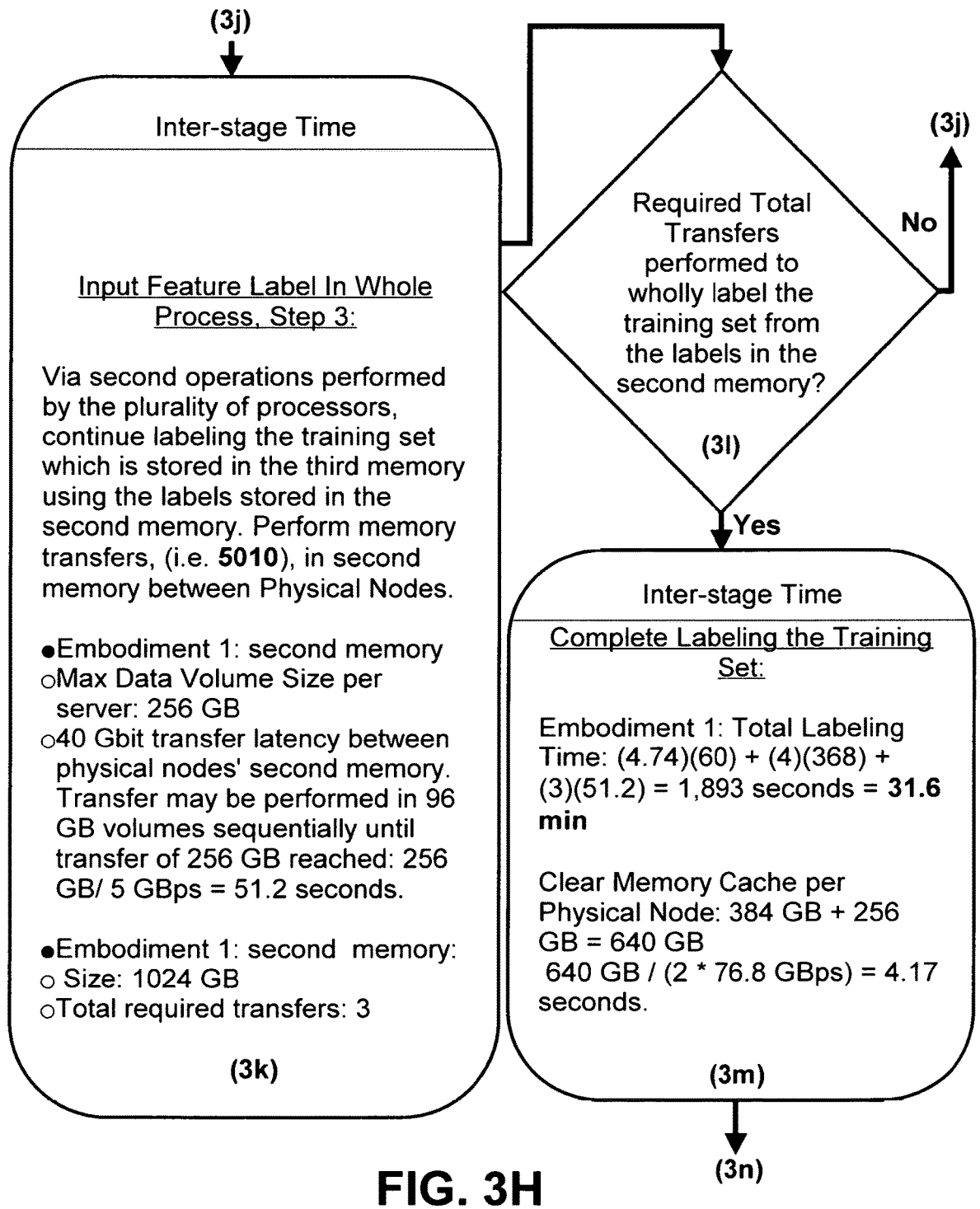
Figure 3J:
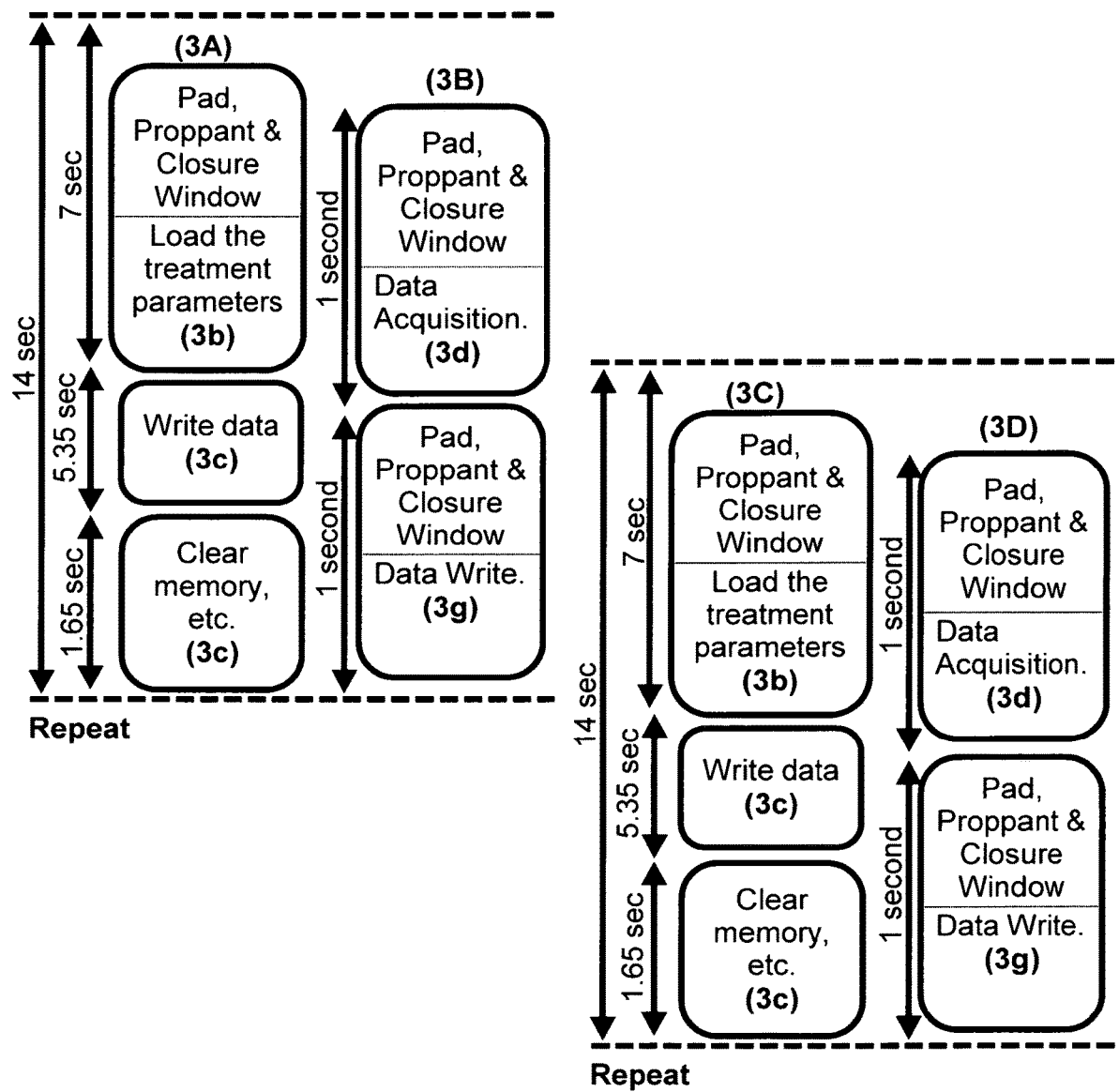
Figure 3K:
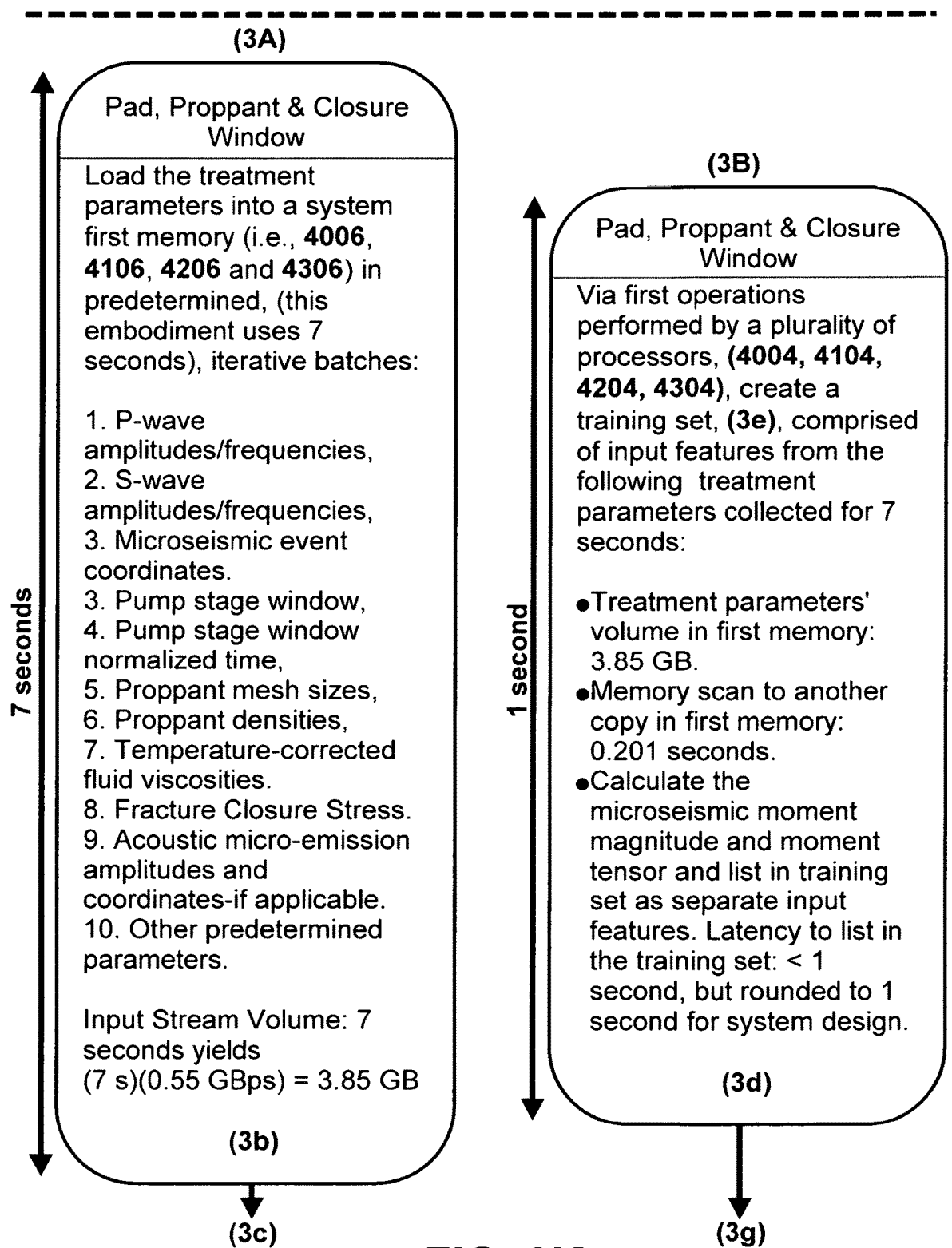
Figure 4A:
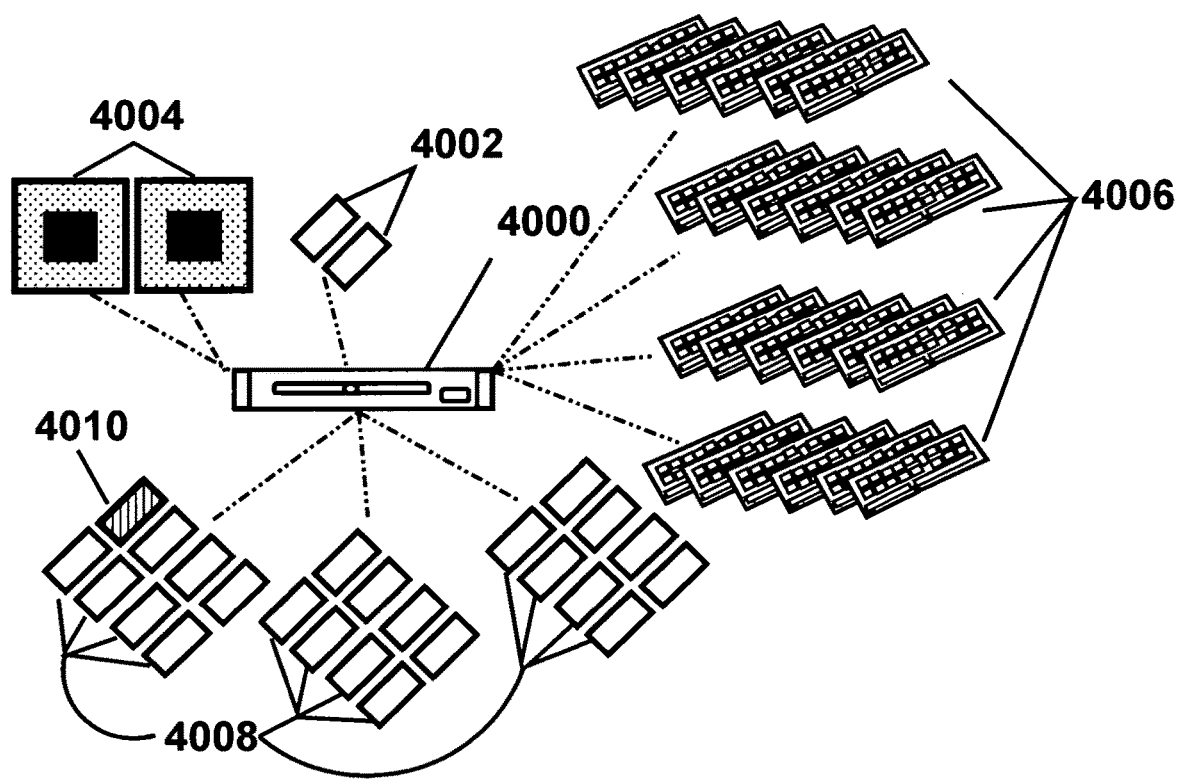
FIGS. 4A & 4B illustrate hardware included in the first embodiment for each of the physical nodes.
Figure 4A:
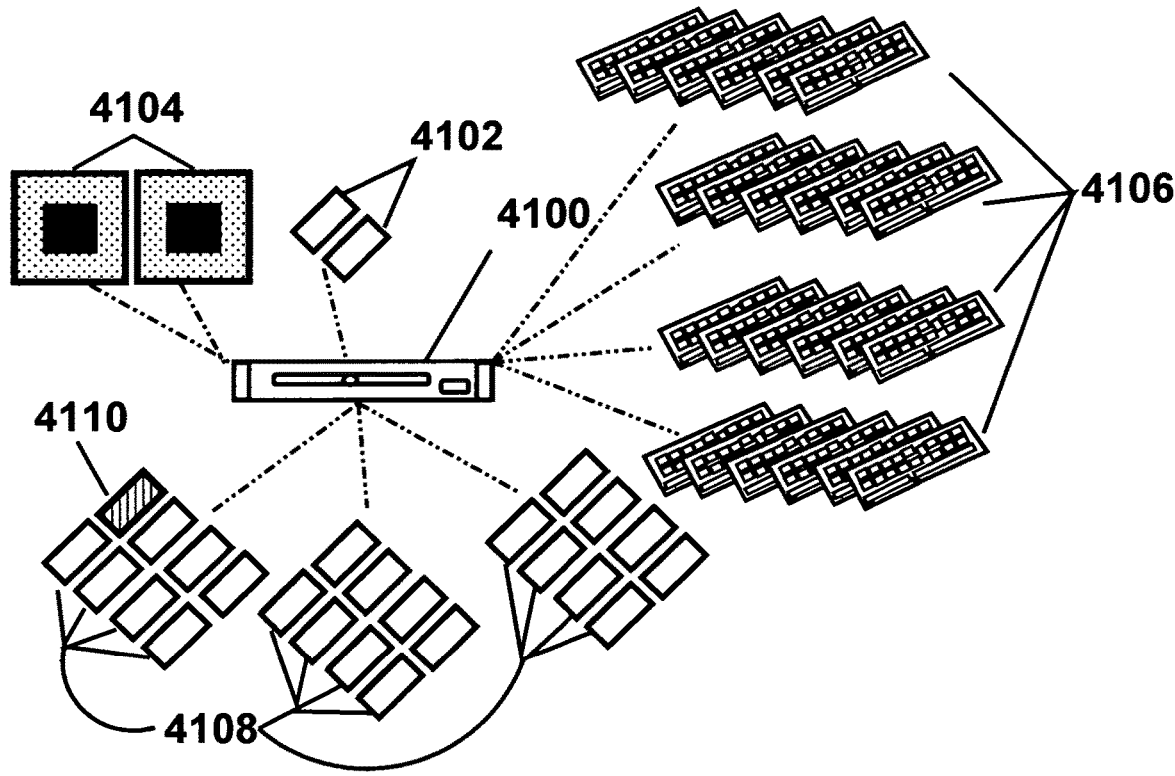
Figure 4B:
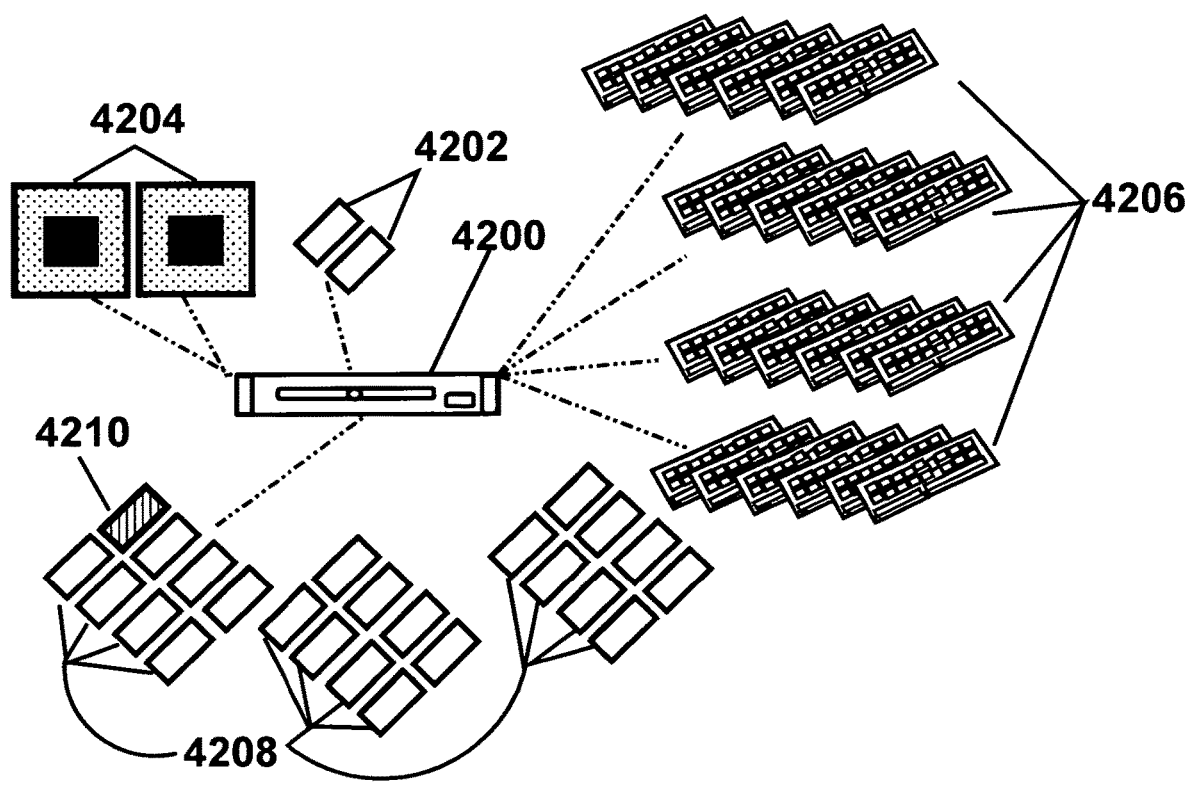
Figure 4B:
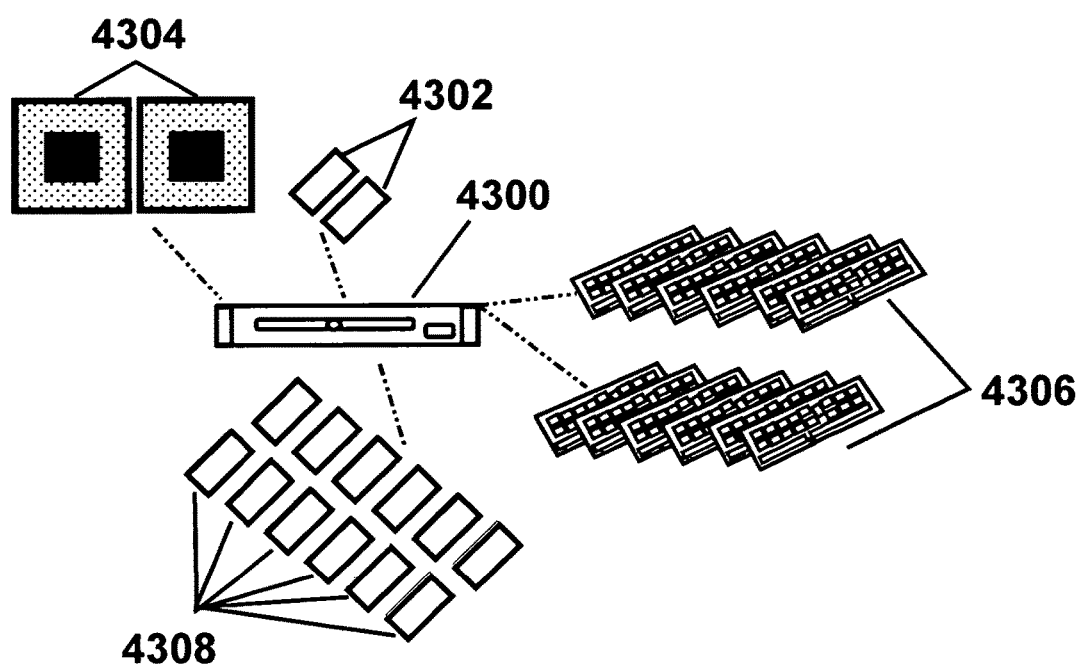
Figure 5:
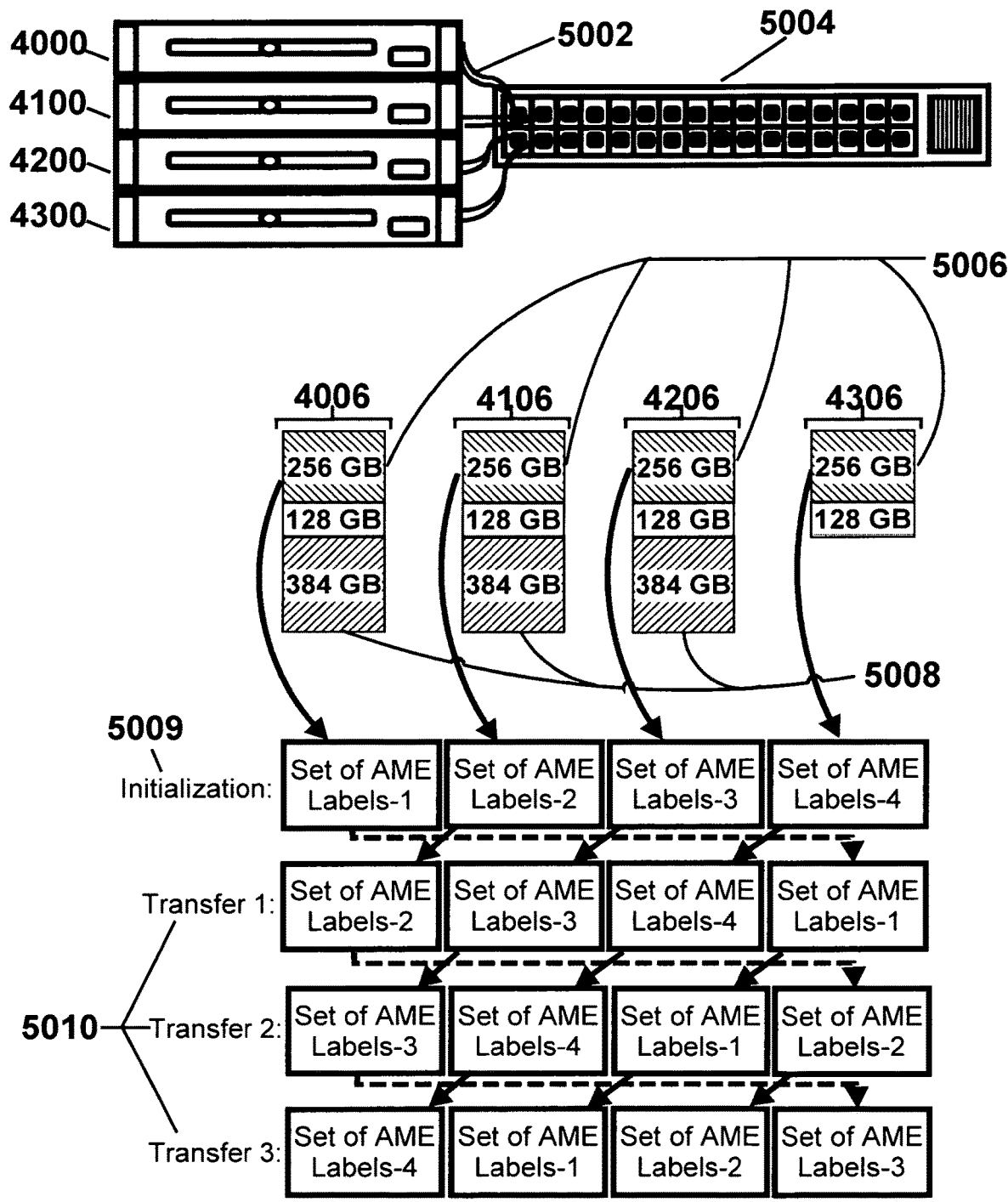
FIG. 5 illustrates the first embodiment's memory transfer process wherein labeled input features are transferred to other nodes within a second memory in order to label input features scanned from a second plurality of persistent, electronic storage media to the third memory.

In interstage time, shown in FIGS. 3F-3H, second operations performed by the plurality of processors scan (3i) the labeled input features of the training set stored in the third plurality of electronic storage media to a second memory 5006 (FIG. 5), wherein the input features are explicitly labeled from the AME signals 1028 (FIG. 1A). The 3 SSDs 4010, 4110 and 4210 (in FIGS. 4A & 4B) comprising the third plurality of persistent, electronic storage media have a combined sequential scan rate of approximately 3.6 GBps. This embodiment is designed to scan approximately 768 GB of AME-labeled input features from these three disks to the second memory of physical nodes 1-3 4000, 4100 and 4200. The remaining 256 GB is simultaneously transported into the registered memory of physical node 4, 4300 from the registered memory of physical nodes 1-3 4000, 4100 and 4200 via the 40 Gbps or greater network cables 5002 and switch 5004 as illustrated in FIG. 5. The 3.6 GBps is the bottleneck of step (3*i*) and yields a scan latency of approximately 4.74 minutes for a total of 1024 GB of AME-labeled input features or labels.

Continuing second operations in step (3*j*), this embodiment is designed to label 10 TB of unlabeled input features stored in the second plurality of persistent, electronic storage media 4008, 4108 and 4208. Illustrated in FIG. 5, in this embodiment, the input features are scanned to a third memory 5008 comprised of memory modules on physical nodes 1-3. The 10, 240 GB volume collected from the microseisms measured during the three windows is stored as 3,413 GB per node and requires approximately 8.9 scans into the 384 GB per node until the full 10 TB volume is labeled in whole. On a per node basis, the sequential scan rate of 23 SSDs is approximately 27.6 GBps yielding a scan latency of 13.9 seconds for 384 GB. The approximate CPU time for 384 GB is estimated as 10 seconds for the dual processors which have a max memory bandwidth of 76.8 GBps.

The labeled 384 GB volumes are then written over their corresponding unlabeled volumes adding an additional latency of 17.4 seconds. Thus, the Total Scan 1 cycle: 13.9+10+17.4=41.3 seconds. And at 8.9 scans, the 3,413 GB volumes on nodes 1-3 have been partially labeled: (8.9)* (41.3 seconds)=368 seconds. Initialization 5009 (FIG. 5) has now been completed. This embodiment is more write intensive than the other embodiments that perform more transfers in the second memory.

After Initialization 5009 in step (3*i*) (FIGS. 3F, 3G & 5), Memory transfers 5010 within the second memory are performed as illustrated. In this embodiment, there are a total of three memory transfers, wherein the input features stored in the second memory of one physical node are stored onto another. The number of required memory transfers depends, but is not limited to, the size of the second memory allotted on each physical node. AME-labeled input features or "AME-labels" as shown in FIG. 5, are transferred between the nodes via said network cables 5002 and said switch 5004 at 5 GBps. Thus, the transfer latency for one memory transfer is 256 GB/5 GBps=51.2 seconds. In decision (3*l*), FIG. 3H, the embodiment loops to continue labeling the input features from the second plurality of persistent, electronic storage media. In total, for a 10 TB volume of unlabeled input features written to the second plurality of persistent, electronic storage media, and a 1 TB volume of AME-labeled input features (3*m*): (4.74)*(60)+ (4)(368)+(3)(51.2)=1,893 seconds=31.6 minutes.

Figure 3L:
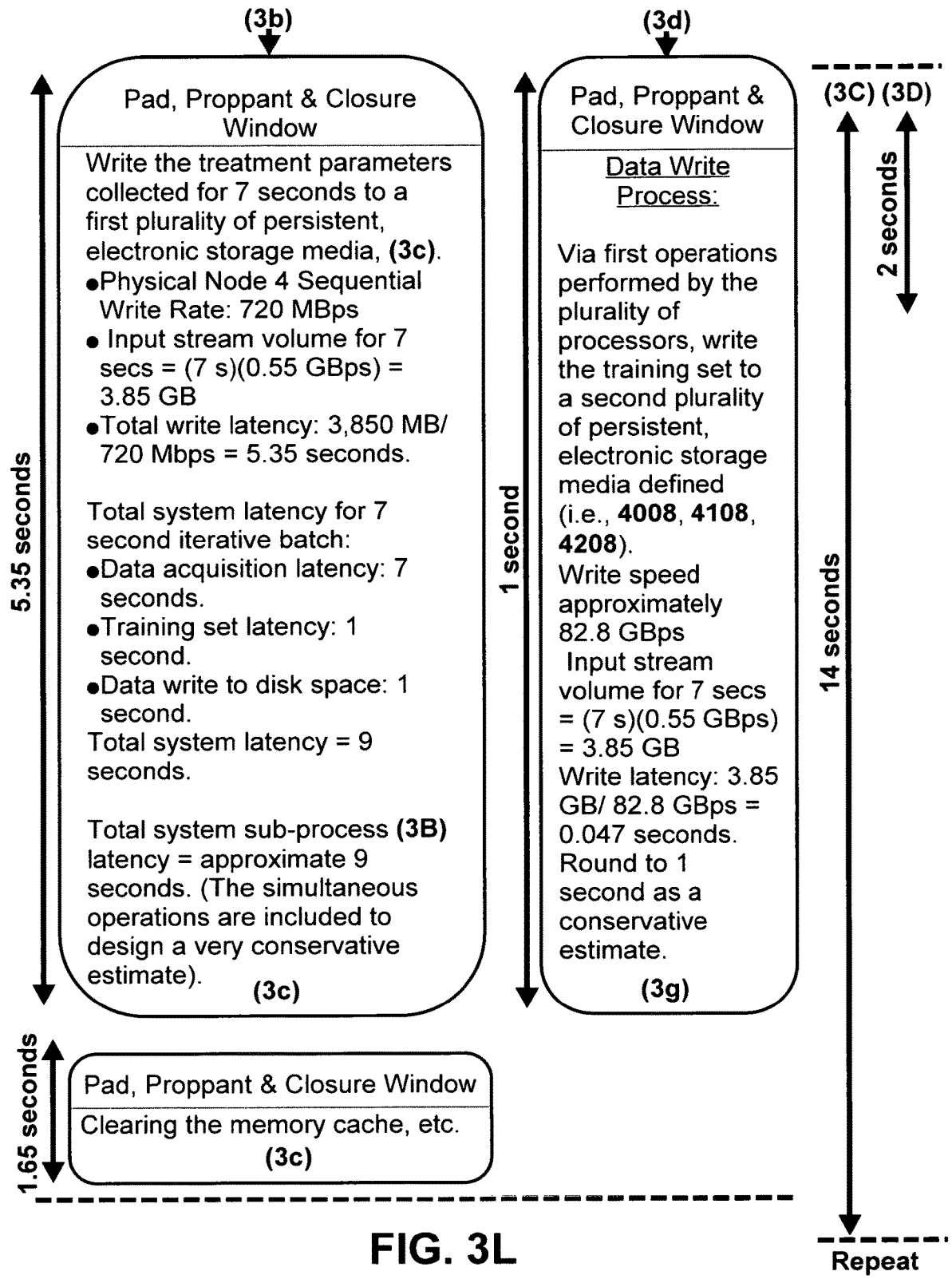
Figure 3M:
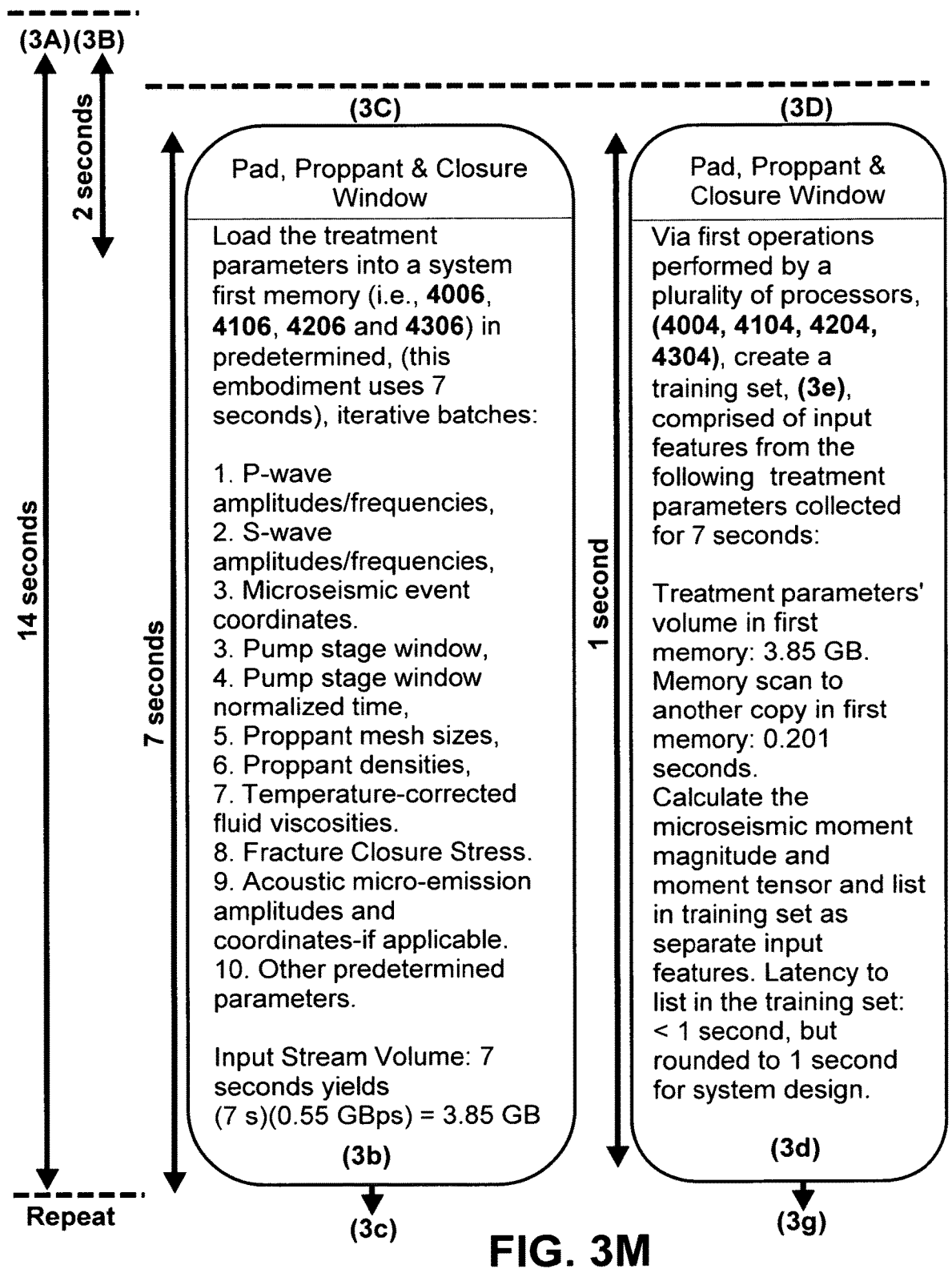
Figure 3N:
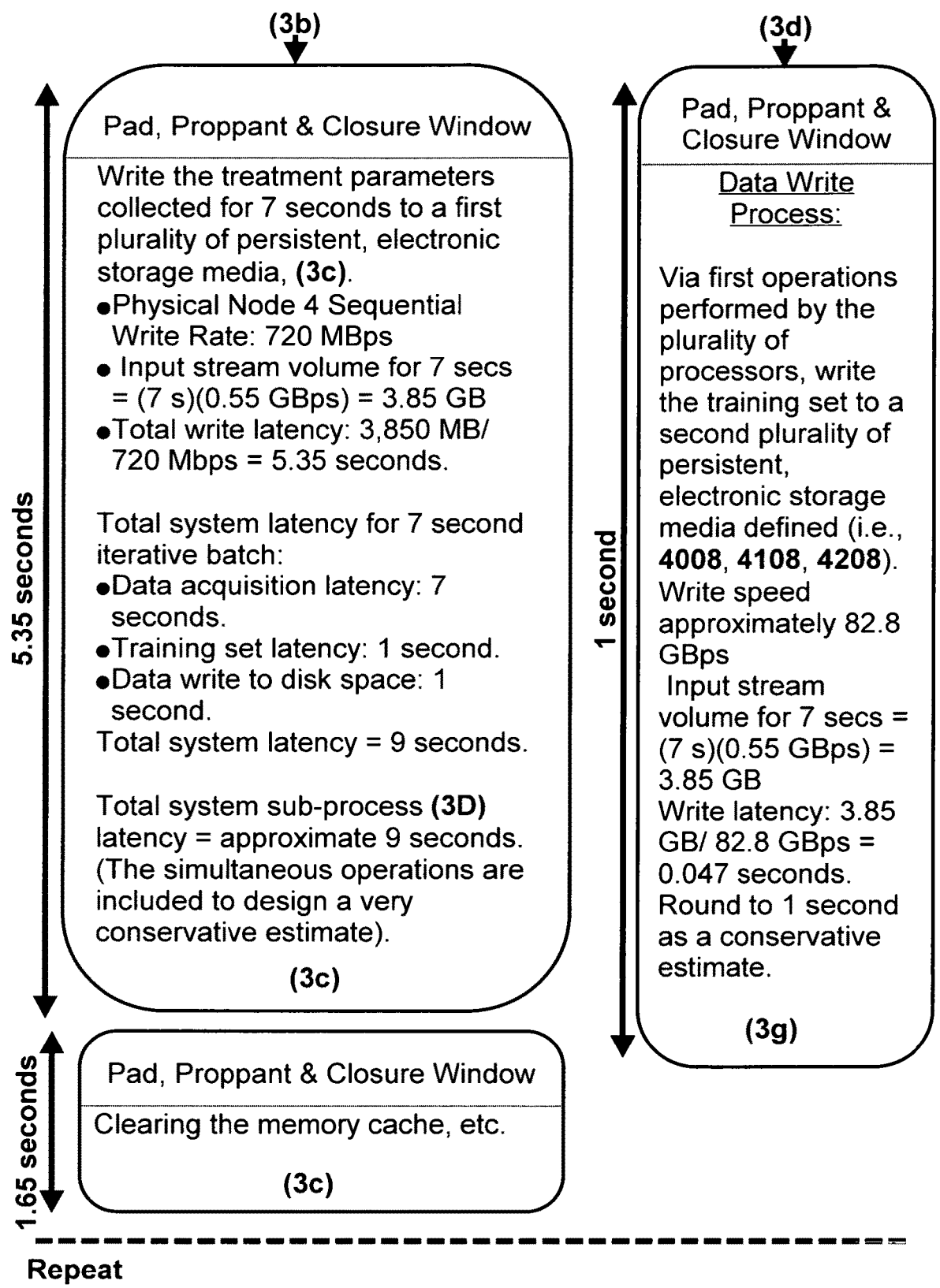
Figure 3O:
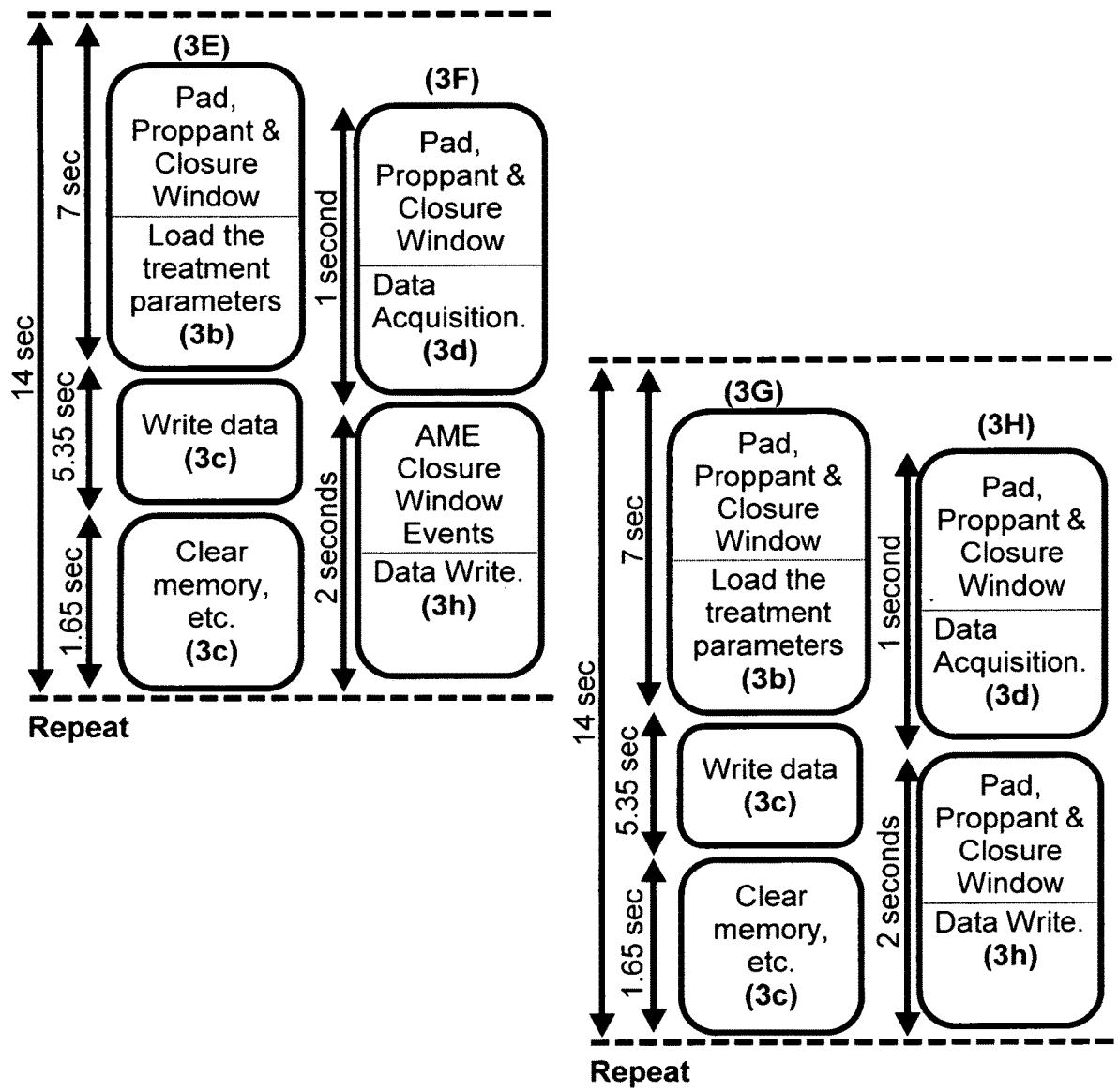
Figure 3P:
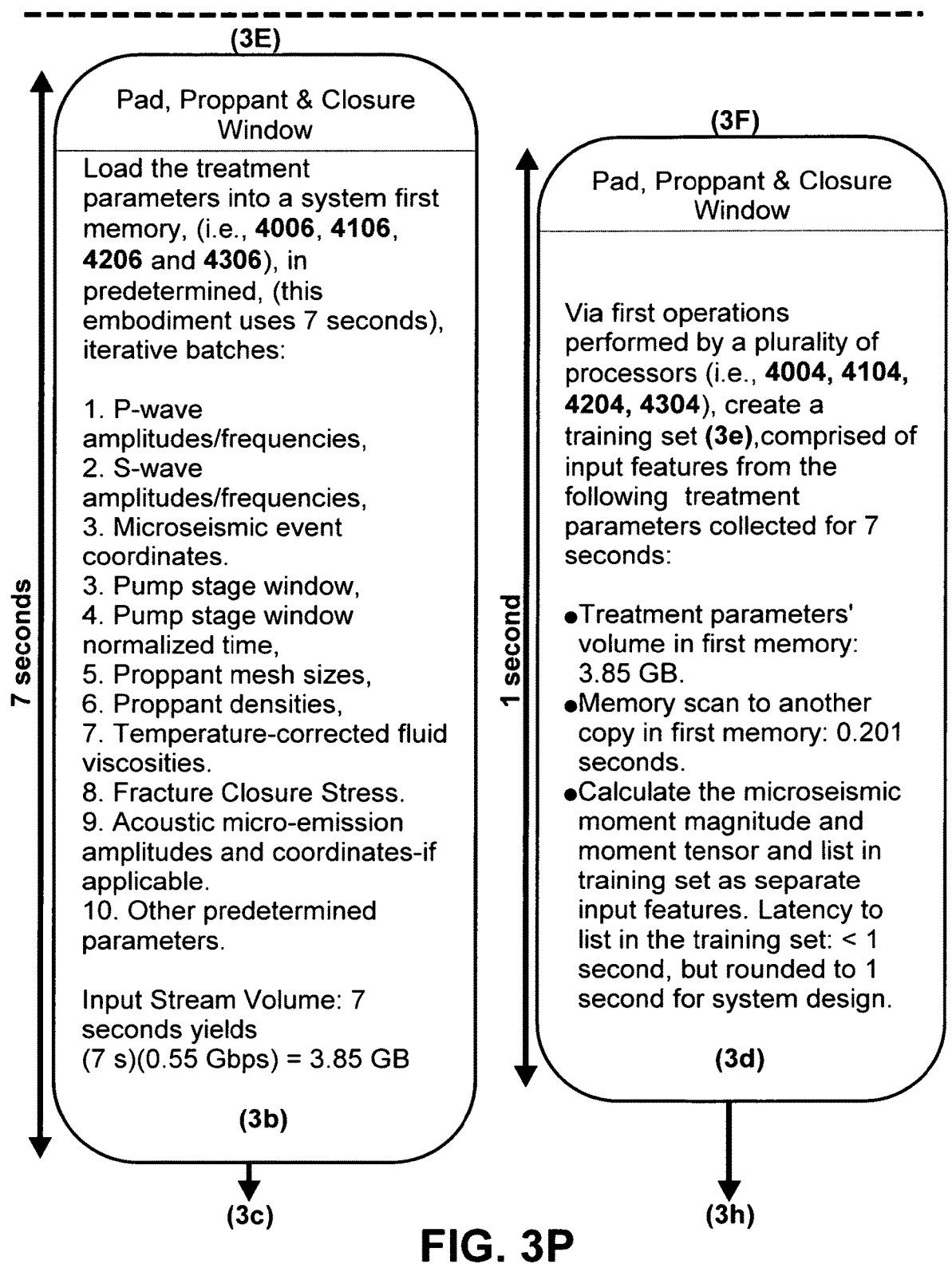
Figure 3Q:
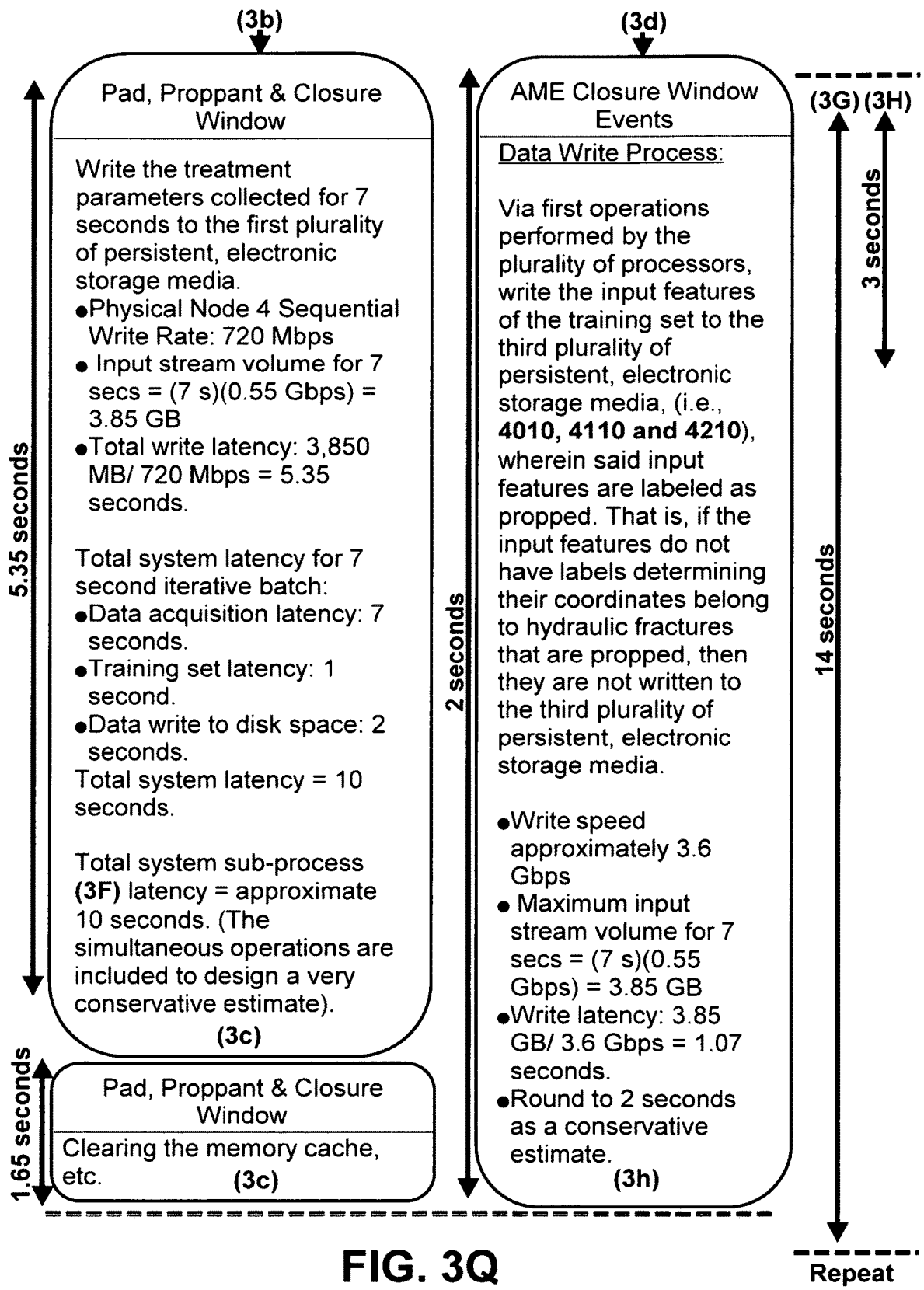
Figure 3R:
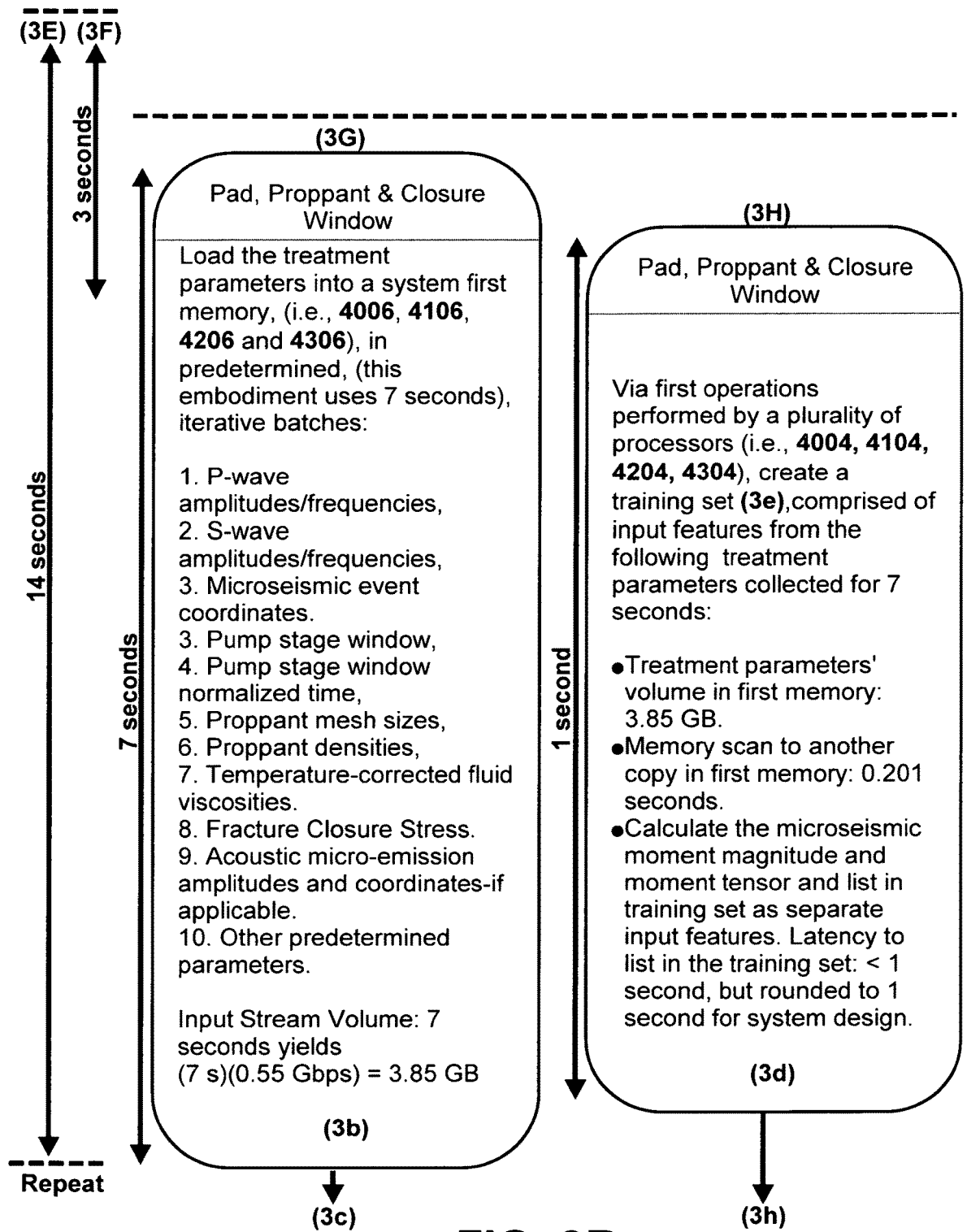
Figure 3S:
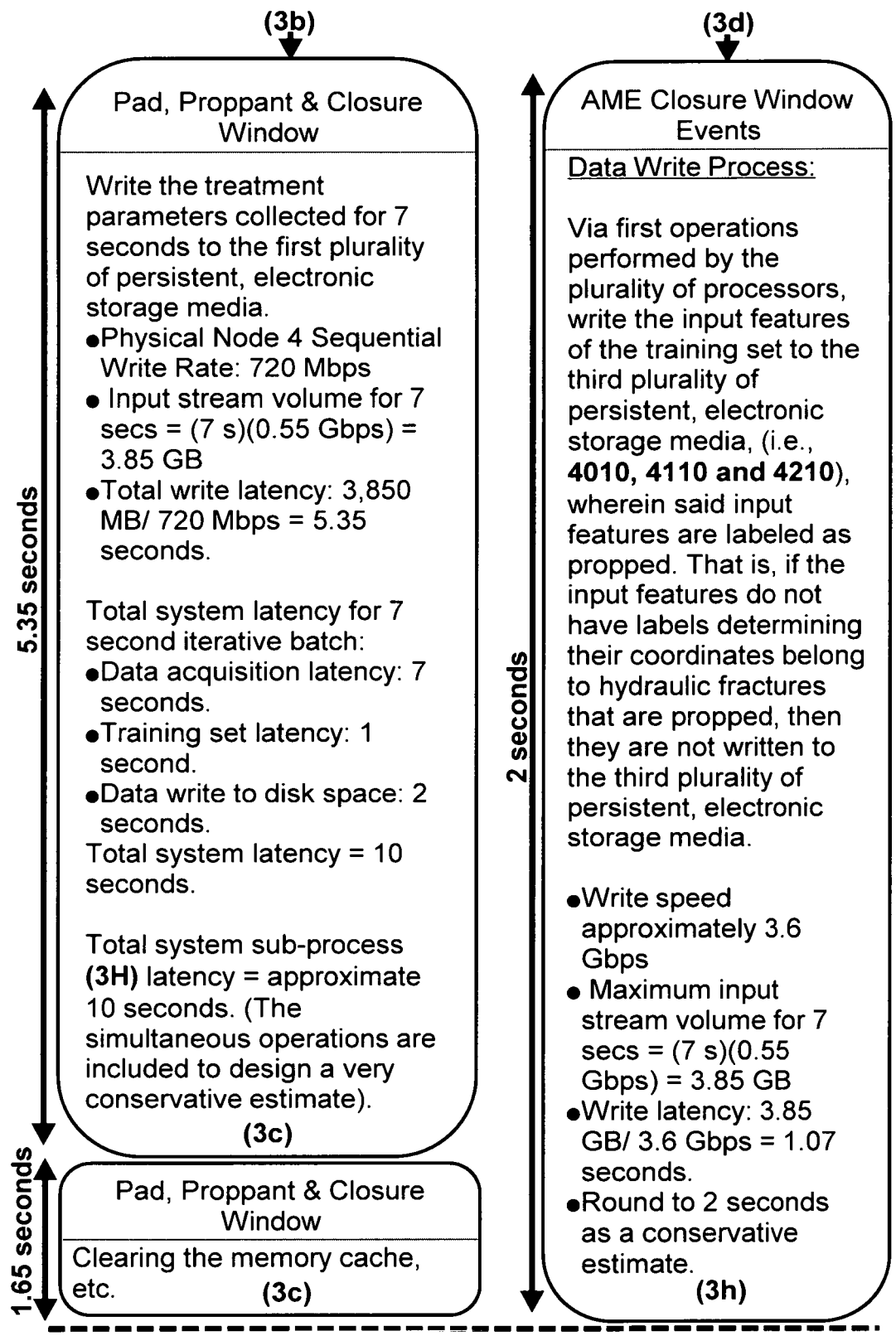

Shown in FIG. 3*l*, upon completion of step (3*m*), the entire training set is labeled and may be trained in step (3*n*) using predetermined hypotheses models, optimization methodologies and testing protocols that are well-known, tested and publicized in the public domain or available as commercial alternatives. Upon training machine learning algorithms from the labeled training set, the machine learning process can be used to map the next stage(s) propped fracture dimensions in real-time from the stage(s) input features, enabling real-time conditional testing and optimization of the propped fracture network and dimensions. Stage spacing, pump volumes, fluid viscosity, proppant density, pump rate and so forth may be tested and their effect on the propped fracture dimensions thereby visualized 2004 (FIG. 3B).

Detailed Description—Second Embodiment

Figure 6A:
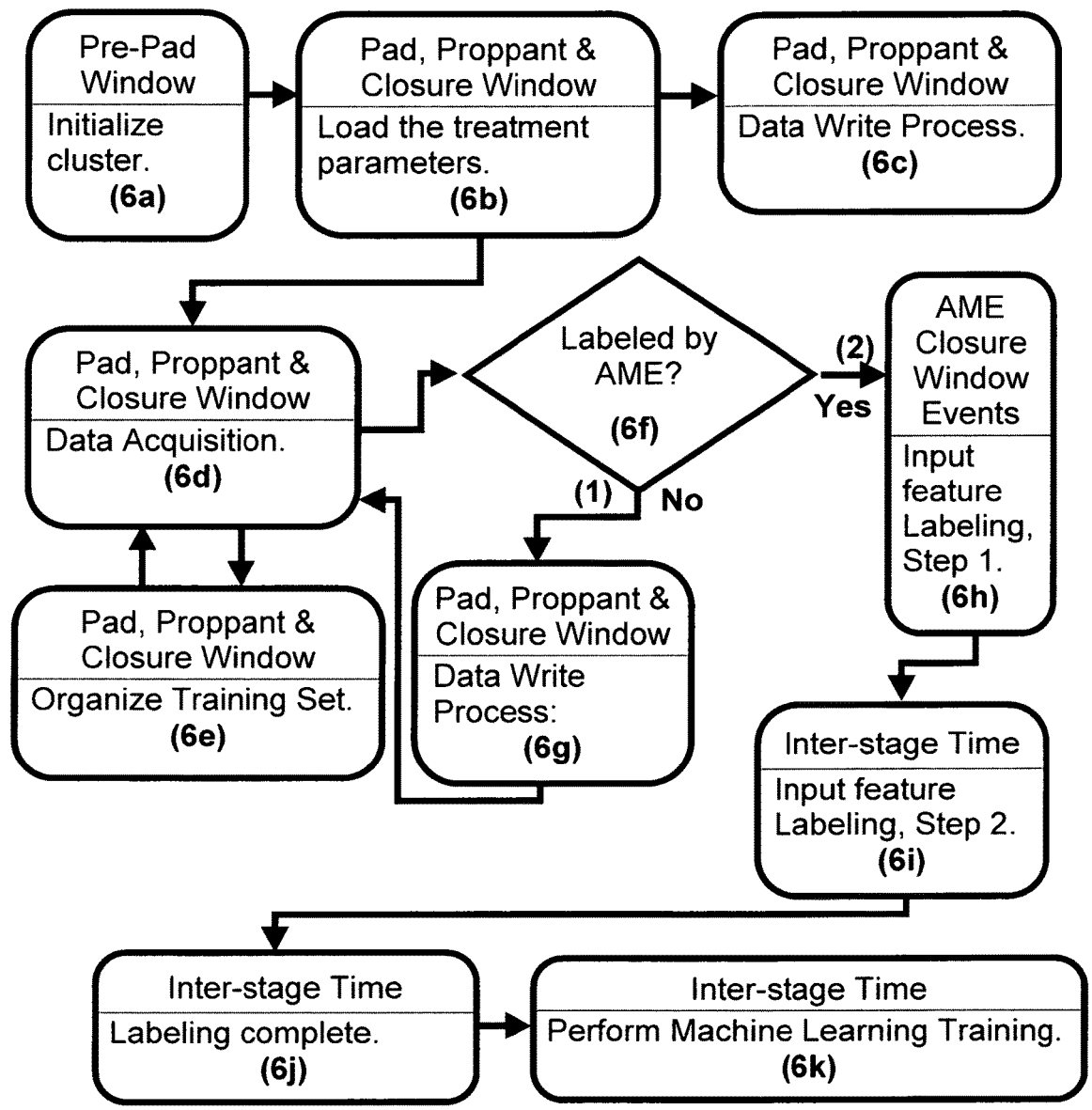

FIG. 6A presents a small-scale view of FIGS. 6B-6H. This embodiment includes a system (FIG. 6B) comprised of four physical compute nodes 7000, 7100, 7200 and 7300, a networking switch and other hardware which have the structure of or closely similar to the following described hardware manufactured by Dell® and other manufacturers. Three Dell R930 servers and one Dell® R730XD server are defined as the four physical nodes illustrated in FIGS. 7A & 7B.

The first three physical nodes (nodes) are each comprised of a server chassis 7000, 7100 and 7200 with (Quantity 24) 2.5-in drive slots and 8930 PCIe Risers with up to (Quantity 2), x4 and up to (Quantity 2), x8 Gen 3 PCIe Slots. The (Quantity 24) drive slots each contain a Dell®, 2.5-in, 3.84 TB Solid State Drive SAS Mix Use MLC 12 Gbps Hot-plug drive. Each of these (Quantity 72) drives have an approximate sequential scan rate of 1.2 GBps and all (Quantity 72) of these drives comprise a second plurality of persistent, electronic storage media 7008, 7108 and 7208. The R930 PCIe Risers' (Quantity 2), x4 Gen 3 PCIe Slots are filled with (Quantity 2) Dell 1.6 TB, NVMe, Mixed Use Express Flash, HHHL PCIe Cards 7002, 7102 and 7202. System configuration files and protocols are stored on these PCIe cards. The three nodes each have (Quantity 4) Intel Xeon E7-8890 v4 CPUs 7004, 7104 and 7204 with the following specifications: 2.2 GHz, 60M Cache, 9.6 GT/s QPI 24C/48T, HT, Turbo (165W) DDR4 1:1 MaxMem 1866 Hz. Nodes 1-3 7000, 7100 and 7200 each have 3,072 GB of registered memory, specifically (Quantity 96) 32 GB RDIMM, 2400 MT/s, Dual Rank, x4 Data Width 7006, 7106 and 7206.

The fourth physical node is comprised of a server chassis 7300 with (Quantity 12) 3.5-in drive slots and (Quantity 2) 2.5-in system drive slots. The (Quantity 12) drive slots each contain a Dell, 3.5-in, 10 TB 7.2K RPM, NLSAS, 12 Gbps 512e Hot-plug Hard Drive. Each of these (Quantity 12) drives comprise the first plurality of electronic, persistent storage media 7308, and each have an approximate sequential scan rate of 60 MBps for a total sequential scan rate of 720 MBps. The system drive slots are occupied with (Quantity 2) Dell, 2.5-in, 960 GB Solid State Drive SATA Mix Use MLC 6 Gbps Flex Bay Drive 7302. The fourth node has (Quantity 2) Intel Xeon ES-2683 v4 CPUs 7304 with the following specifications: 2.1 GHz, 40M Cache, 9.60 GT/s QPI, Turbo, HT, 16C/32T (120W) Max Mem 2400 MHz. The CPUs of Nodes 1-3 7004, 7104 and 7204 comprise the plurality of processors. Also, Node 4 has 512 GB of registered memory, specifically (Quantity 16) 32 GB RDIMM, 2400 MT/s, Dual Rank, x4 Data Width 7306. Nodes 1-4 registered memory 7006, 7106, 7206 and 7306 total volume is 9,728 GB for the compute cluster.

Each of the four compute nodes have (Quantity 2) Intel XL710 Dual Port 40G, QSFP+, rNDC with SR Optics network cards and (FIG. 8) are connected by two network cables 8002 per node both having a minimum 40 Gbps or 5 GBps bandwidth. These network cables connect to a computing switch 8004 such as Mellanox SX6012 which has 12 ports, 1.3 Tbps and a link speed of 56 Gbps. The second memory 8006 is comprised of 2048 GB on each of the four compute nodes to accommodate a maximum of 2048 GB of AME closure labels with a copy on each of the three nodes. The third memory 8008 is comprised of 512 GB on each of the nodes 1-3 to accommodate a maximum of 1536 GB of unlabeled input features scanned from the second plurality of persistent, electronic storage media 7008, 7108 and 7208. Moreover, the nodes' operating systems for this embodiment is Red Hat Enterprise Linux but other professional production grade Linux distributions, (e.g. SUSE Enterprise Linux, Ubuntu LTS, etc.) may be substituted. Windows Server operating systems and other production grade alternatives may be used in other embodiments.

Operation of Second Embodiment—FIGS. 6A-6M, 7A & 7B and 8.

Figure 6B:
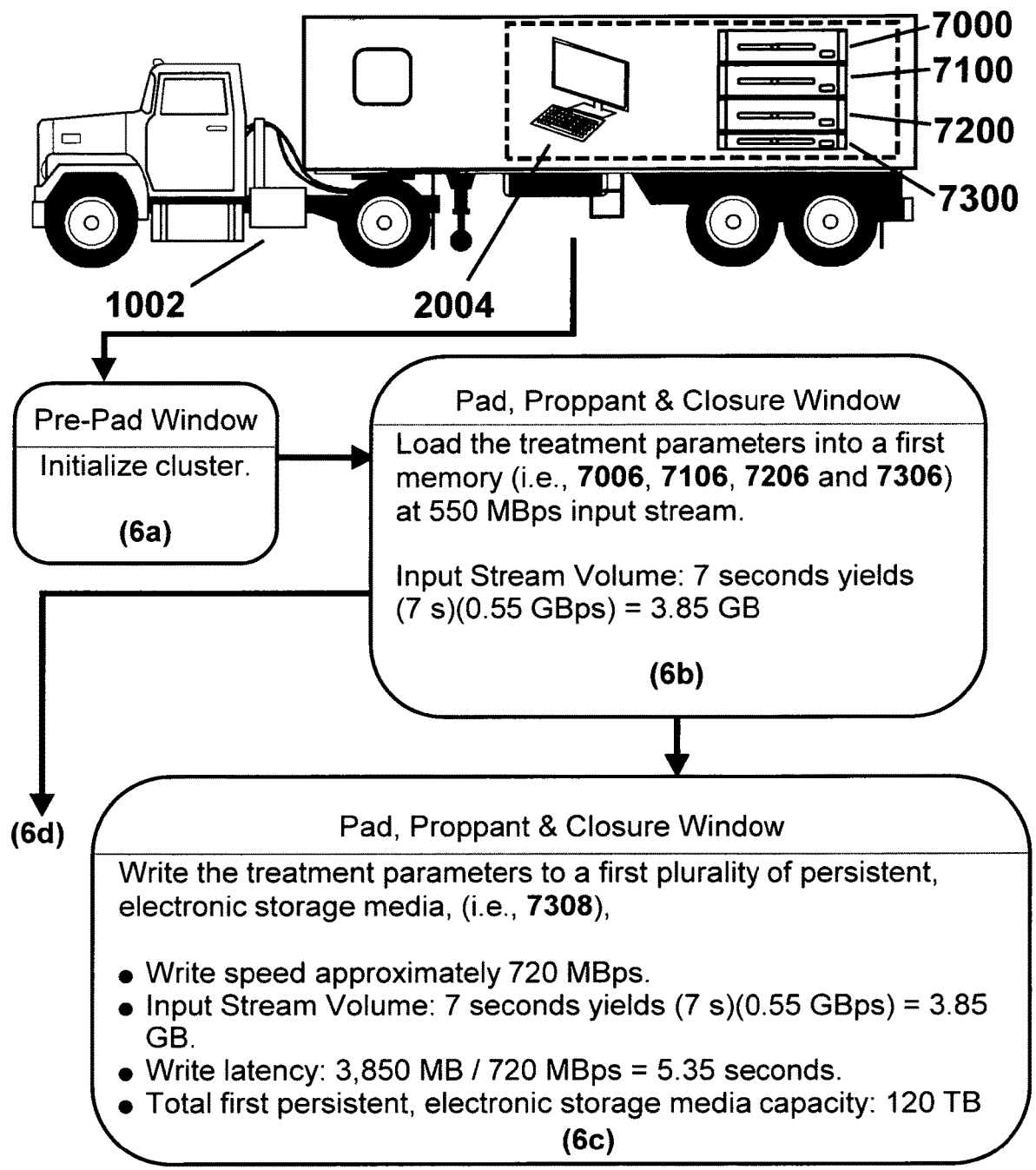
Figure 6C:
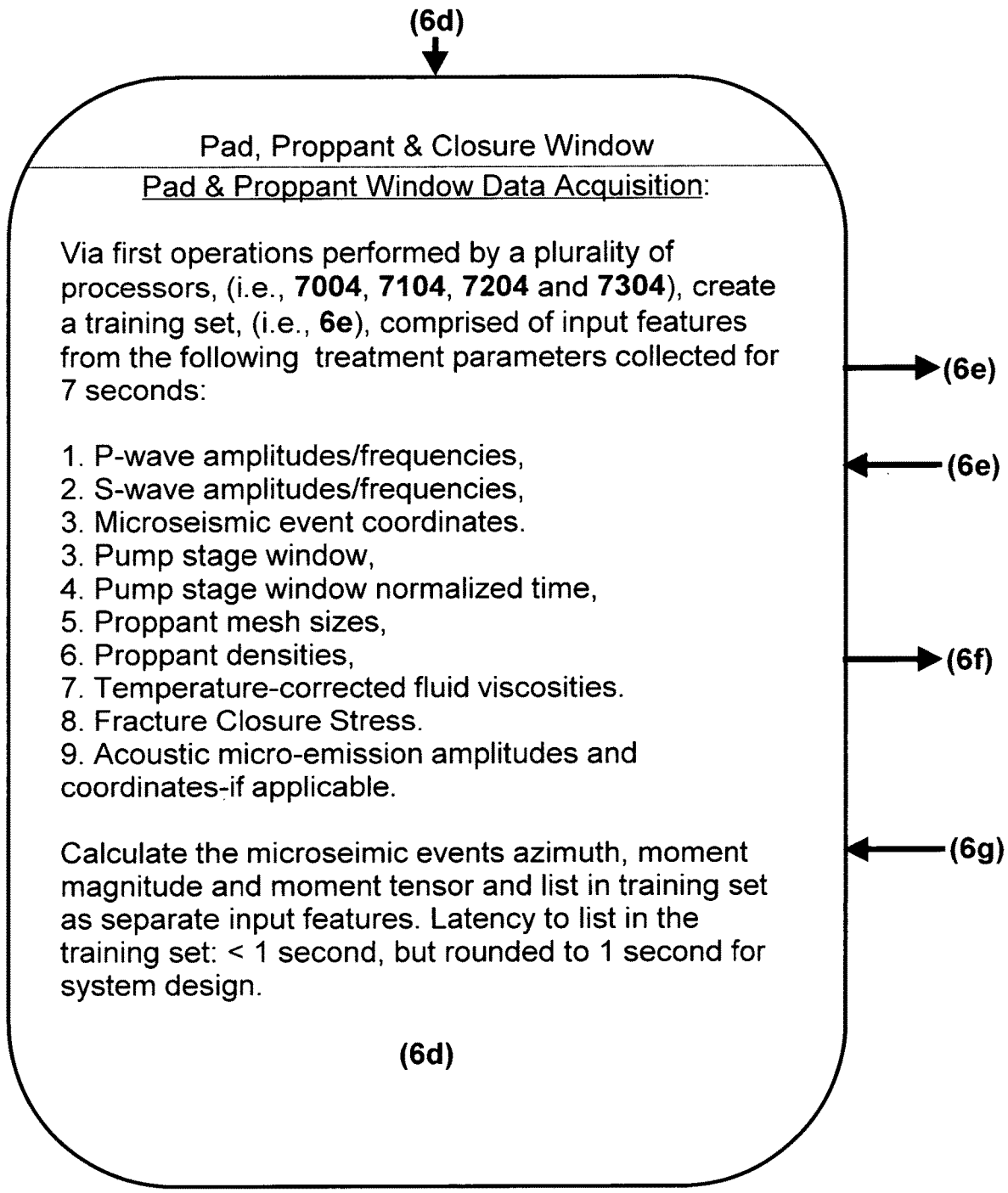
Figure 6D:
Figure 7A:
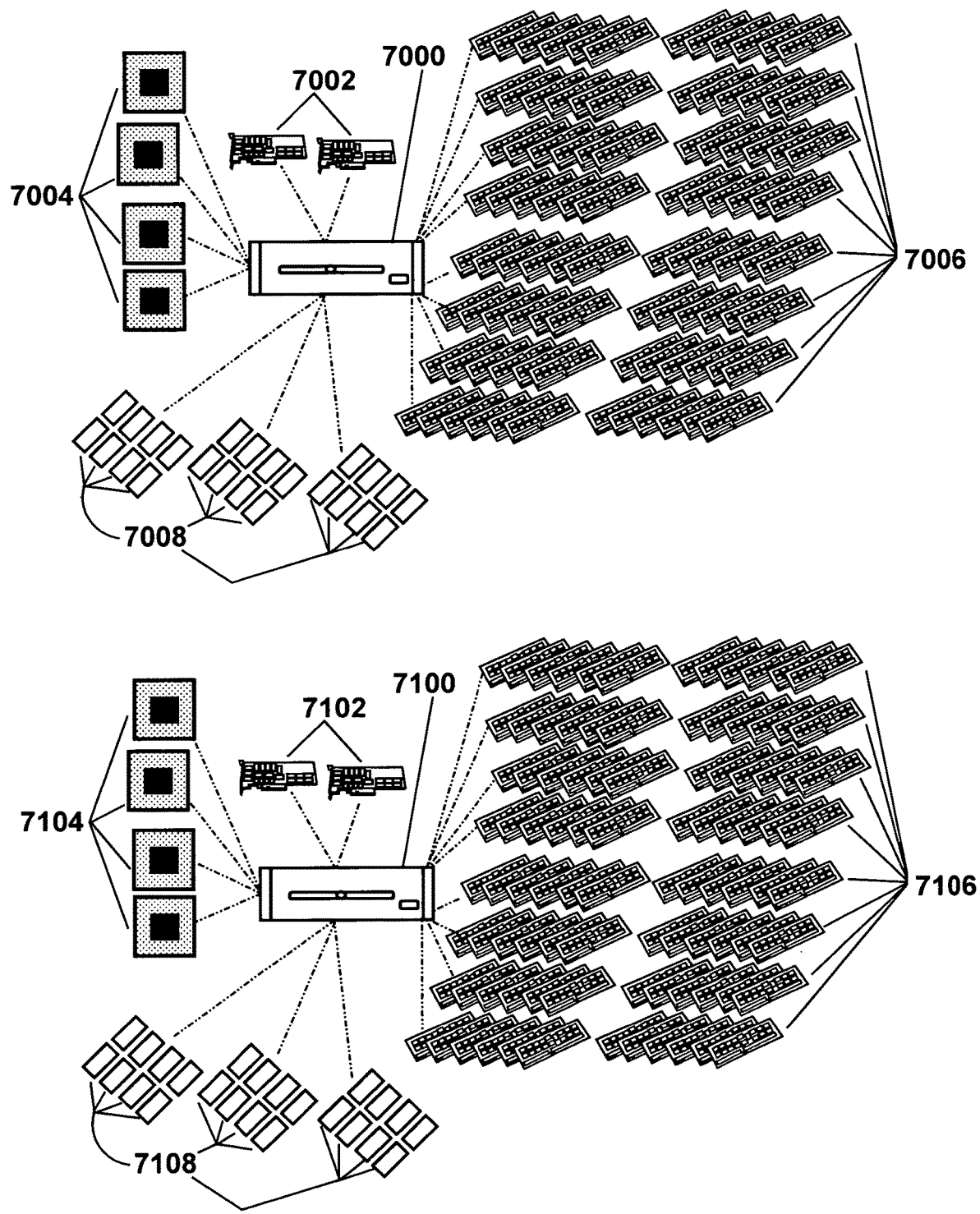
FIGS. 7A & 7B illustrate hardware included in the second embodiment for each of the physical nodes.
Figure 7B:
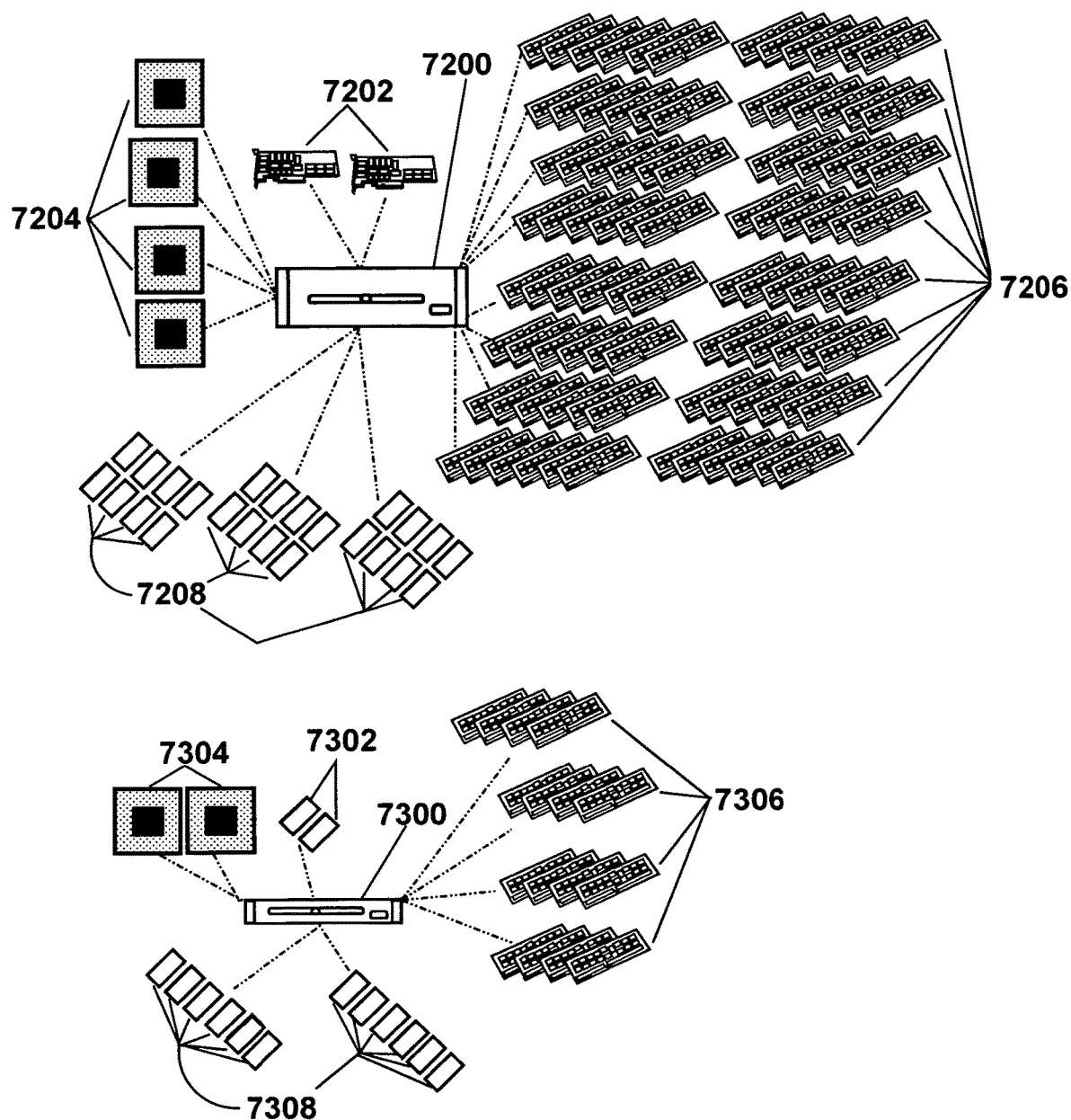

As illustrated in FIG. 6B, the cluster is first initialized (6a) ensuring the computing resources and hardware are sufficient for the job's 1) designed stage data volumes and bandwidth for the pad-, proppant- and closure-window, and 2) the data volume and bandwidth of AME closure labels. The cluster may be designed to have double the volume of data to be collected in the three windows and for the AME closure labels detected in the closure-window. This embodiment is designed for 100 TB data for the total job and a maximum of 2 TB of AME labels. At a predetermined real-time data input, (this embodiment uses 550 MBps), the treatment parameters are acquired and loaded (6b) into the system first memory which has been predetermined from the job data volume and bandwidth, provisioned and initialized in the previous step. The system first memory is comprised of registered memory provisioned from the memory modules which may include (FIGS. 7A & 7B) 7006, 7106, 7206 and 7306. This embodiment loads the treatment parameters into the system first memory in 7 second batches before the plurality of processors 7004, 7104, 7204 and 7304 perform any operations or the data is written to disk space. As illustrated in FIGS. 6B-6D, 6I-6M, the treatment parameters are loaded (6b) into the system memory at a predetermined iterative batches, (this embodiment uses 7 seconds). As the treatment parameters are loaded, first operations (6d) performed by the plurality of processors simultaneously create a training set (6e) of input features from the loaded treatment parameters. These first operations (6d) have a latency approximated to one second and are compiled predominantly from C++ and MPI source code into machine code. Upon the conclusion of step (6b), the raw treatment parameters (6c) are written to a first plurality of persistent, electronic storage media 7308 comprised of the said 12 hard disk drives with a total approximate write rate of 720 MBps which yield an approximate write latency of 5.35 seconds for the 7 second iterative batches. FIGS. 6I-6M show that once step (6b) of sub-processes (6A) and (6B) conclude step (6b) instantaneously continues in sub-processes (6C) and (6D). Thus, real-time batch processing of the treatment parameters is performed as defined by this schema. Moreover, sub-processes may use 1000 instead of 1024 to convert MBps to GBps and so forth for simplicity.

FIGS. 6B-6D & 6I-6M show that this embodiment calculates the microseismic moment magnitude, microseismic events azimuth and moment tensor of the microseisms (6d). The training set input features and labels of this embodiment share the same definitions, classification protocols and calculation procedures as the first embodiment's operation.

Figure 6E:
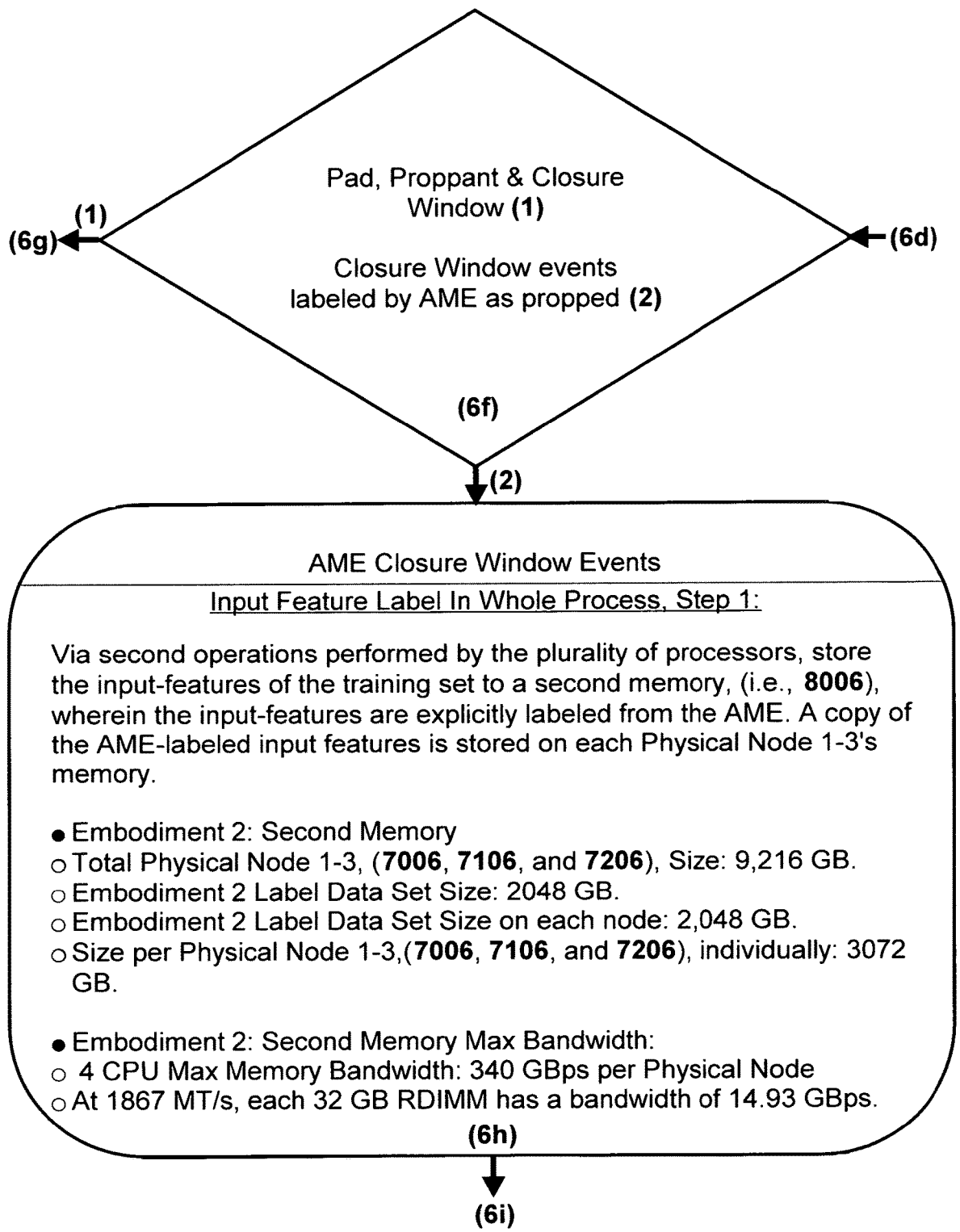
Figure 8:
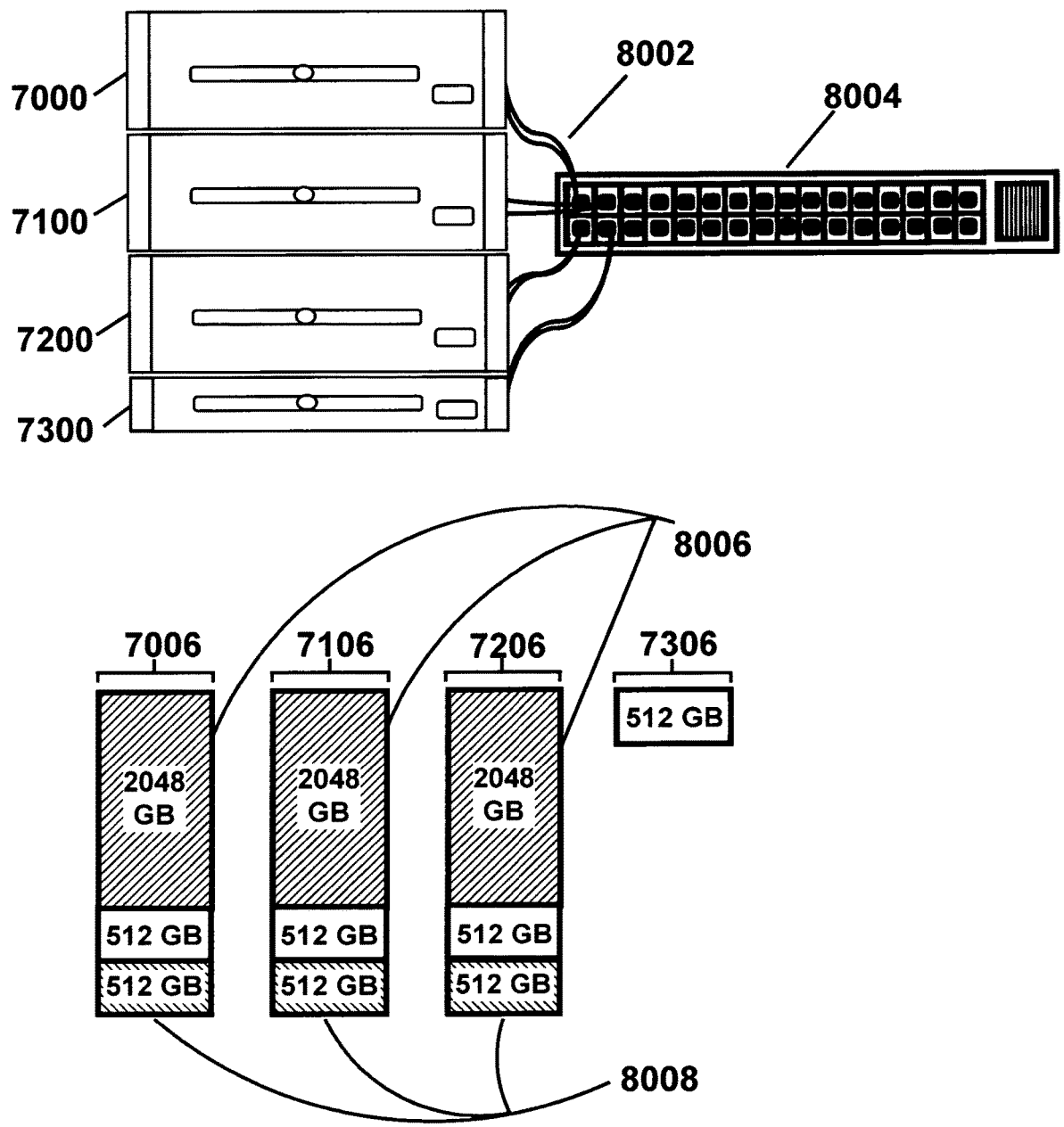
FIG. 8 illustrates the second embodiment's second memory and third memory wherein a copy of all the labeled input features are stored on the first three physical nodes within the second memory, and unlabeled input features are scanned from a second plurality of persistent, electronic storage media to the third memory to be labeled.

FIGS. 6B-6D & 6I-6M also illustrate that the training set (6e) created in step (6d) by first operations by the plurality of processors are written (6g) from the first memory to a second plurality of persistent, electronic storage media 7008, 7108 and 7208. The second plurality of persistent, electronic storage media has an approximate write rate of 86.4 GBps determined from an approximate write rate of 1.2 GBps per SSD; thus, step (6g)'s write latency for 3,850 MB is approximately 0.05 seconds. However, this write latency will likely be greater and is thus conservatively designed for 1 second as shown in FIGS. 6I-6M. This write process is repeated until AME closure-window events are detected (6f). As illustrated in FIGS. 6E & 8, upon detecting AME closure-window events, the AME-labeled input features from the training set are stored (6h) to a second memory 8006.

Figure 6F:
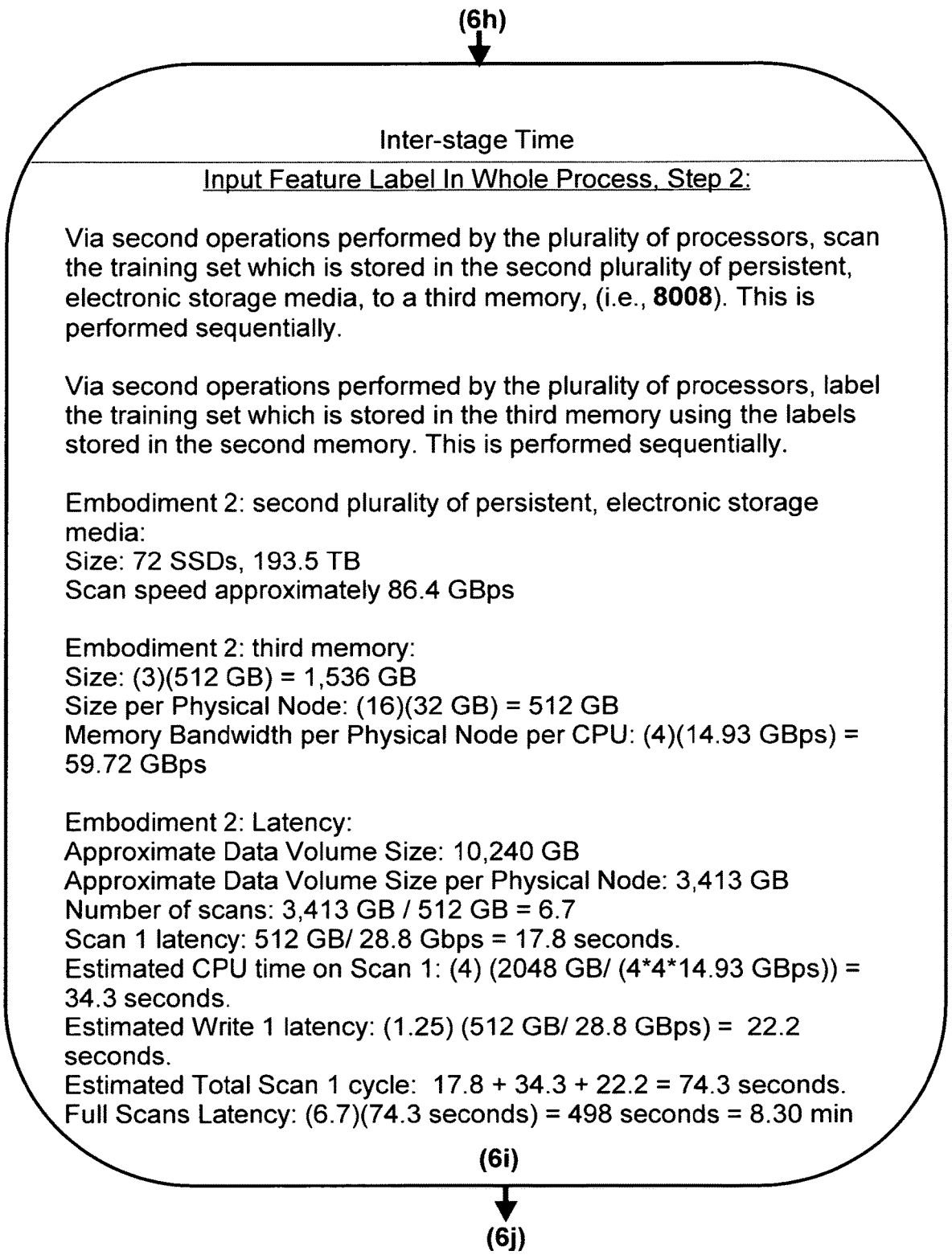
Figure 6G:
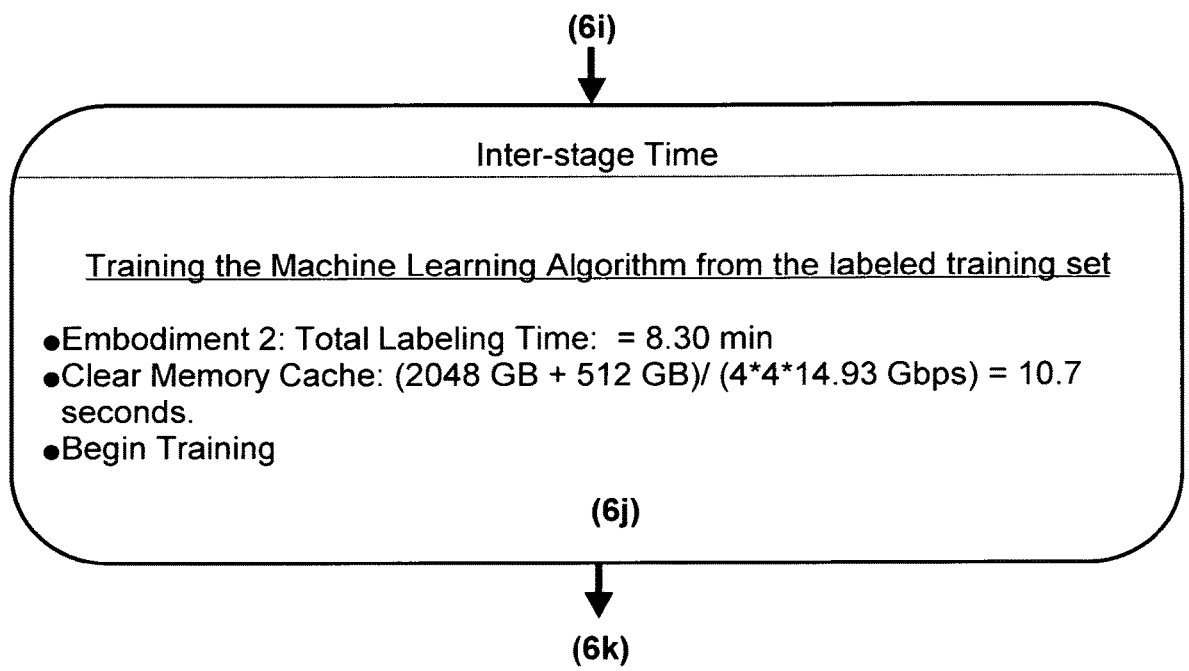
Figure 6I:
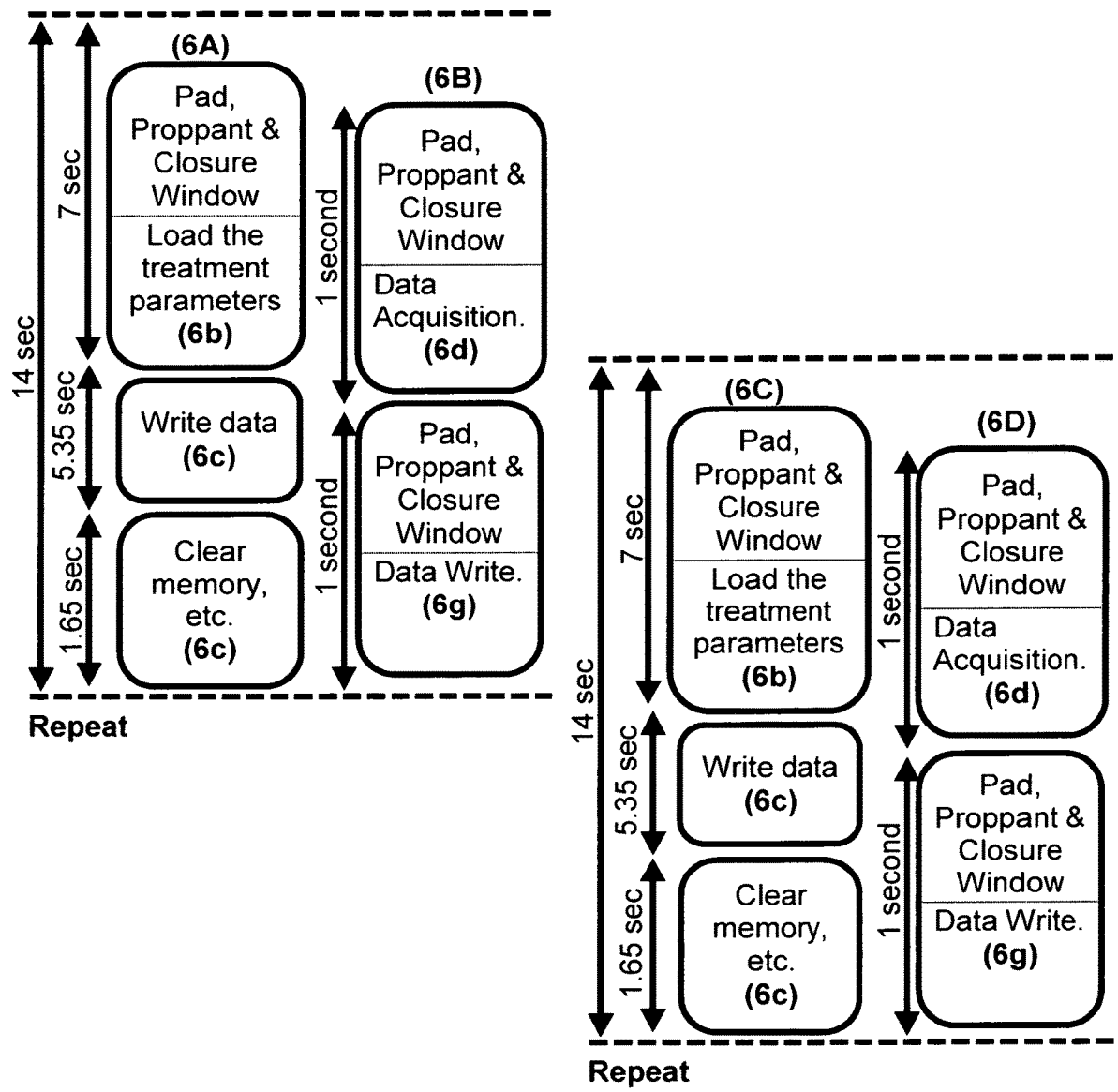
Figure 6J:
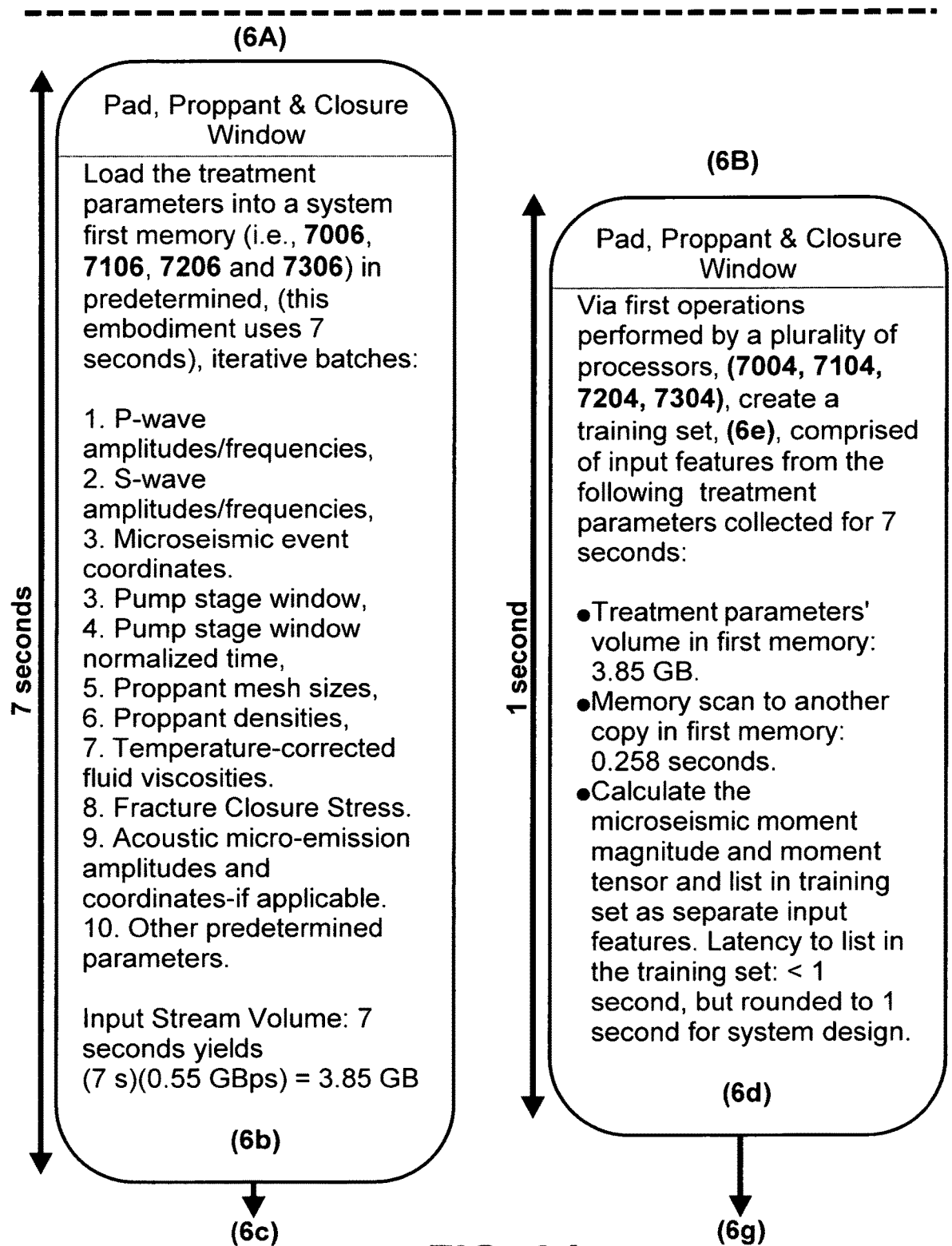
Figure 6K:
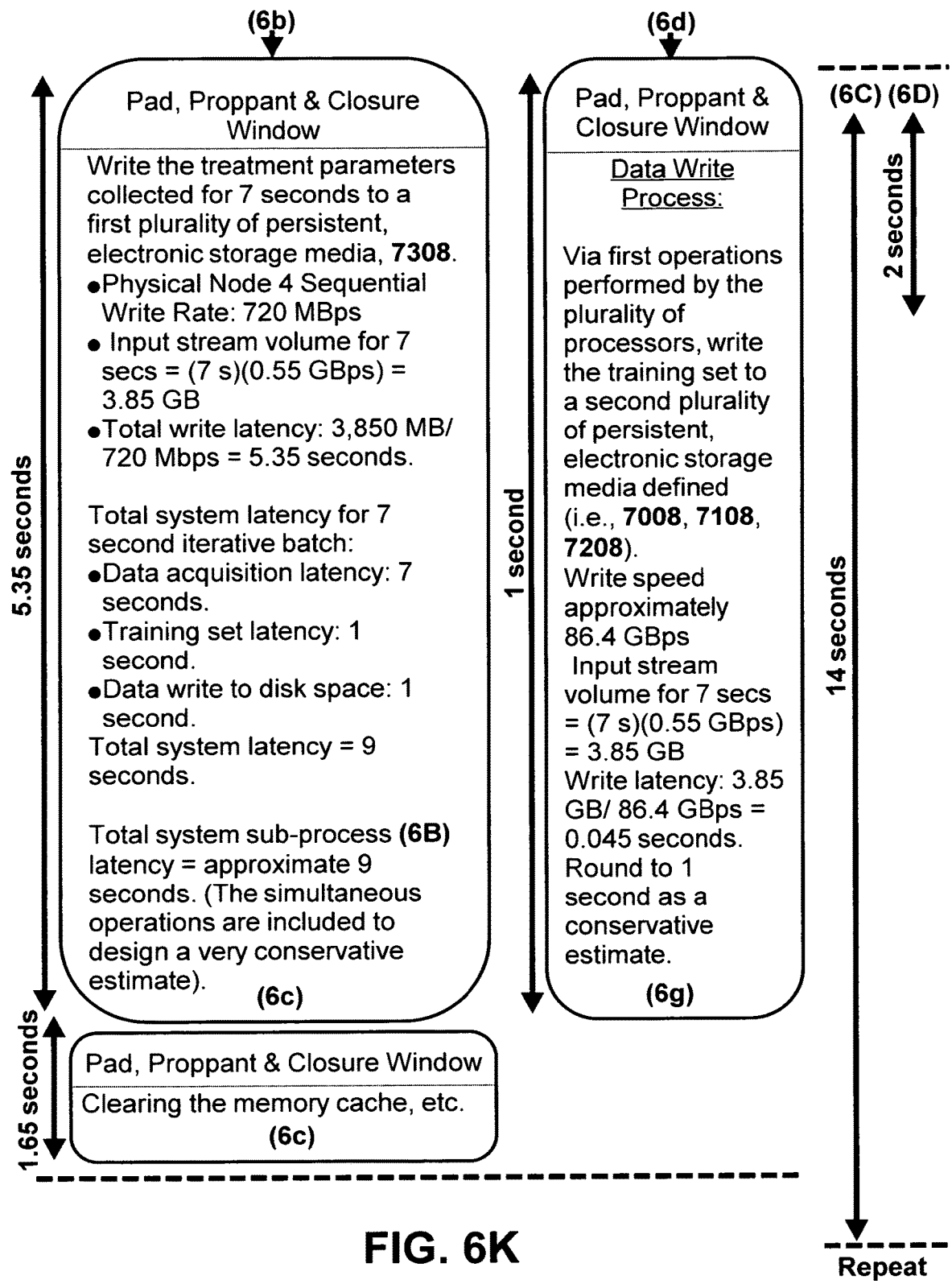
Figure 6L:
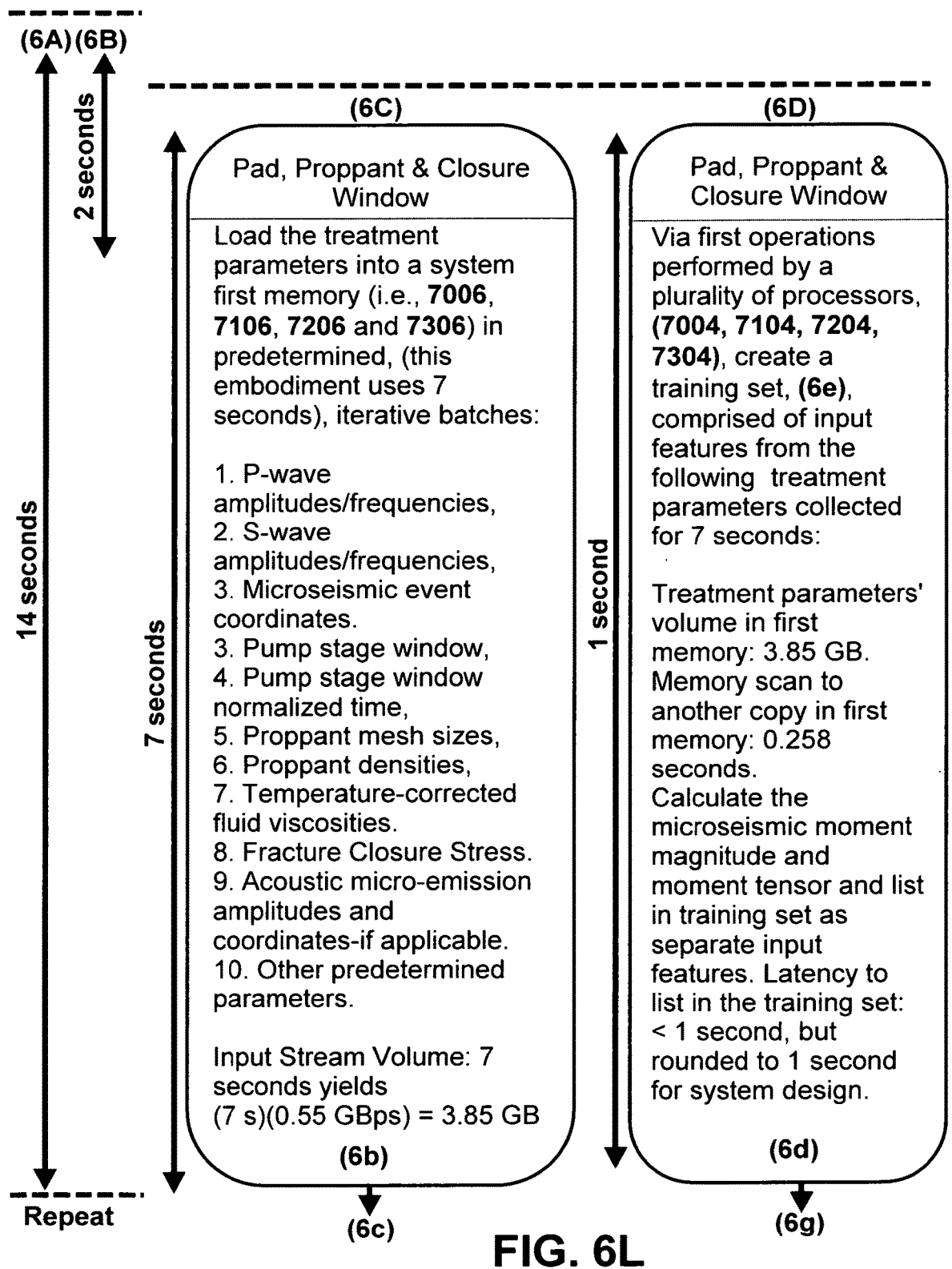
Figure 6M:
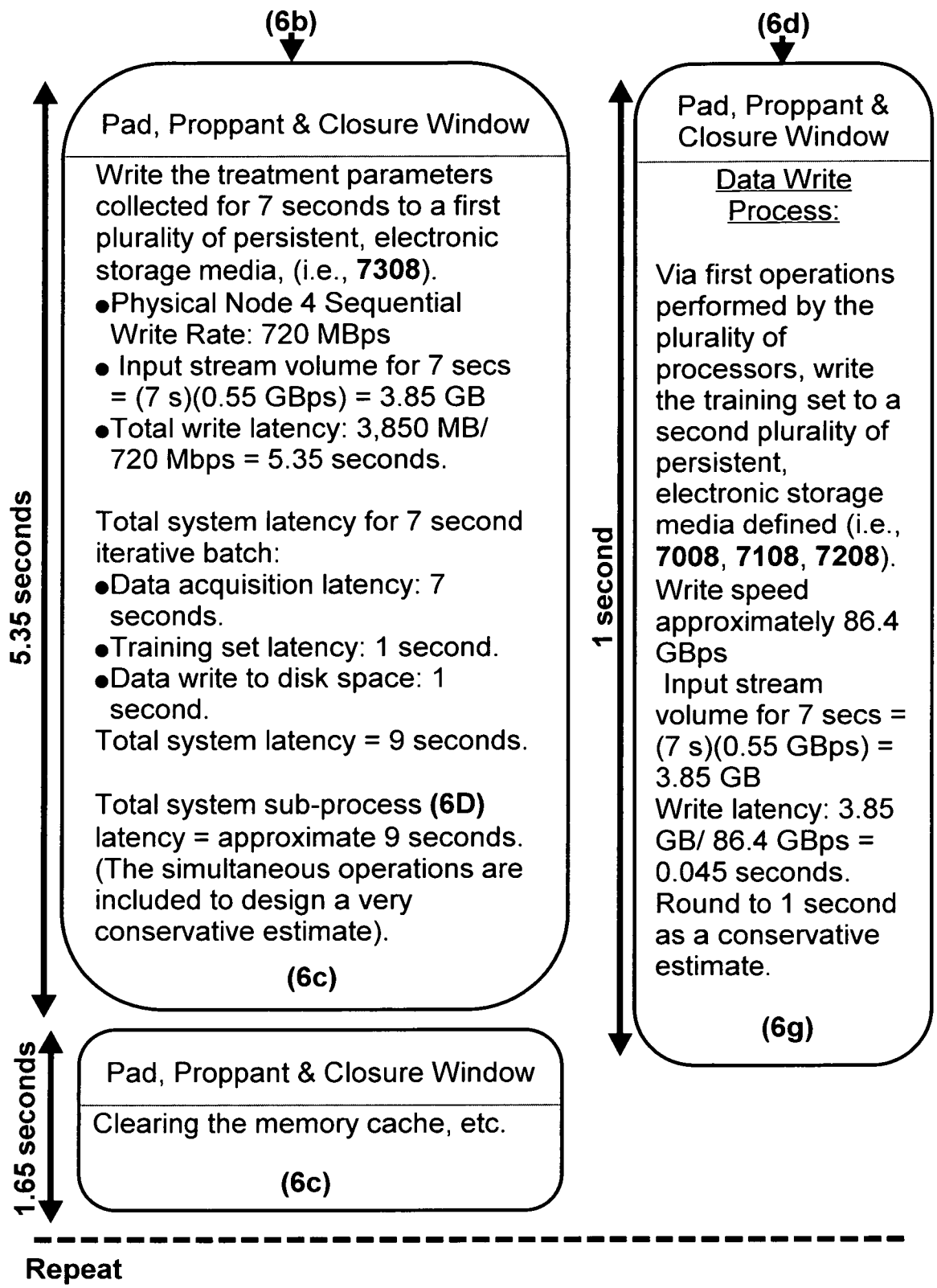

In interstage time, shown in FIG. 6F, second operations performed by the plurality of processors scan (6i) the unlabeled input features of the training set stored in the second plurality of electronic storage media 7008, 7108 and 7208 to a third memory 8008 (FIG. 8). These second operations are compiled predominantly from C++ and MPI into machine code.

Continuing second operations in step (6i), this embodiment labels 10 TB of unlabeled input features. Illustrated in FIG. 8, in this embodiment, the input features are scanned to a third memory 8008 comprised of memory modules on physical nodes 1-3. The 10,240 GB volume collected from the microseisms measured during the three windows is stored as 3,413 GB per node and requires approximately 6.7 scans into the 512 GB per node until the full 10 TB volume is labeled in whole. On a per node basis, the sequential scan rate of 24 SSDs is approximately 28.8 GBps yielding a scan latency of 17.8 seconds for 512 GB. The approximate CPU time for 2048 GB of AME-labeled input features is estimated as 34.3 seconds for the quad processors using the maximum number of memory channels available per CPU (i.e., 4) and the 1866 MT/s RDIMMs.

The labeled 512 GB volumes are then written over their corresponding unlabeled volumes adding an additional latency of 22.2 seconds. Thus, the Total Scan 1 cycle: 17.8+34.3+22.2=74.3 seconds. And at 6.7 scans, the 3,413 GB volumes on nodes 1-3 have been fully labeled: (6.7)* (74.3 seconds)=498 seconds or 8.30 min. The memory is then cleared in step (6j), FIG. 6G.

Shown in FIG. 6H, upon completion of step (6k), the entire training set is labeled and may be trained in step (6k) using predetermined hypotheses models, optimization methodologies and testing protocols that are well-known, tested and publicized in the public domain. Upon training machine learning algorithms from the labeled training set, the machine learning process can be used to map the next stage(s) propped fracture dimensions in real-time from the stage(s) input features, enabling real-time conditional testing and optimization of the propped fracture network and dimensions. Stage spacing, pump volumes, fluid viscosity, proppant density, pump rate and so forth may be tested and their effect on the propped fracture dimensions thereby visualized 2004 (FIG. 6B).

Detailed Description—Third Embodiment

Figure 9A:
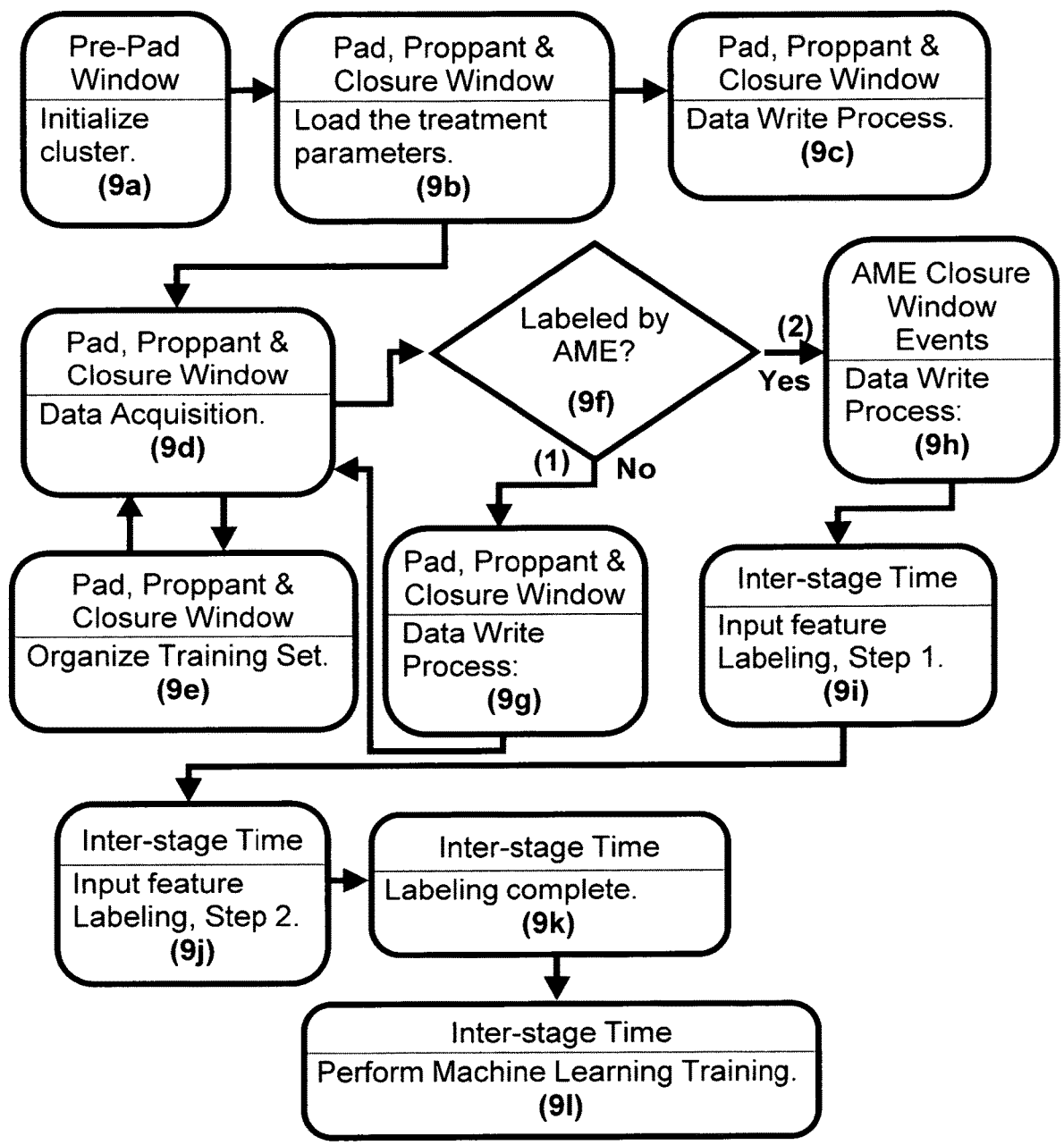
FIGS. 9A-9T illustrate the third embodiment's system, method and means with labeling process flowcharts.

FIG. 9A presents a small-scale view of FIGS. 9B-9J. This embodiment includes a system (FIG. 9B) comprised of five physical compute nodes 10000, 10100, 10200, 10300 and 10400, a networking switch and other hardware which have the structure of or closely similar to the following described hardware manufactured by Dell® and other manufacturers. Five Dell R730XD servers are defined as the five physical nodes illustrated in FIGS. 10A-10C.

The five physical nodes (nodes) are each comprised of a server chassis 10000, 10100, 10200, 10300 and 10400 with (Quantity 12) 3.5-in drive slots and (Quantity 2) 2.5-in system drive slots. The (Quantity 12) drive slots of nodes 1-4 each contain Dell, 3.5 in 4 TB 7.2K RPM SATA 6 Gbps Hot-plug Hard drive. Each of these (Quantity 48) drives have an approximate sequential scan rate of 1.2 GBps. Node 5 contains (Quantity 10) contain Dell, 3.5 in 4 TB 7.2K RPM SATA 6 Gbps Hot-plug Hard drives 10408 and (Quantity 2) Dell, 2.5-in, 1.6 TB Solid State Drive SAS Mix Use MLC 12 Gbps Hot-plug Drives, 3.5-in HYB CARR 10409 in its 3.5-in drive slots. The (Quantity 28) drives of nodes 4 and partly 3 and 5, (i.e., 10209, 10308 and 10408), comprise a first plurality of persistent, electronic storage media. The remaining (Quantity 2) drives in node 5 comprise the third plurality of persistent, electronic storage media 10409. The system drive slots for all five nodes are occupied with (Quantity 2) Dell, 2.5-in, 960 GB Solid State Drive SATA Mix Use MLC 6 Gbps Flex Bay Drive 10002, 10102, 10202, 10302 and 10402. System configuration files and protocols are stored on these system disks. The second plurality of persistent, electronic storage media is comprised of drives in nodes 1-3, 10008, 10108 and 10208. Also, the five nodes each have (Quantity 2) Intel® Xeon® E5-2650 v4 CPUs 10004, 10104, 10204, 10304 and 10404 with the following specifications: 2.2 GHz, 30M Cache, 9.60 GT/s QPI, Turbo, HT, 12C/24T (105W) Max Mem 2400 MHz. The CPUs of Nodes 1-5 10004, 10104, 10204, 10304 and 10404 comprise the plurality of processors. Nodes 1-3 each have 256 GB of registered memory, 10006, 10106 and 10206, specifically (Quantity 8) 32 GB RDIMM, 2400 MT/s, Dual Rank, ×4 Data Width for each node. Nodes 4 and 5 each have 128 GB of registered memory, 10306 and 10406, specifically (Quantity 4) 32 GB RDIMM, 2400 MT/s, Dual Rank, ×4 Data Width for each node. Nodes 1-5 registered memory 10006, 10106, 10206 and 10306 total volume is 1,024 GB for the compute cluster.

Each of the five compute nodes have (Quantity 2) Intel XL710 Dual Port 40G, QSFP+, rNDC with SR Optics network cards and (FIG. 11A) are connected by two network cables 11002 per node both having a minimum 40 Gbps or 5 GBps bandwidth. These network cables connect to a computing switch 11004 such as Mellanox SX6012 which has 12 ports, 1.3 Tbps and a link speed of 56 Gbps. As illustrated in FIGS. 11A-11G, the second memory 11010 is comprised of 112 GB on each of the first three compute nodes and 56 GB each on node 4 and 5 to accommodate a maximum of 448 GB of AME closure labels in the memory. The second memory 11012 is comprised of 72 GB on each of the first three compute nodes and 36 GB each on node 4 and 5 to accommodate a maximum of 288 GB of unlabeled input features scanned from the second plurality of persistent, electronic storage media 10008, 10108 and 10208. Additionally, this embodiment's registered memory is reserved for the system 11006 and for operations 11008. Moreover, the nodes' operating systems for this embodiment is Red Hat Enterprise Linux but other professional production grade Linux distributions, (e.g. SUSE Enterprise Linux, Ubuntu LTS, etc.) may be substituted. Windows Server operating systems and other production grade alternatives may be used in other embodiments.

Operation of Third Embodiment—FIGS. 9A-9T, 10A-10C and 11A-11G.

Figure 9B:
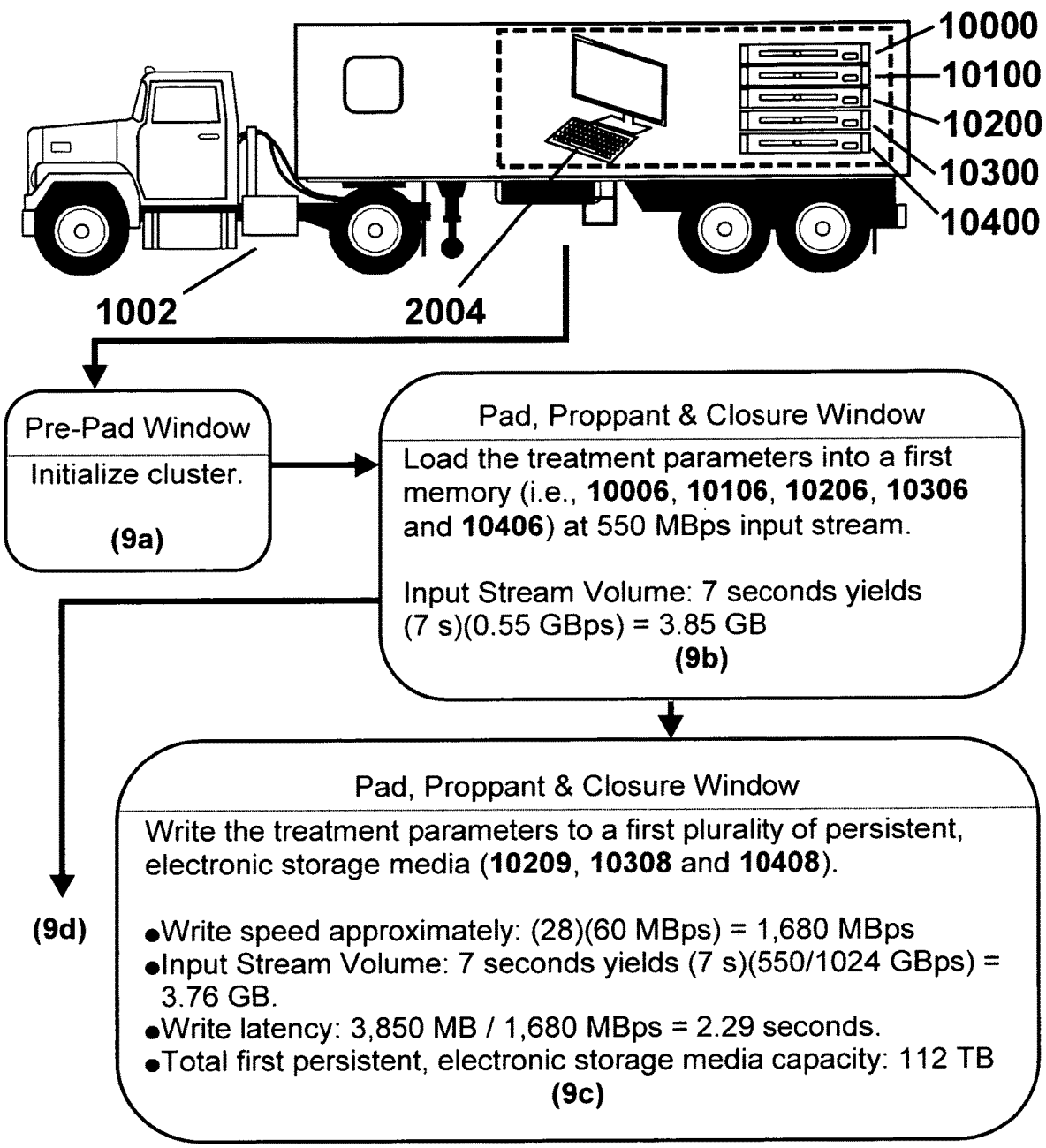
Figure 9C:
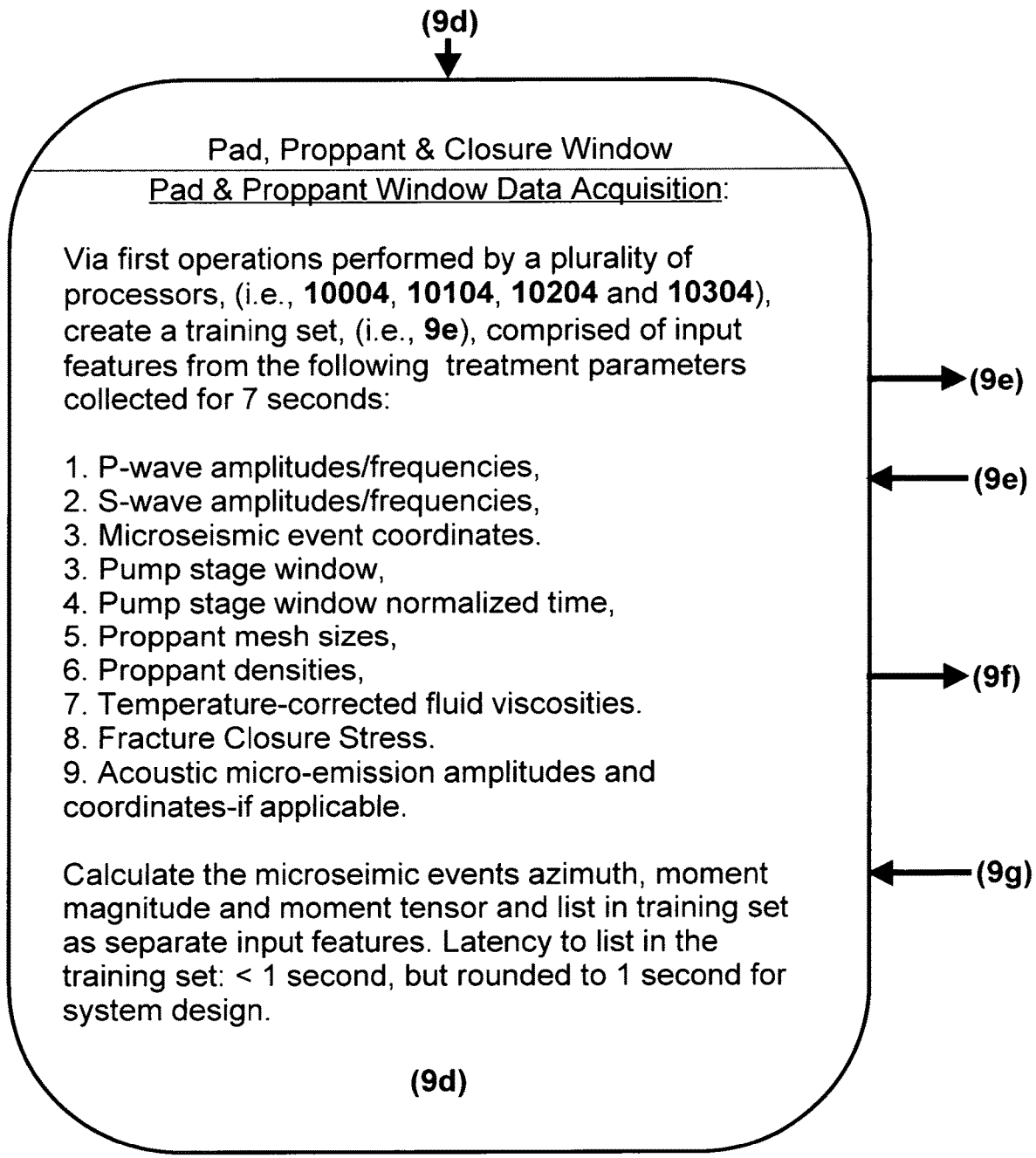
Figure 9E:
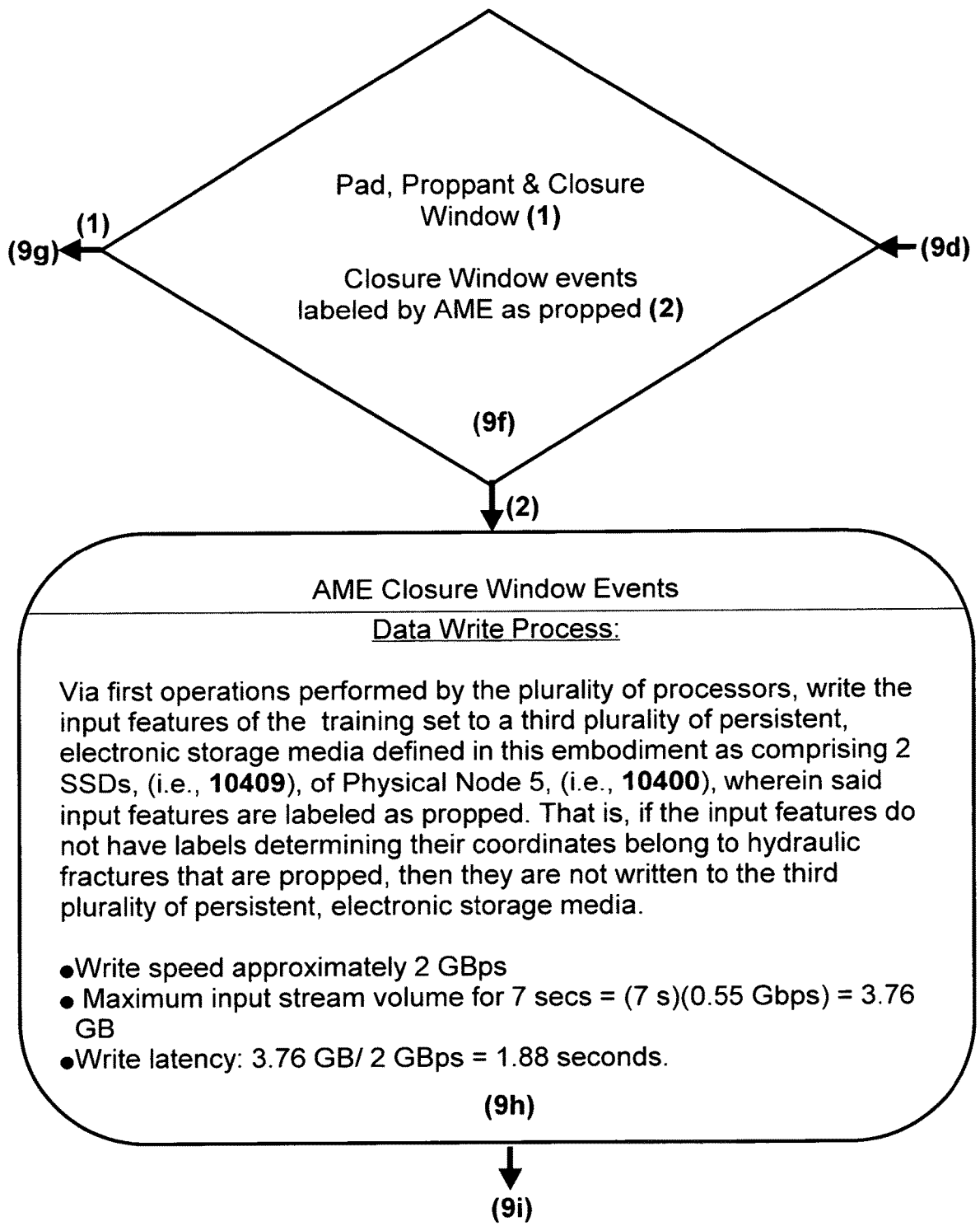
Figure 9K:
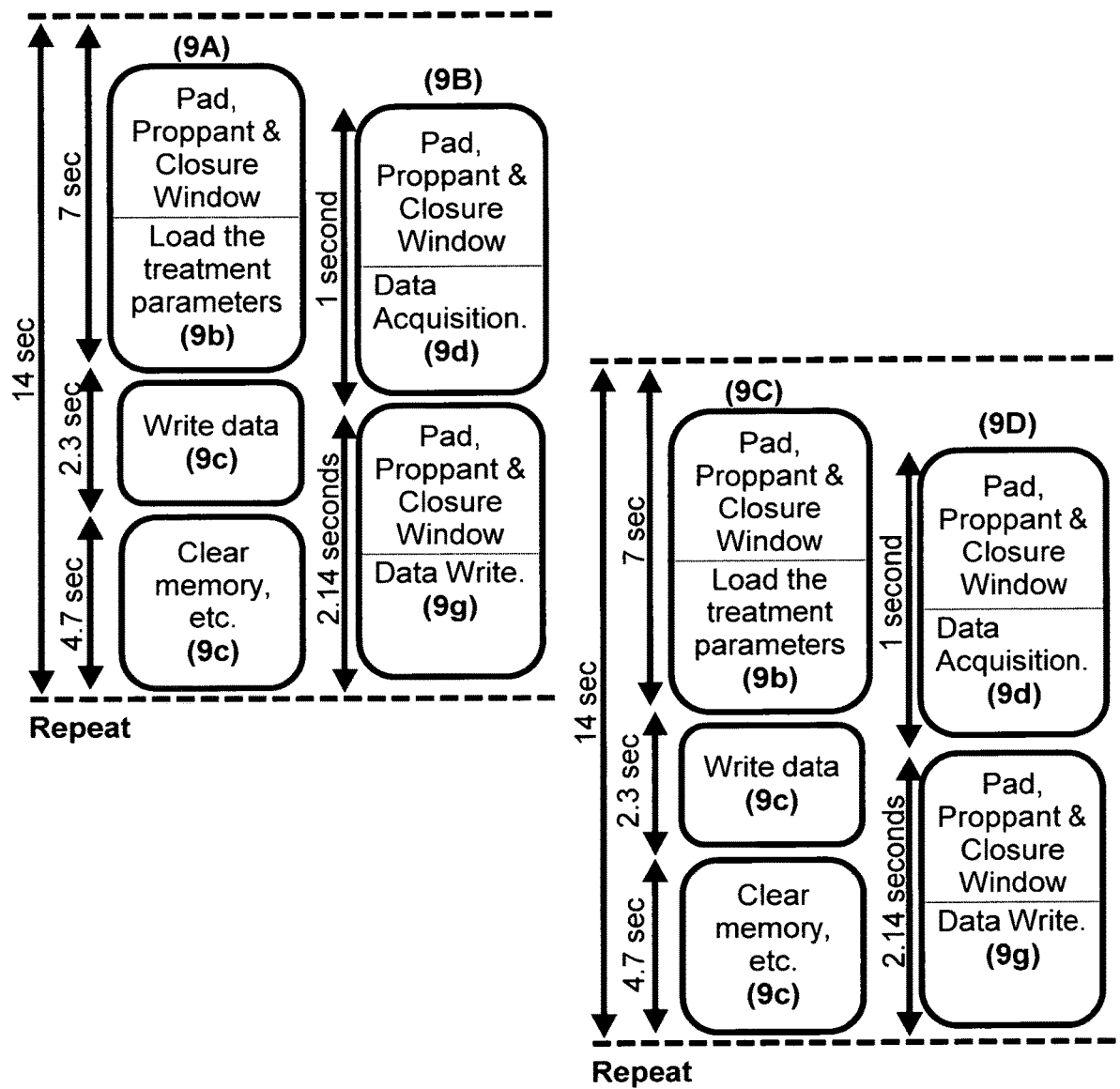
Figure 9L:
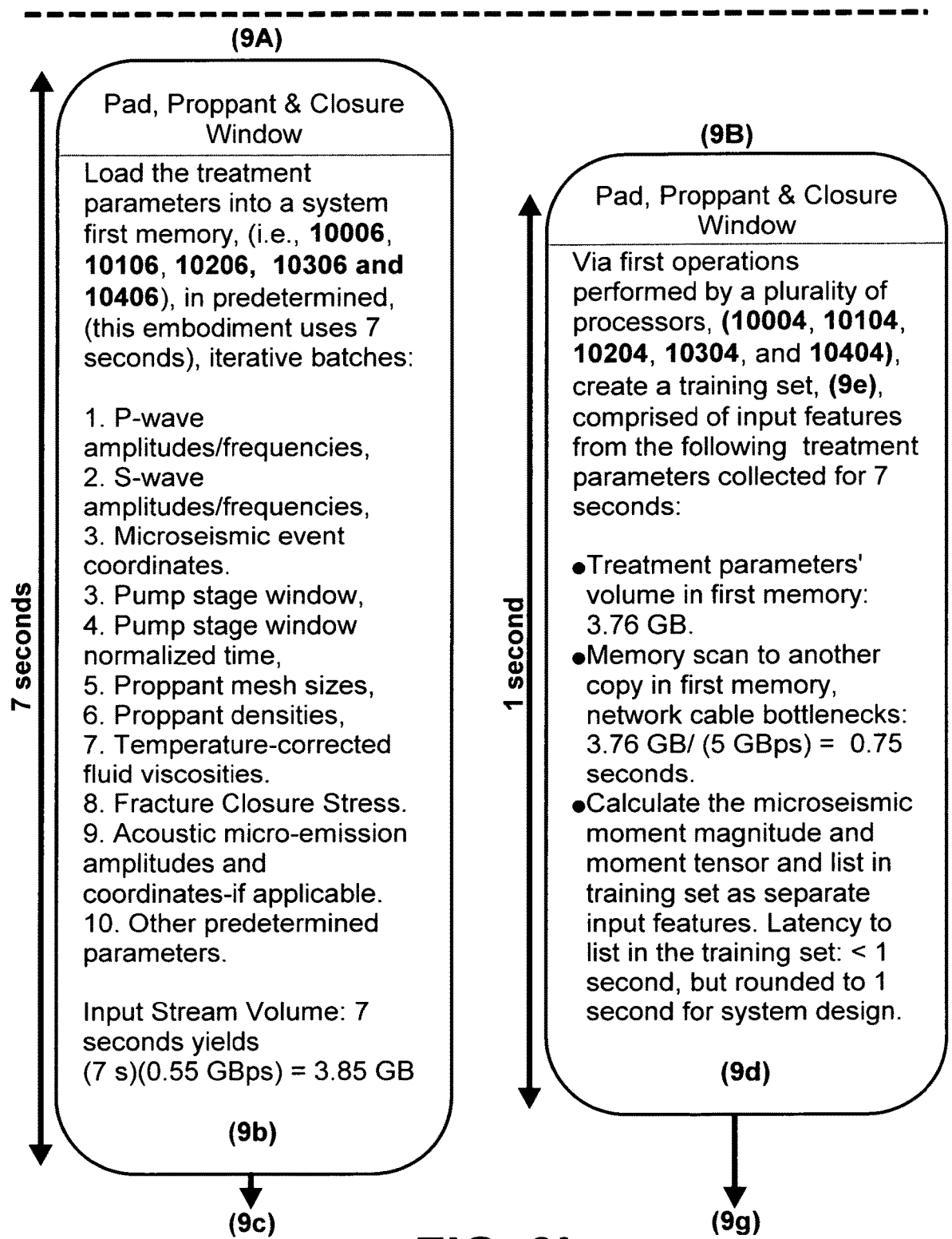
Figure 9M:
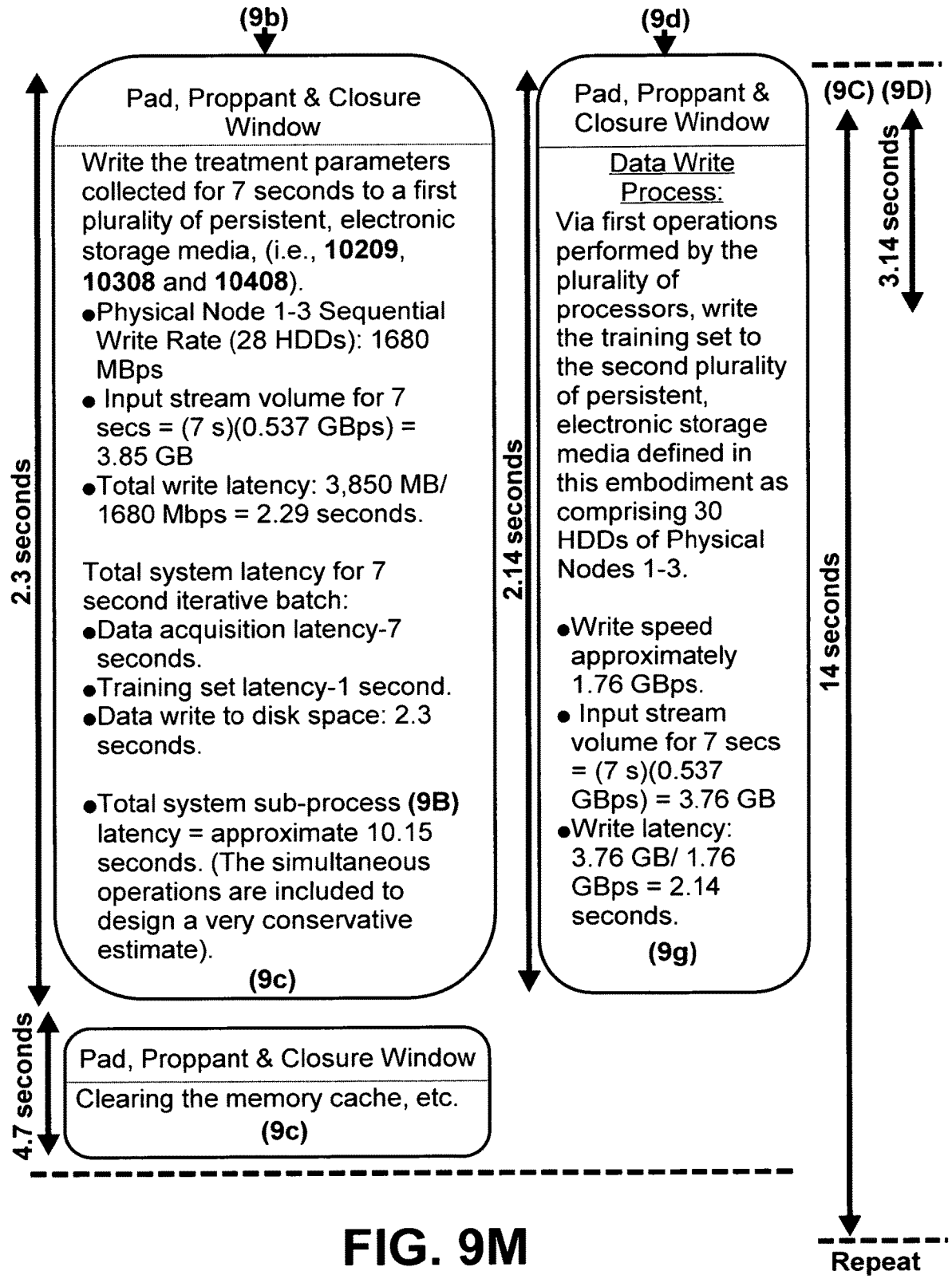
Figure 9N:
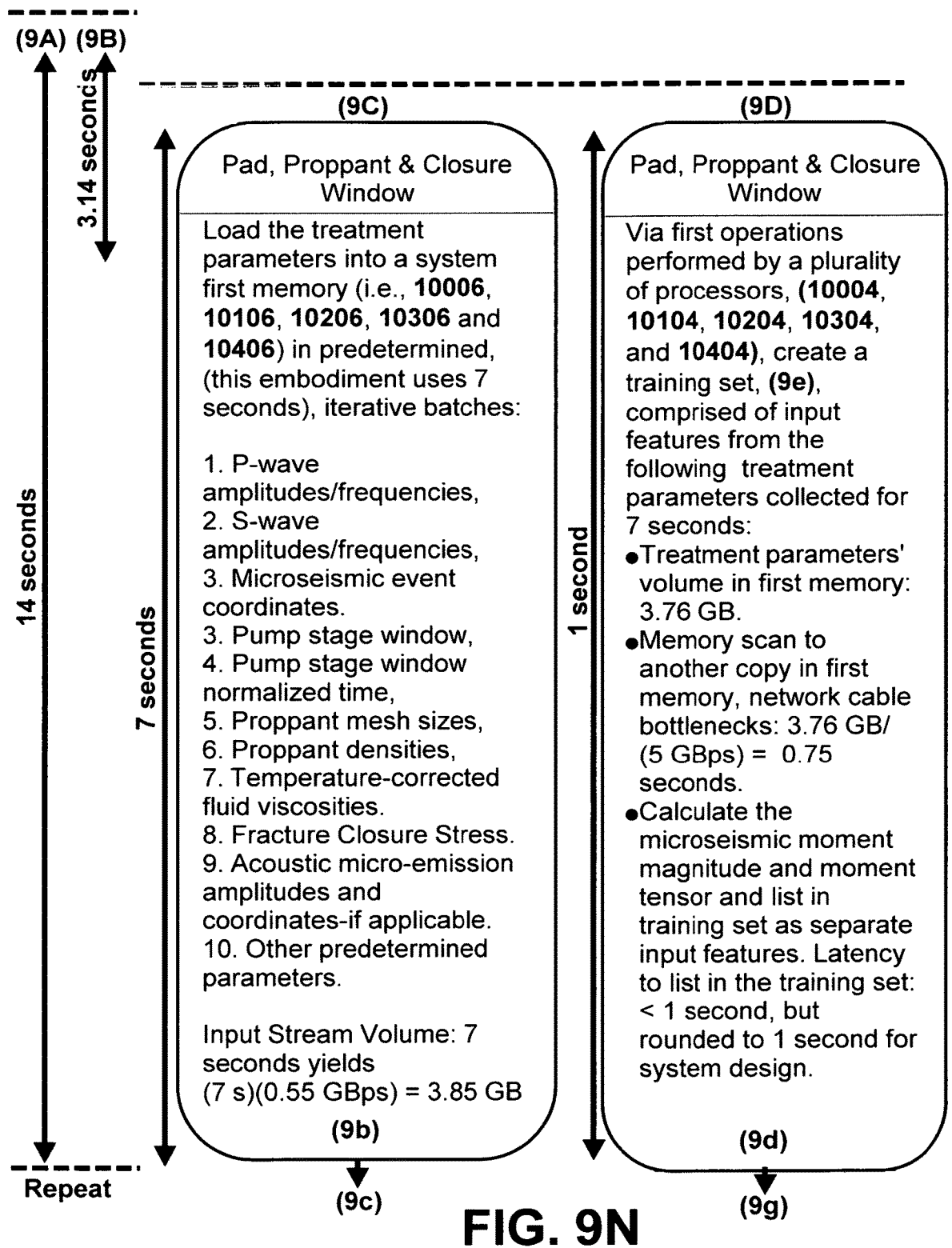
Figure 9O:
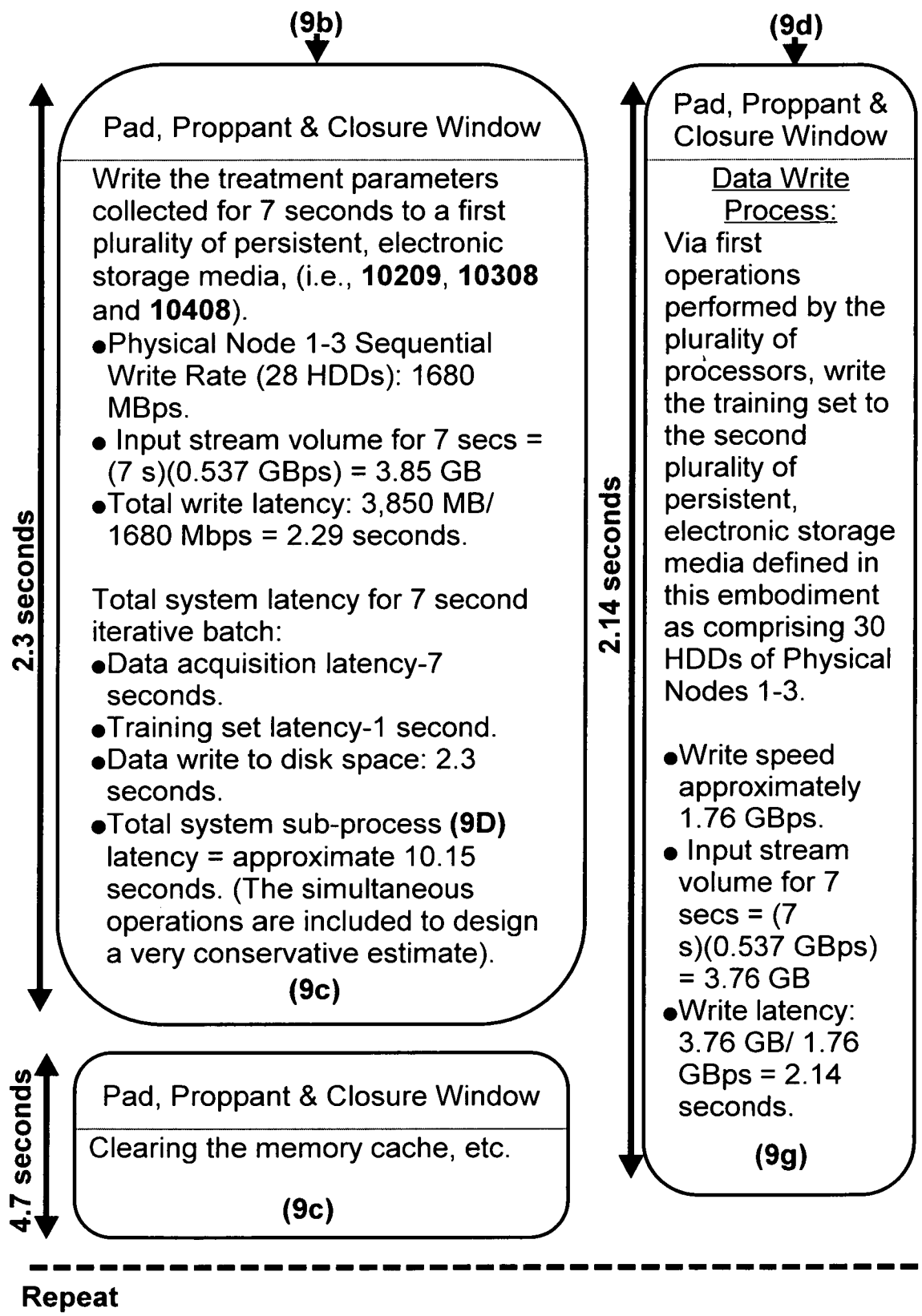
Figure 9P:
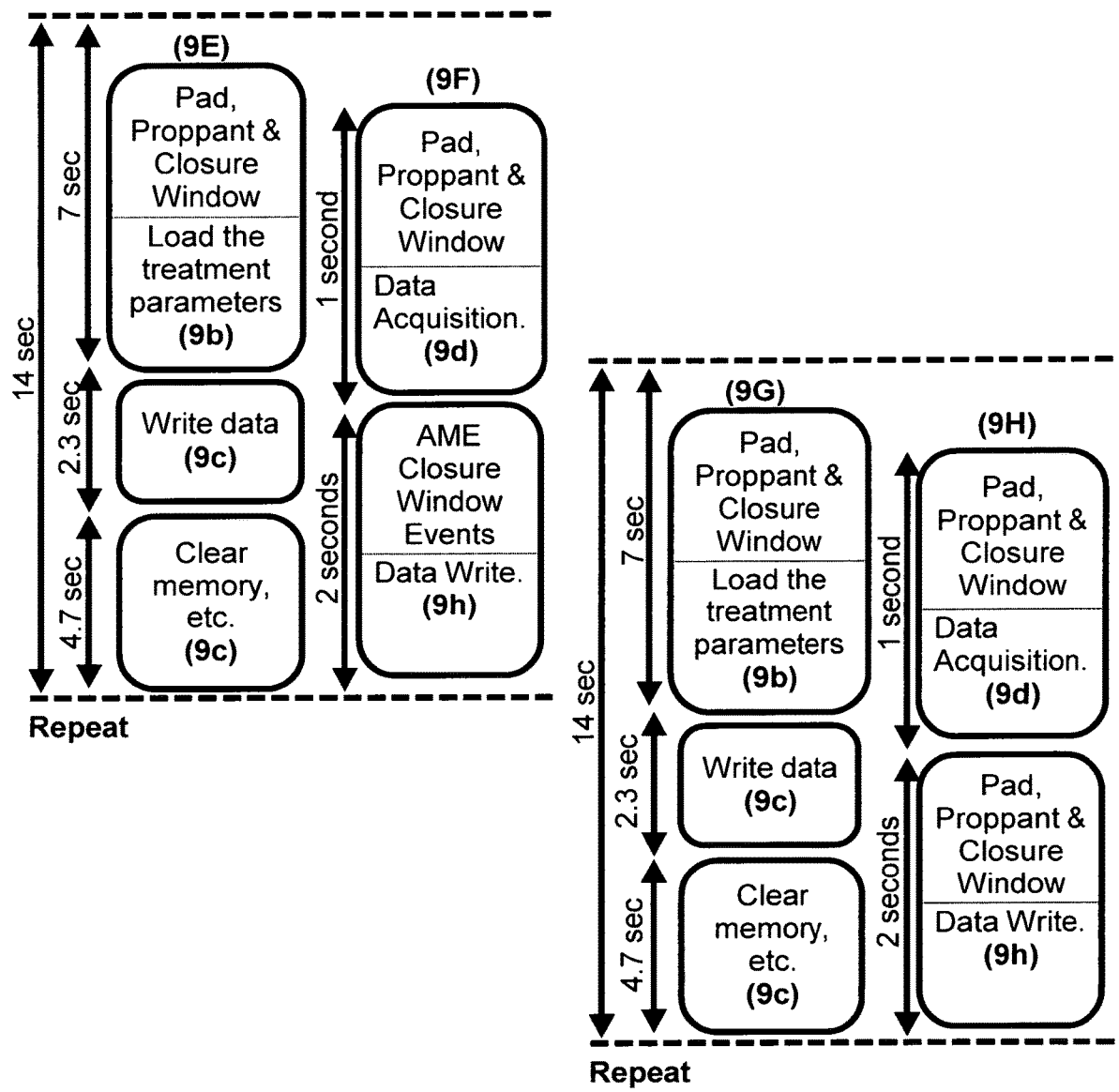
Figure 9Q:
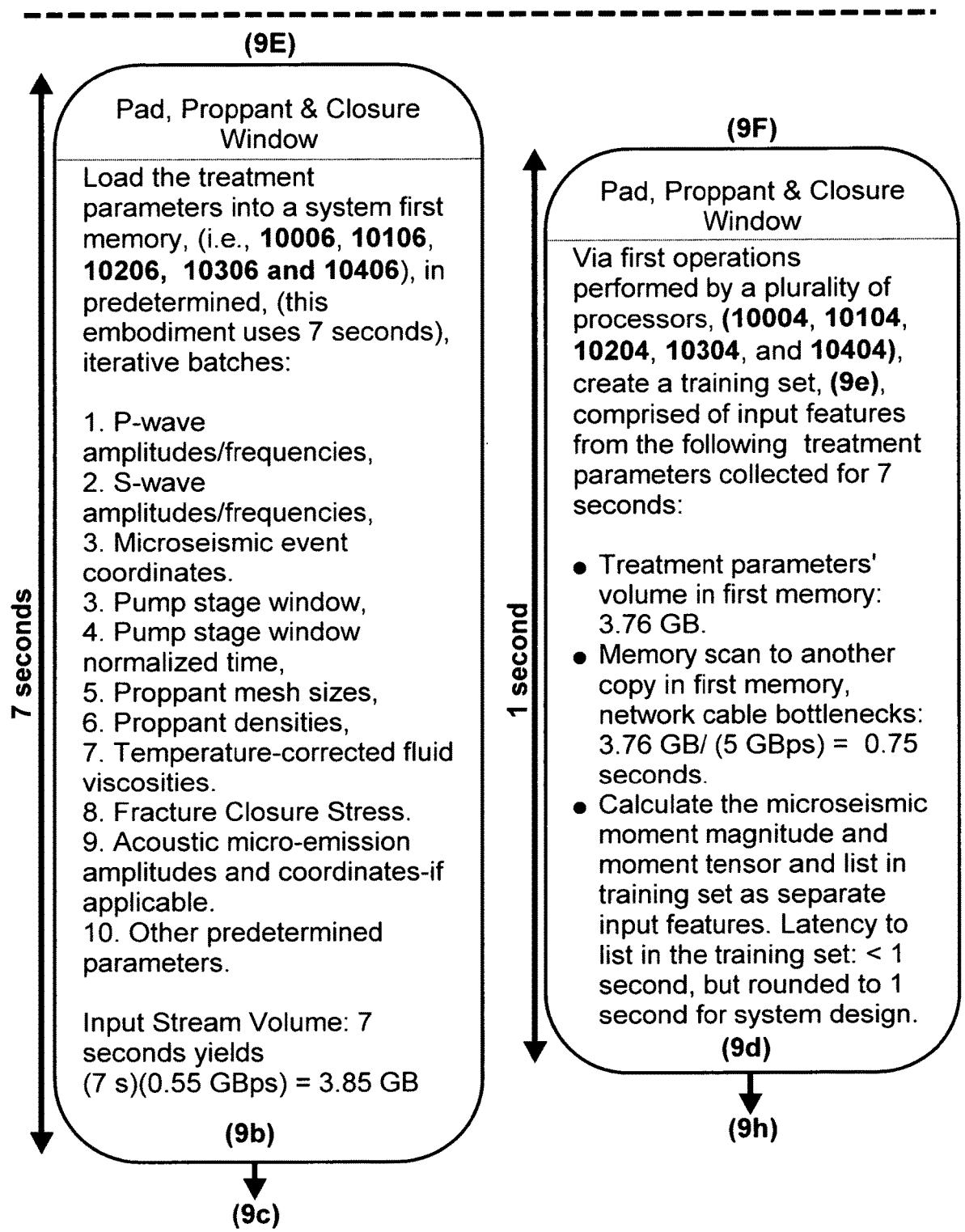
Figure 9R:
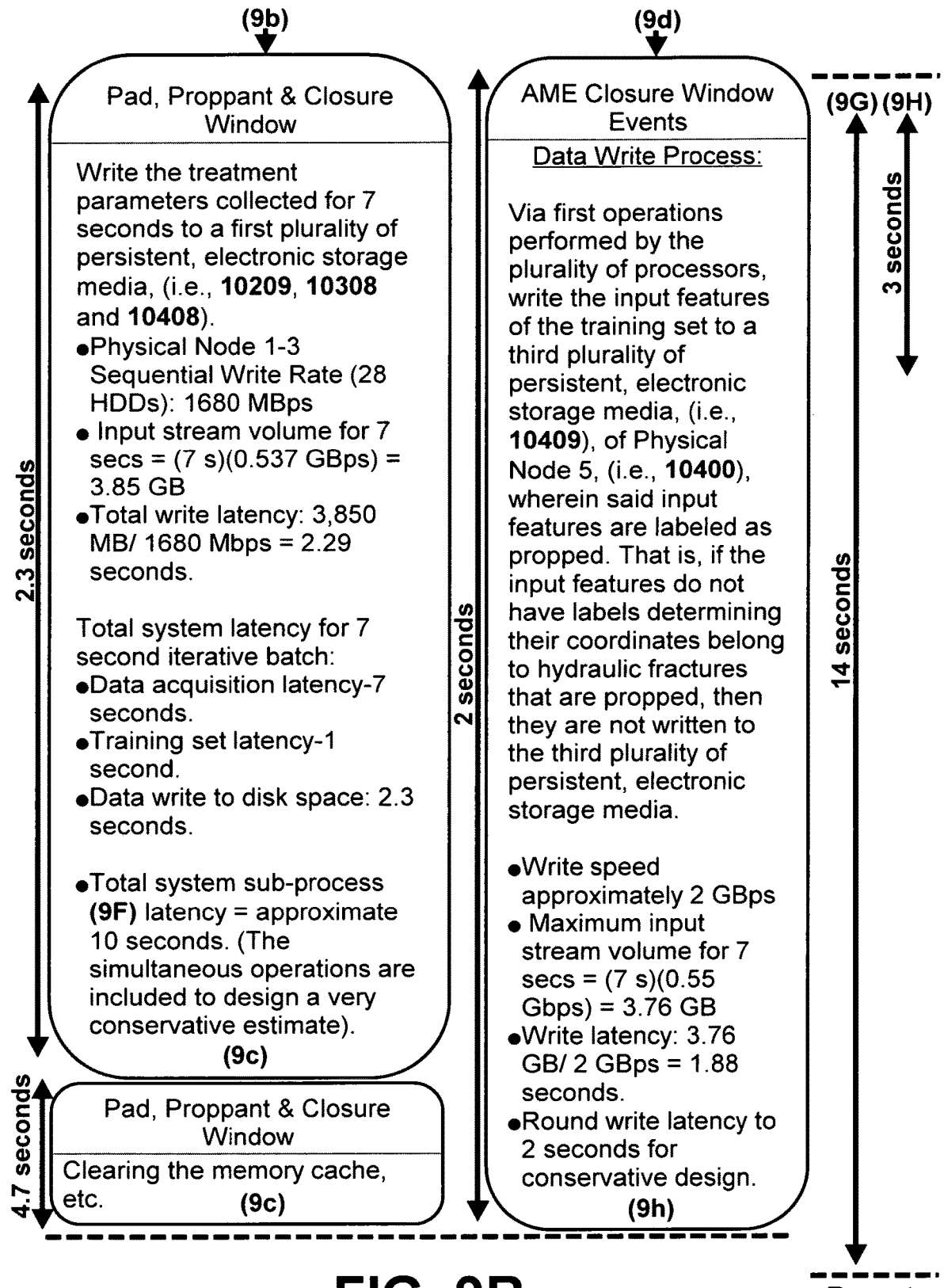
Figure 9S:
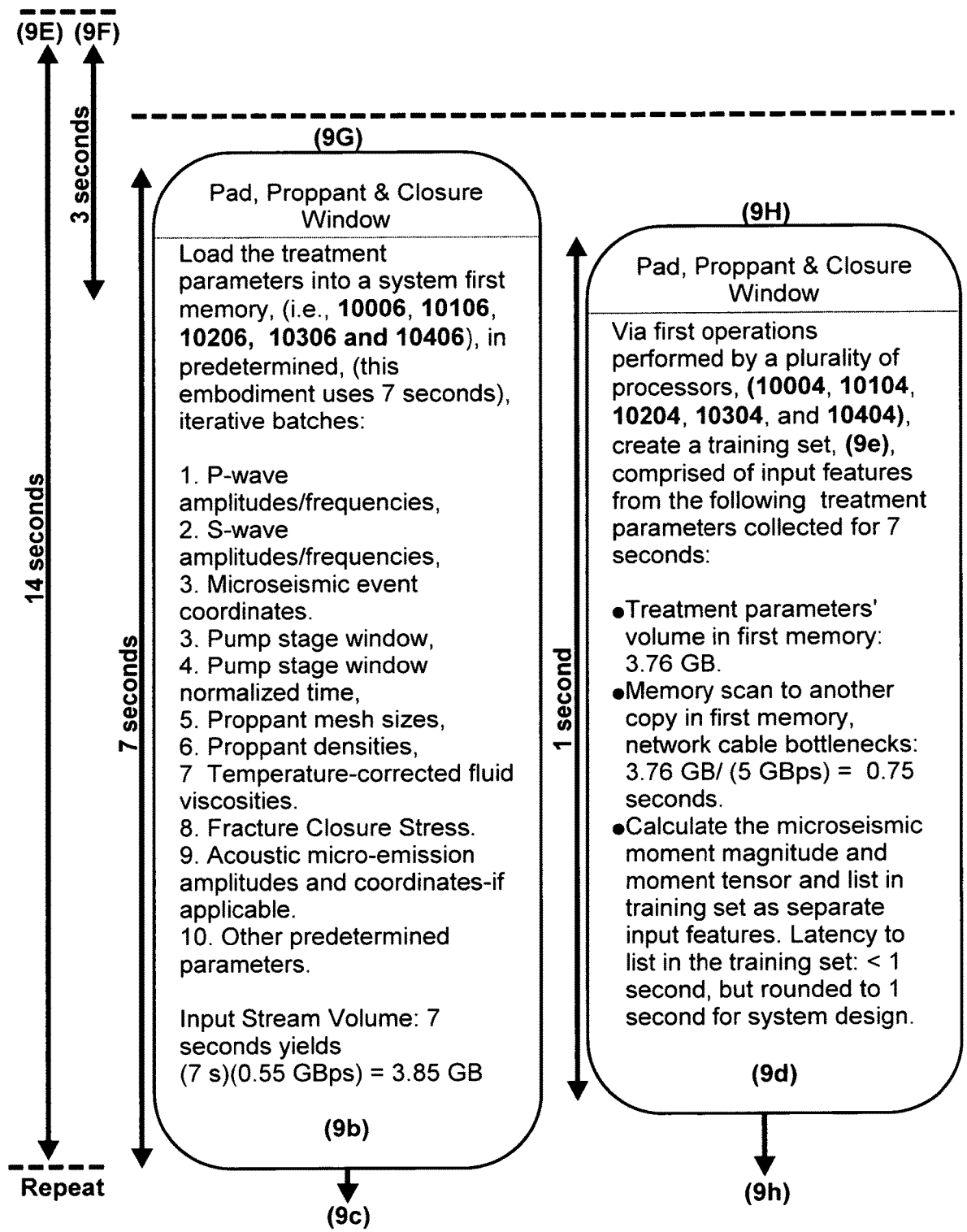
Figure 9T:
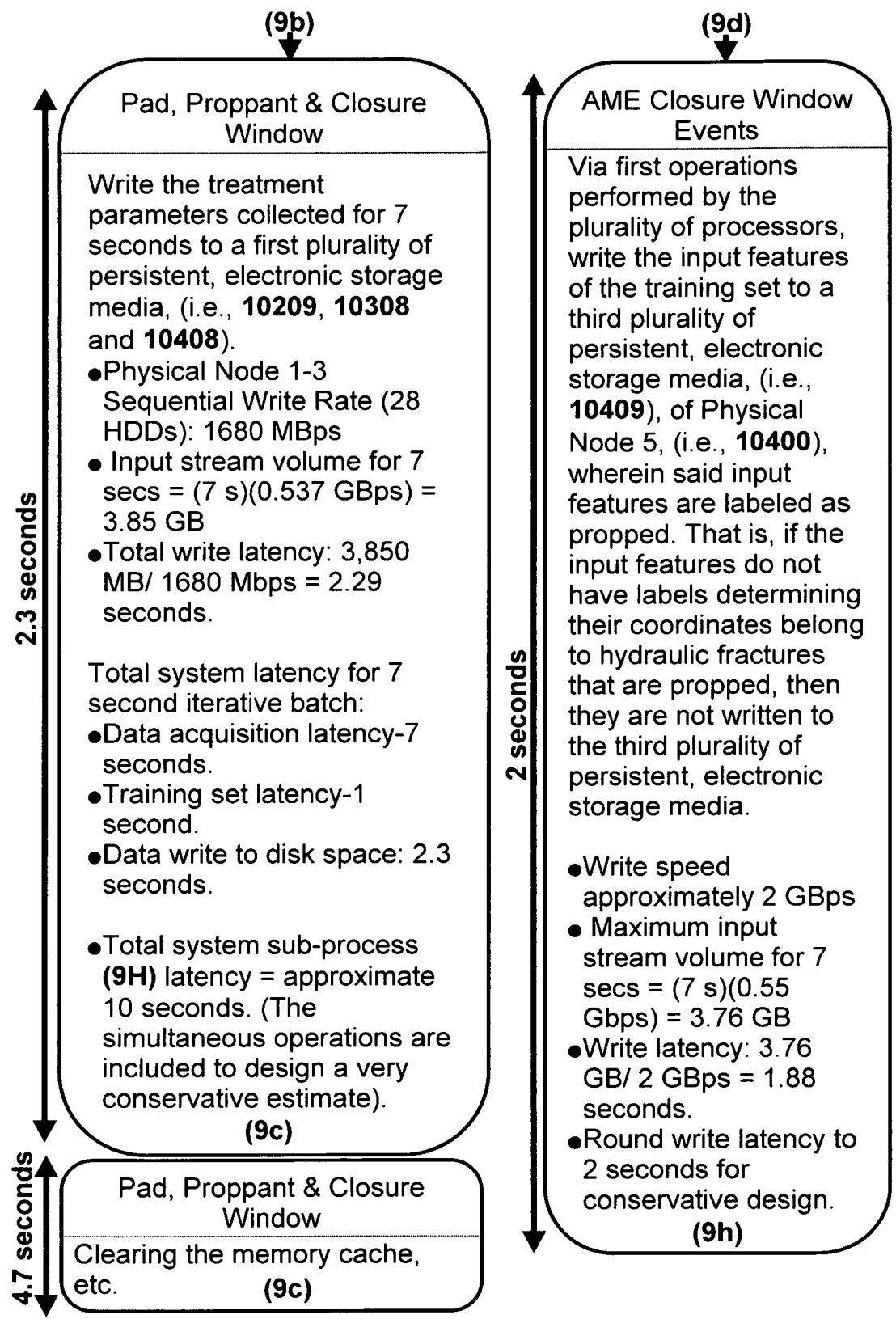
Figure 10A:
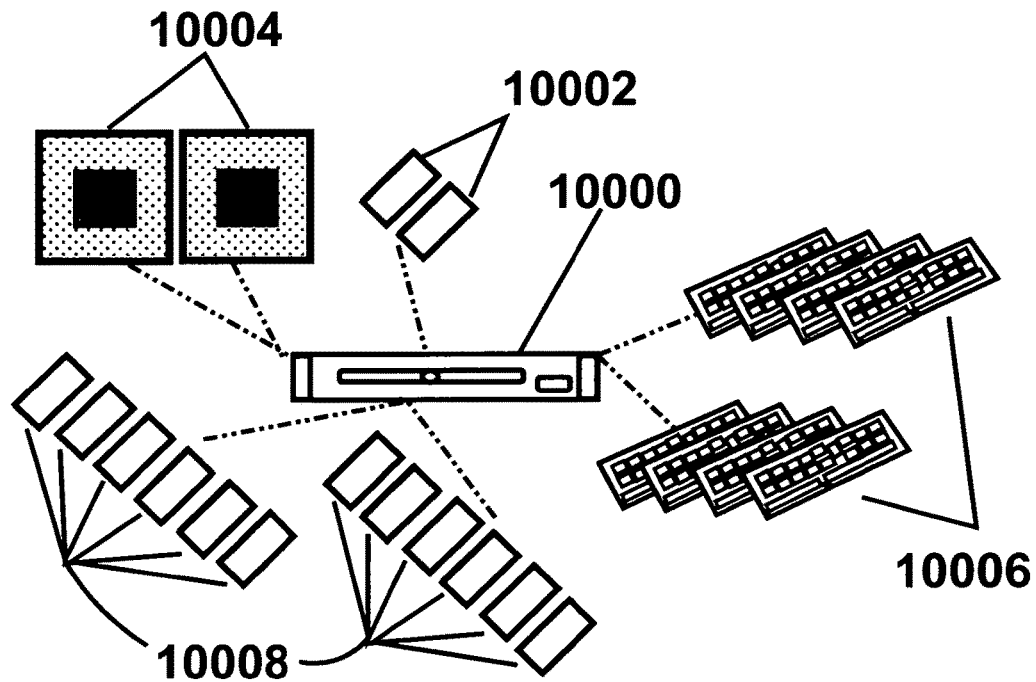
FIGS. 10A-10C illustrate hardware included in the third embodiment for each of the physical nodes.
Figure 10A:
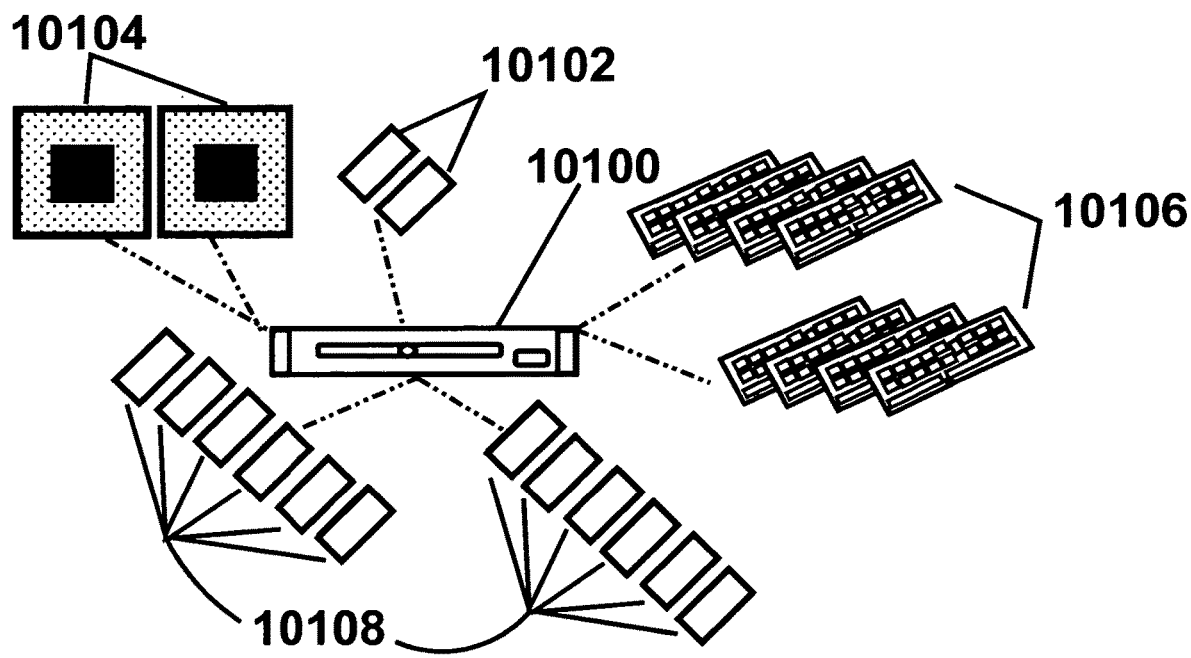
Figure 10B:
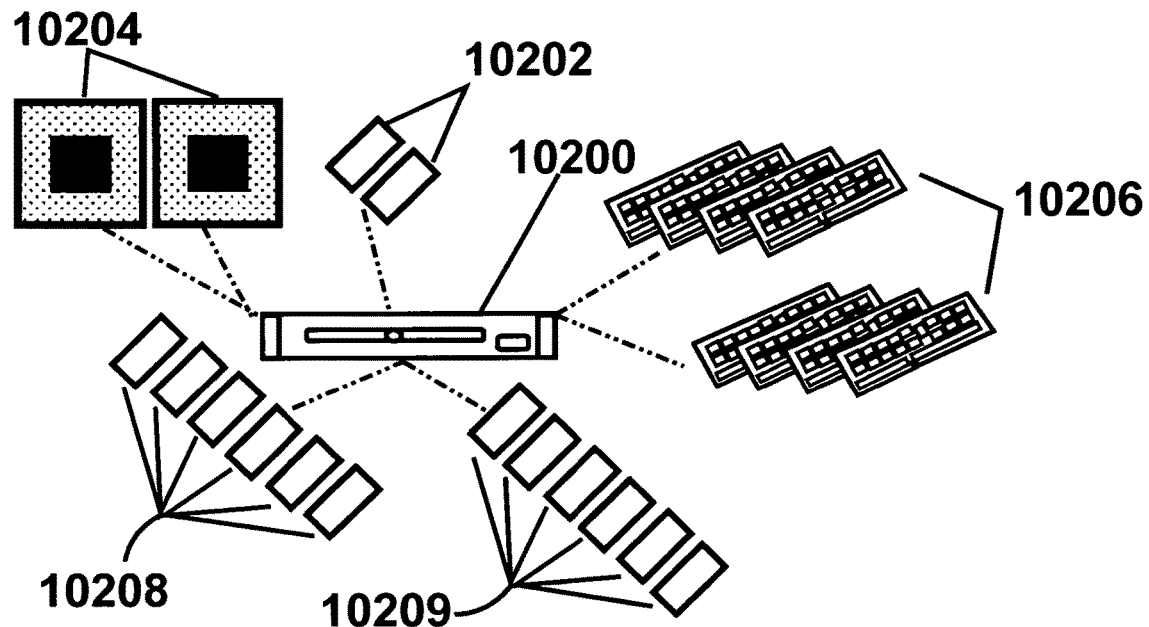
Figure 10B:
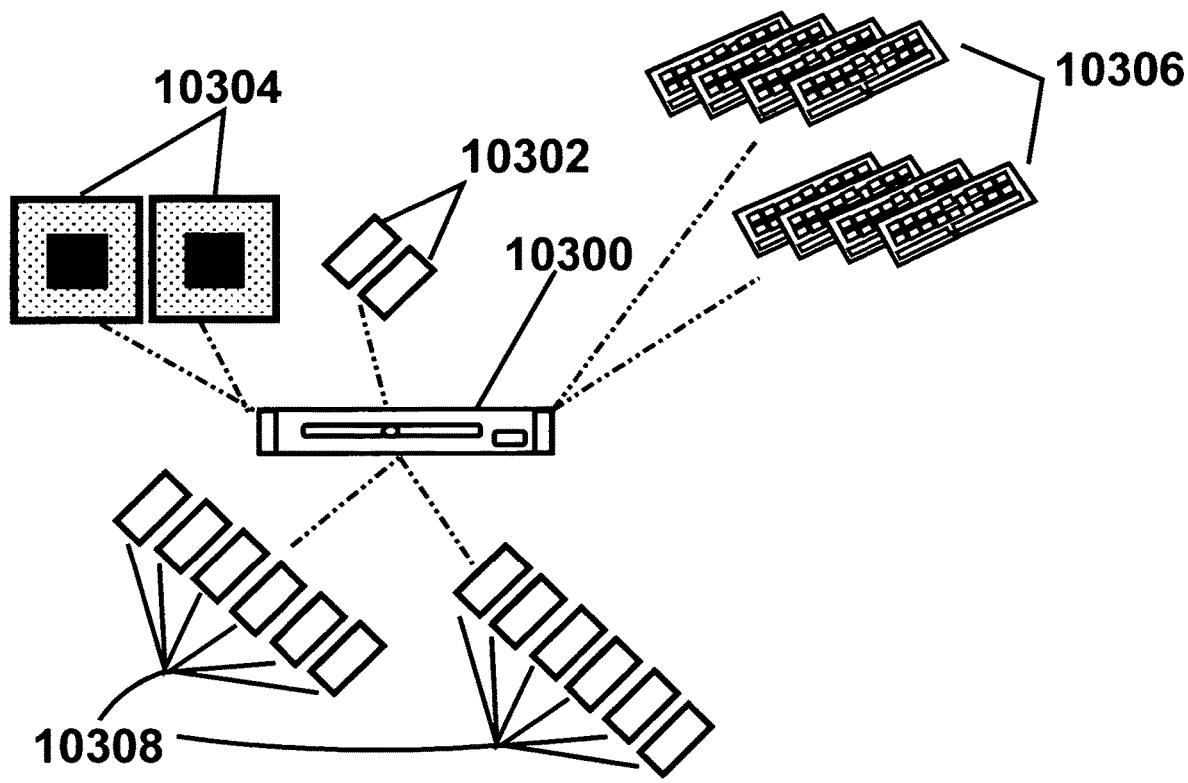
Figure 10C:
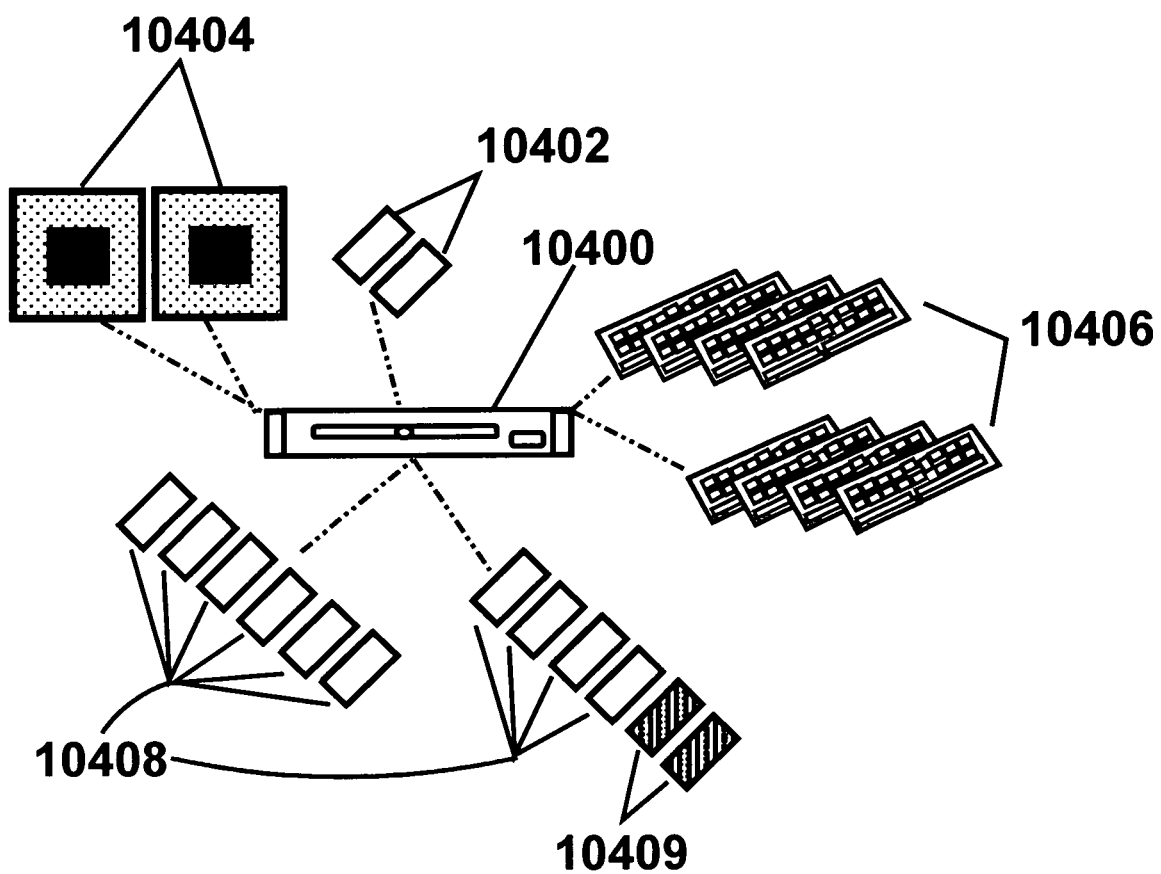

As illustrated in FIG. 9B, the cluster is first initialized (9*a*) ensuring the computing resources and hardware are sufficient for the job's 1) designed stage data volumes and bandwidth for the pad-, proppant- and closure-window, and 2) the data volume and bandwidth of AME closure labels. The cluster may be designed to have double the volume of data to be collected in the three windows and for the AME closure labels detected in the closure-window. This embodiment is designed for 100 TB data for the total job and a maximum of 1 TB of AME labels. At a predetermined real-time data input, (this embodiment uses 550 MBps), the treatment parameters are acquired and loaded (9*b*) into the system first memory which has been predetermined from the job data volume and bandwidth, provisioned and initialized in the previous step. The system first memory is comprised of registered memory provisioned from the memory modules which may include (FIGS. 10A-10C) 10006, 10106, 10206 and 10306. This embodiment loads the treatment parameters into the system first memory in 7 second batches before the plurality of processors 10004, 10104, 10204 and 10304 perform any operations or the data is written to disk space. As illustrated in FIGS. 9B-9D & 9K-9O, the treatment parameters are loaded (9*b*) into the system memory at a predetermined iterative batches, (this embodiment uses 7 seconds). As the treatment parameters are loaded, first operations (9*d*) performed by the plurality of processors simultaneously create a training set (9*e*) of input features from the loaded treatment parameters. These first operations (9*d*) have a latency approximated to one second and are compiled predominantly from C++ and MPI source code into machine code.

Upon the conclusion of step (9*b*), the raw treatment parameters (9*c*) are written to a first plurality of persistent, electronic storage media 10209, 10308 and 10408 comprised of the 28 hard disk drives with a total approximate write rate of 1,680 MBps which yield an approximate write latency of 2.30 seconds for the 7 second iterative batches. FIGS. 9K-9EO show that once step (9*b*) of sub-processes (9A) and (9B) conclude, step (9*b*) instantaneously continues in sub-processes (9C) and (9D). Thus, real-time batch processing of the treatment parameters is performed as defined by this schema. Moreover, sub-processes may use 1000 instead of 1024 to convert MBps to GBps and so forth for simplicity.

FIGS. 9B-9D & 9K-9O show that this embodiment calculates the microseismic moment magnitude, microseismic events azimuth and moment tensor of the microseisms (9*d*). The training set input features and labels of this embodiment share the same definitions, classification protocols and calculation procedures as the first embodiment's operation.

FIGS. 9B-9D & 9K-9O also illustrate that the training set (9*e*) created in step (9*d*) by first operations by the plurality of processors are written (9*g*) from the first memory to a second plurality of persistent, electronic storage media 10008, 10108 and 10208. The second plurality of persistent, electronic storage media has an approximate write rate of 1.76 GBps determined from an approximate write rate of 60 MBps per HDD; thus, step (9*g*)'s write latency for 3,850 MB is approximately 2.15 seconds. This write process is repeated until AME closure-window events are detected (9*f*). As illustrated in FIGS. 9E & 9P-9T, upon detecting AME closure-window events, the now labeled input features from the training set are written (9*h*) to a third plurality of persistent, electronic storage media 10409 of 2 SSDs. The write latency for a volume of 3,850 MB is approximately 1.88 seconds but this embodiment conservatively designs for 2 seconds.

Figure 9F:
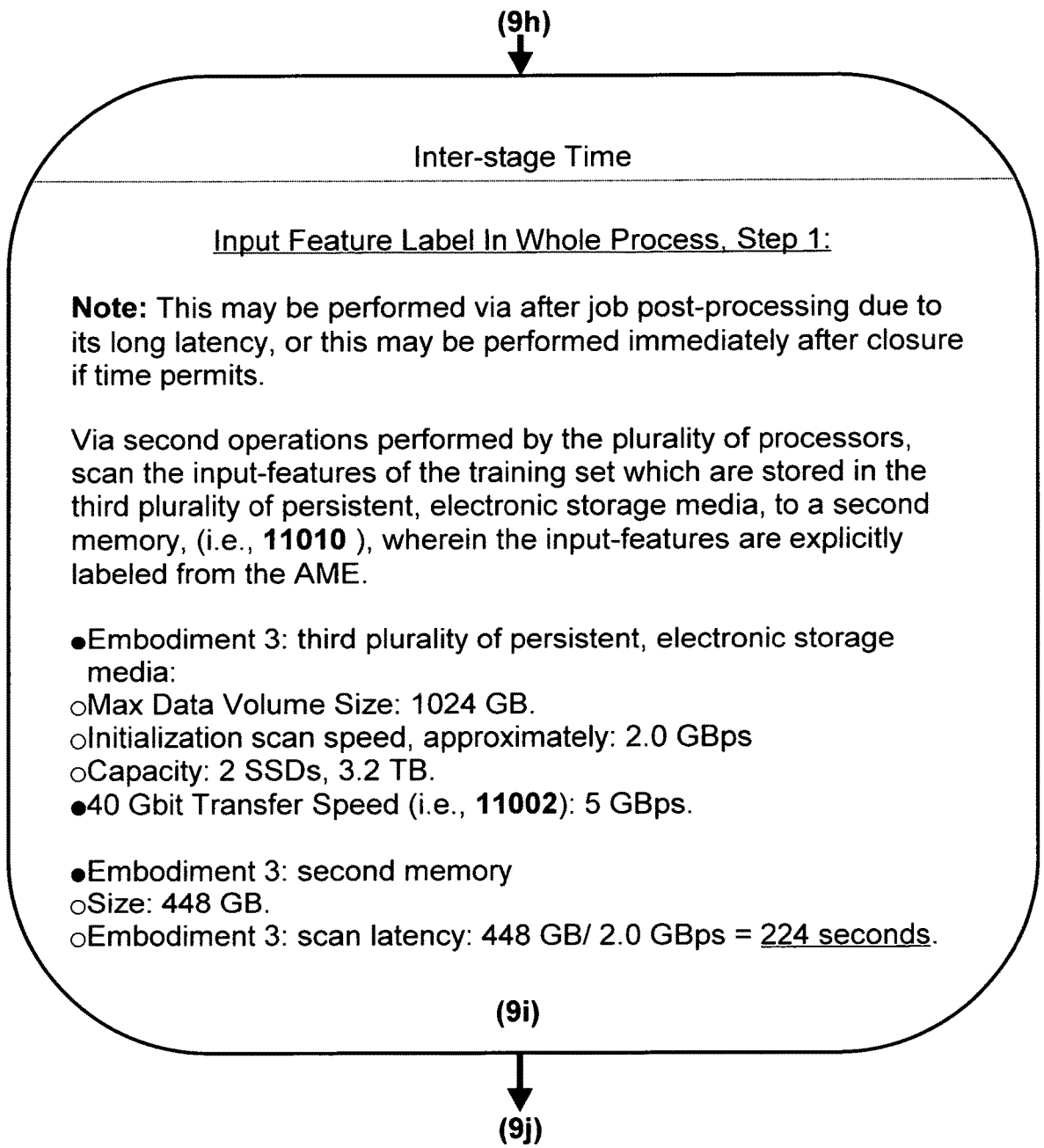
Figure 11A:
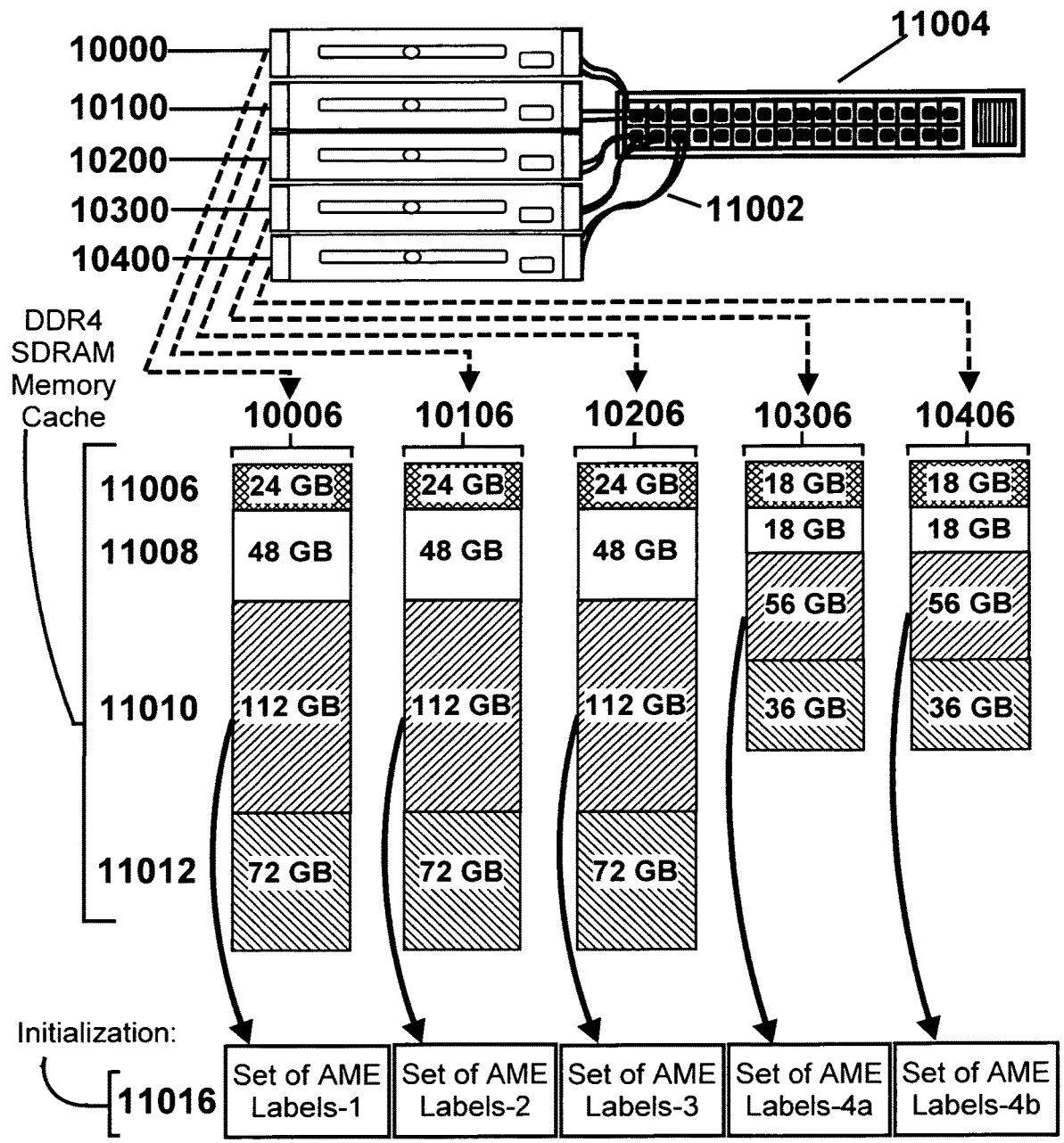
Figure 11B:
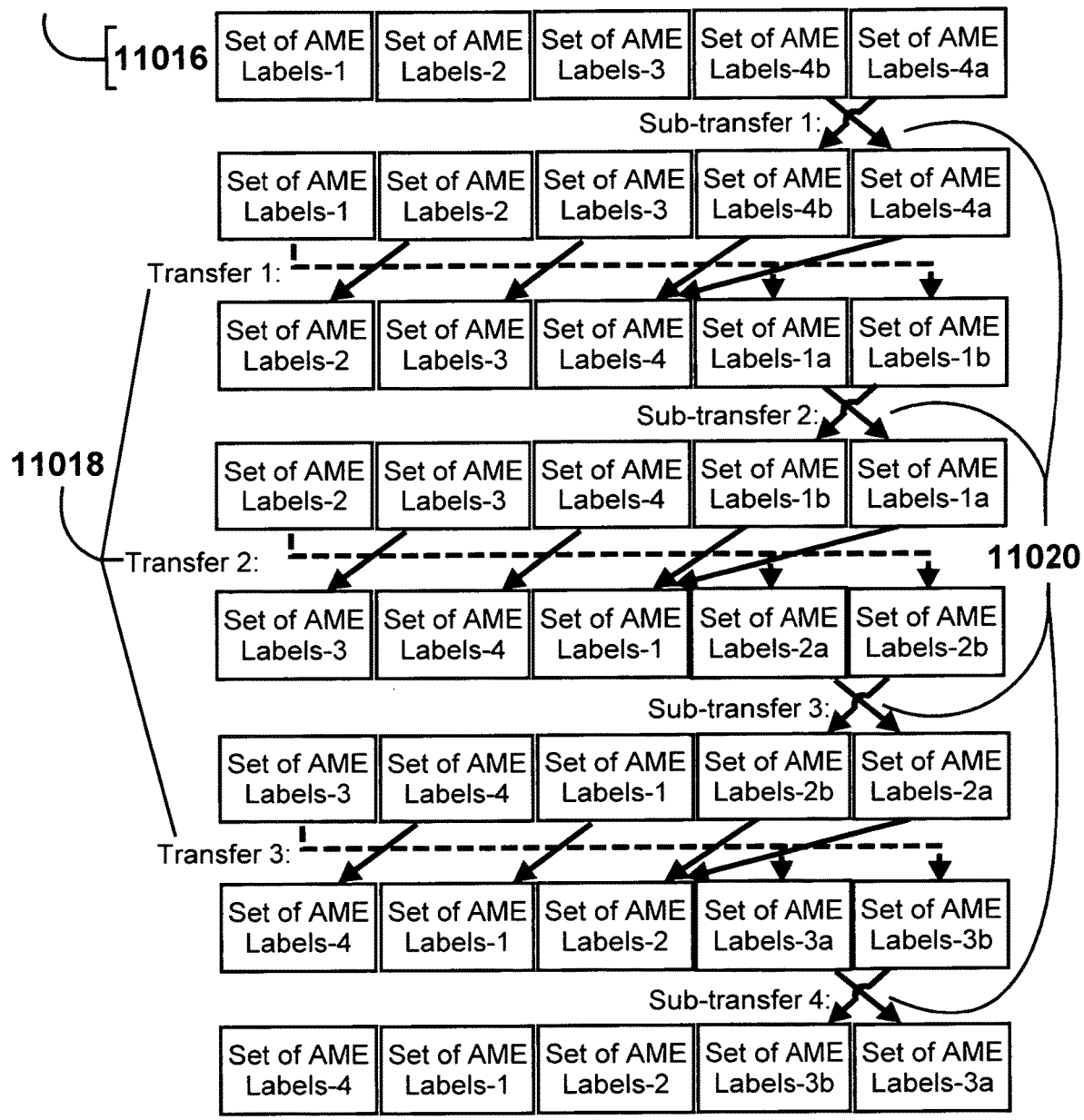

In interstage time, shown in FIG. 9F, second operations performed by the plurality of processors scan (9*i*) the labeled input features of the training set stored in the third plurality of electronic storage media to a second memory 11010 (FIGS. 11A-11G), wherein the input features are explicitly labeled from the AME signals 1028 (FIG. 1A). The 2 SSDs 10409 (in FIG. 10C) comprising the third plurality of persistent, electronic storage media have a combined sequential scan rate of approximately 2.0 GBps. This embodiment is designed to iteratively scan approximately 1 TB total into the second memory. 448 GB of AME-labeled input features are scanned to the second memory from the second plurality of persistent, electronic storage media on physical nodes 1-3 10000, 10100 and 10200. The network cables 11002 transmit the AME-labeled input features via the switch 11004 to the second memory on nodes 4 and 5 as illustrated in FIG. 11A; the 2.0 GBps is the transfer bottleneck and the approximate latency for step (9i) is 224 seconds for the 448 GB volume.

Continuing second operations in step (9j), as shown in FIGS. 9G & 9H, this embodiment is designed to label 10 TB of unlabeled input features stored in the second plurality of persistent, electronic storage media 10008, 10108 and 10208. Illustrated in FIGS. 11A-11G, in this embodiment, the input features are scanned to a third memory 11012 comprised of memory modules on physical nodes 1-5. The third memory is comprised of 72 GB each on nodes 1-3 and 36 GB each on nodes 4 and 5; thus, the third memory has a total capacity of 288 GB of registered memory. The 10,240 GB volume collected from the microseisms measured during the three windows is stored in the HDDs of nodes 1-3 requires approximately 35.6 scans into the 288 GB per node until the full 10 TB volume is labeled in whole. The sequential scan rate of 30 HDDs is approximately 1.76 GBps which is the bottleneck in comparison to this embodiment's 40 Gbps bandwidth minimum network cables and switch. The plurality of processors continue second operations and label the training set which is limited to the 56 GB second memory volume of AME-labeled input features on nodes 4 and 5. This has a latency of approximately 1.2 seconds.

Continue labeling in step (9j) by performing a memory sub-transfer 11020 (FIG. 11B) of data in the second memory on Node 5 to Node 4 and Node 4 to Node 5 with an approximate latency of 56 GB/5 GBps=11.2 seconds. Continue CPU operations to label the training set with an approximate latency of 1.2 seconds. The latency for step (9i) and this step is now (224+1.2+11.2+1.2)=238 seconds. The plurality of processors continue second operations and perform memory transfers 11018 on the nodes and continue labeling until all the input features in the third memory have been labeled by all the labels (i.e., AME-labeled input features) in the second memory. A memory transfer for the 112 GB volume is approximately 112 GB/5 GBps=22.4 seconds. The approximate latency for the memory transfers, sub-transfers and subsequent labeling after initialization 11016 (FIGS. 11A & 11B) for one scan of unlabeled input features from the second plurality of persistent, electronic storage media and one scan of labels from the third plurality of persistent, electronic storage media is 3*(22.4+1.2+11.2+1.2)=108 seconds. Labeling continues in step (9j) by scanning new labels (1024−448)/448=1.3 times. Scanning and initializing the new labels into the second memory has an approximate latency of 177. 4 seconds. Continuing labeling with the memory transfers and sub-transfers has an approximate latency of 108 seconds. Multiplying these latencies by 1.3 yields 371.2 seconds. The modified, now labeled input features then overwrite their previous addresses on the second plurality of persistent, electronic storage media; this write latency is approximately 219.4 seconds. The total labeled volume is now 288 GB with a latency of 238+108+371.2 s+219.4=936 seconds. Fully labeling the stage's training set requires performing all of the steps above an additional 34.6 times. Thus, the total label latency for step (9j) is approximately 9 hours and 15 minutes. This embodiment takes significantly longer than the second and first embodiments but requires cheaper hardware and may be suitable in various applications.

Once the training set has been fully labeled, the memory cache may be cleared (9k) with an approximate latency of 7.2 seconds. Training of the machine learning process begins in (9l).

Figure 9I:
Figure 9I:

Shown in FIG. 9I, upon completion of step (9k), the entire training set is labeled and may be trained in step (9l) using predetermined hypotheses models, optimization methodologies and testing protocols that are well-known, tested and publicized in the public domain. Upon training machine learning algorithms from the labeled training set, the machine learning process can be used to map the next stage(s) propped fracture dimensions in real-time from the stage(s) input features, enabling real-time conditional testing and optimization of the propped fracture network and dimensions. Stage spacing, pump volumes, fluid viscosity, proppant density, pump rate and so forth may be tested and their effect on the propped fracture dimensions thereby visualized 2004 (FIG. 9A).

Detailed Description—Fourth Embodiment

Figure 12A:
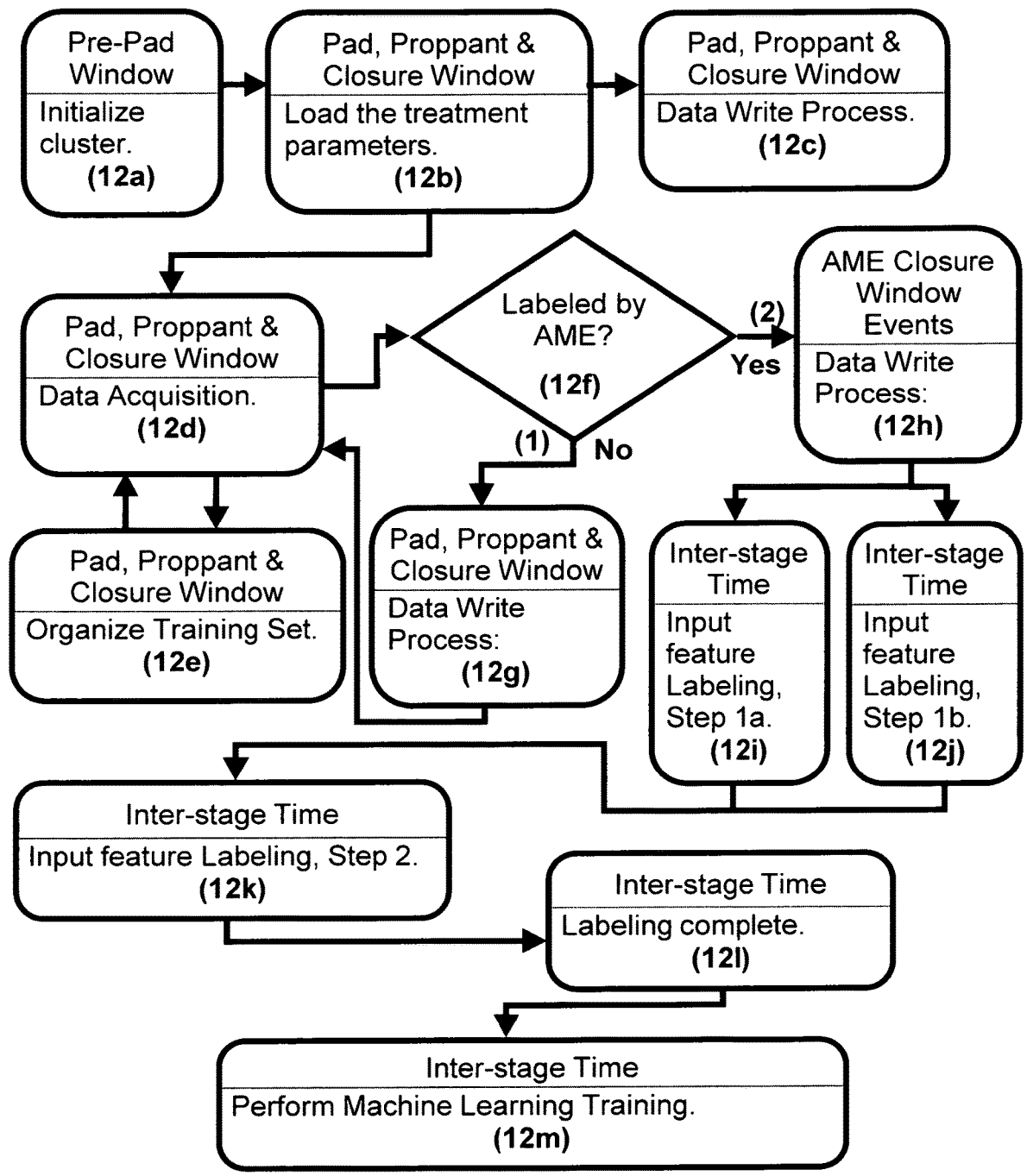
FIGS. 12A-12T illustrate the fourth embodiment's system, method and means with labeling process flowcharts.

FIG. 12A presents a small-scale view of FIGS. 12B-12J. This embodiment includes a system (FIG. 12B) comprised of five physical compute nodes 13000, 13100, 13200, 13300 and 13400, a networking switch and other hardware which have the structure of or closely similar to the following described hardware manufactured by Dell® and other manufacturers. Five Dell R730XD servers are defined as the five physical nodes illustrated in FIGS. 13A-13C.

The first three physical nodes (nodes) are each comprised of a server chassis 13000, 13100 and 13200 with (Quantity 24) 2.5-in drive slots and (Quantity 2) 2.5-in system drive slots. The (Quantity 24) drive slots of nodes 1-3 each contain a Dell, 2.5-in, 1.8 TB, 10K RPM SAS, 12 Gbps 512e 2.5-in Hot-plug Hard Drive. Each of these (Quantity 72) drives have an approximate sequential scan rate of 80 MBps. Nodes 4 and 5 are comprised of a server chassis 13300 and 13400 with (Quantity 12) 3.5-in drive slots and (Quantity 2) 2.5-in system drive slots. Node 4's (Quantity 12) drive slots contain (Quantity 12) Dell, 3.5-in, 8 TB, 7.2K RPM NLSAS 12 Gbps, 512e Hot-plug Hard Drive 13308. Node 5's (Quantity 12) drive slots contain (Quantity 6) Dell, 3.5-in, 8 TB, 7.2K RPM NLSAS 12 Gbps, 512e Hot-plug Hard Drives 13408, and (Quantity 6) Dell, 2.5-in, 480 GB Solid State Drive, SAS Mix Use MLC 12 Gbps Hot-plug Drive, 3.5-in HYB CARR 13409 in its 3.5-in drive slots. The (Quantity 18) drives of nodes 4 and partly 5, (i.e., 13308 and 13408), comprise a first plurality of persistent, electronic storage media. The remaining (Quantity 6) drives in node 5 comprise the third plurality of persistent, electronic storage media 13409. The system drive slots for all five nodes are occupied with (Quantity 2) Dell, 2.5-in, 960 GB Solid State Drive SATA Mix Use MLC 6 Gbps Flex Bay Drive. 13002, 13102, 13202, 13302 and 13402. System configuration files and protocols are stored on these system disks. The second plurality of persistent, electronic storage media is comprised of drives in nodes 1-3, 13008, 13108 and 13208. Also, nodes 1-3 each have (Quantity 2) Intel® Xeon® E5-2699 v4 CPUs 13004, 13104 and 13204 with the following specifications: 2.2 GHz, 30M Cache, 9.60 GT/s QPI, Turbo, HT, 12C/24T (105W) Max Mem 2400 MHz. Nodes 4 and 5 have (Quantity 2) Intel® Xeon® E5-2683 v4 CPUs 13304 and 13404 with the following specifications: 2.1 GHz, 40M Cache, 9.60 GT/s QPI, Turbo, HT, 16C/32T (120W) Max Mem 2400 MHz. The CPUs of Nodes 1-5 13004, 13104, 13204, 13304 and 13404 comprise the plurality of processors. Nodes 1-5 each have 768 GB of registered memory, 13006, 13106, 13206, 13306 and 13406 specifically (Quantity 24) 32 GB RDIMM, 2400 MT/s, Dual Rank, x4 Data Width for each node. Nodes 1-5 registered memory 13006, 13106, 13206 and 13306 total volume is 3,840 GB for the compute cluster.

Each of the five compute nodes have (Quantity 2) Intel XL710 Dual Port 40G, QSFP+, rNDC with SR Optics network cards and (FIG. 14A) are connected by two network cables 14002 per node both having a minimum 40 Gbps or 5 GBps bandwidth. These network cables connect to a computing switch 14004 such as Mellanox SX6012 which has 12 ports, 1.3 Tbps and a link speed of 56 Gbps. As illustrated in FIGS. 14A-14G, the second memory 14010 is comprised of 208 GB on each of the compute nodes to accommodate a maximum of 1040 GB of AME closure labels in the memory. The third memory 14012 is comprised of 368 GB on each of the five compute nodes accommodate a maximum of 1040 GB of unlabeled input features scanned from the second plurality of persistent, electronic storage media 13008, 13108 and 13208. Additionally, this embodiment's registered memory is reserved for the system 14006 and for operations 14008. Moreover, the nodes' operating systems for this embodiment is Red Hat Enterprise Linux but other professional production grade Linux distributions, (e.g. SUSE Enterprise Linux, Ubuntu LTS, etc.) may be substituted. Windows Server operating systems and other production grade alternatives may be used in other embodiments.

Operation of Fourth Embodiment—FIGS. 12A-12T, 13A-13C, and 14A-14G.

Figure 12B:
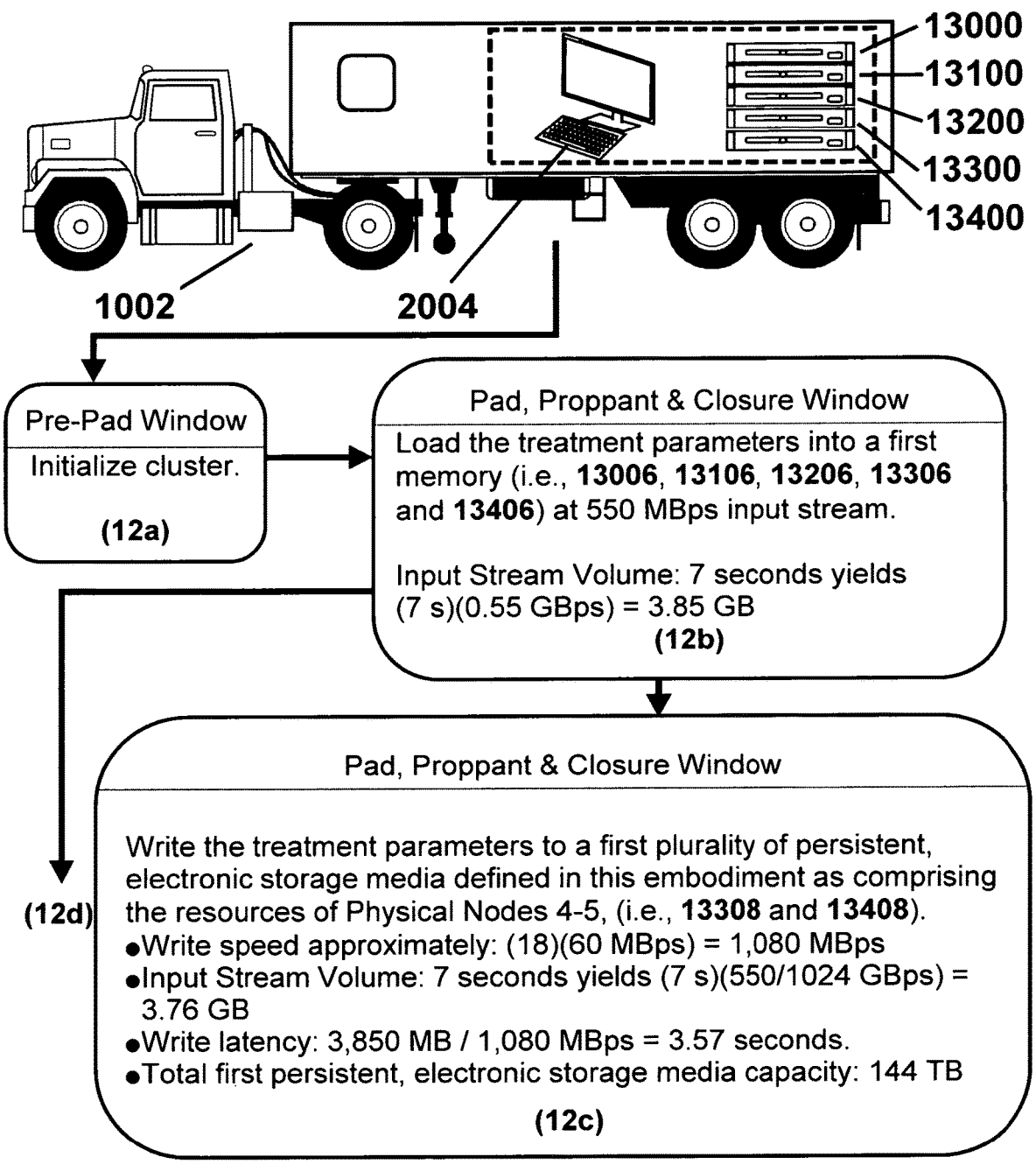
Figure 12C:
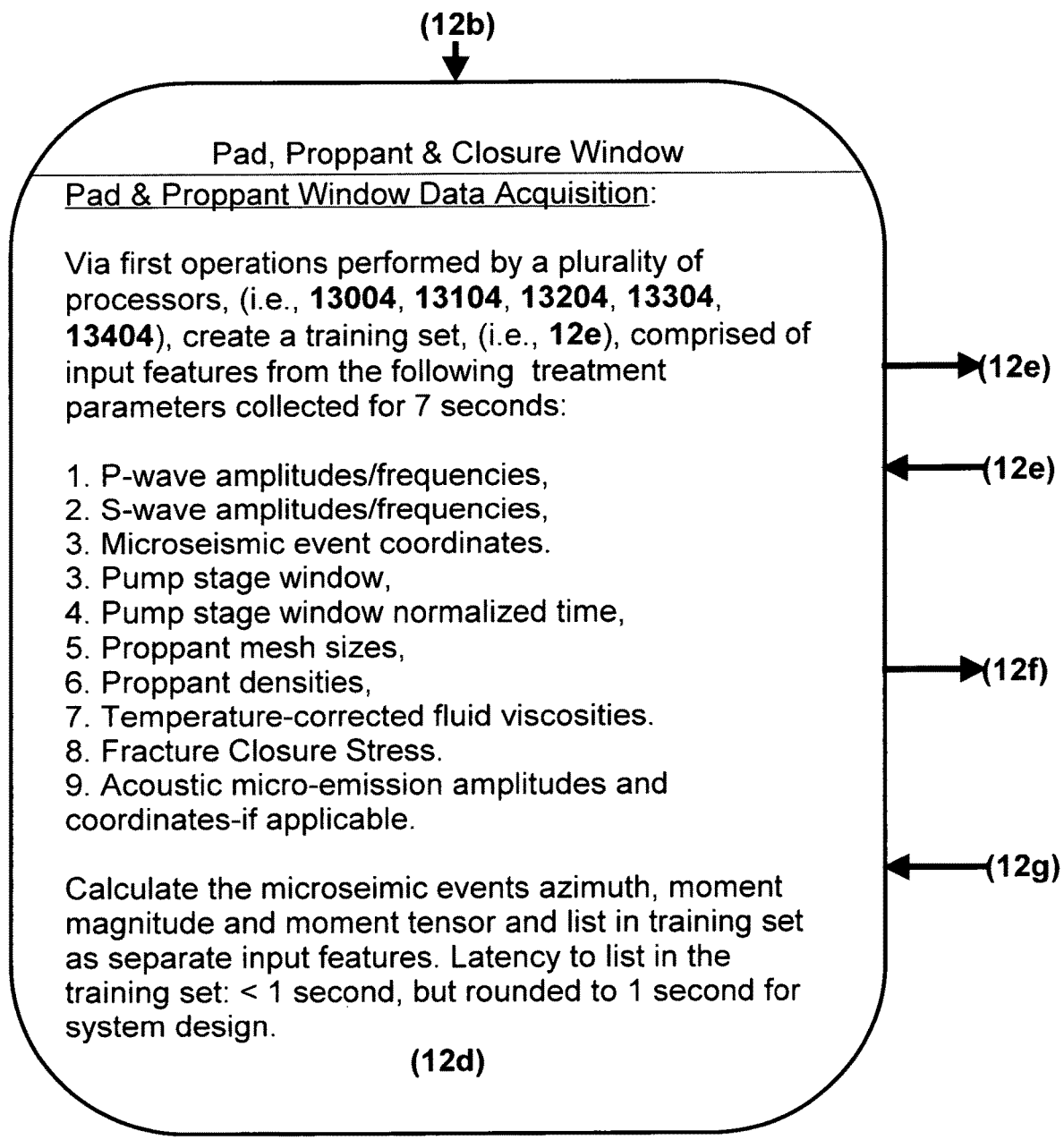
Figure 12D:
Figure 12E:
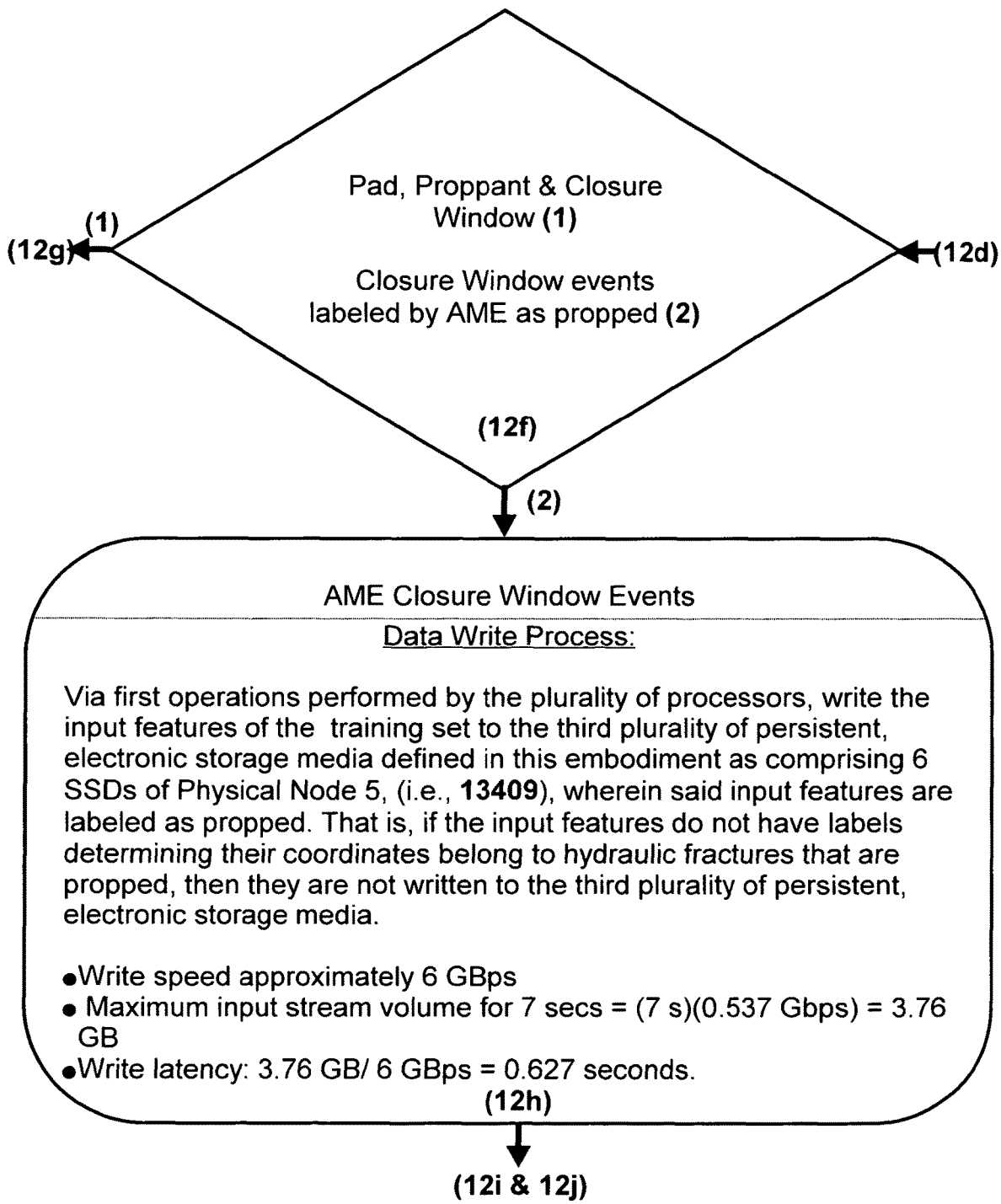
Figure 13A:
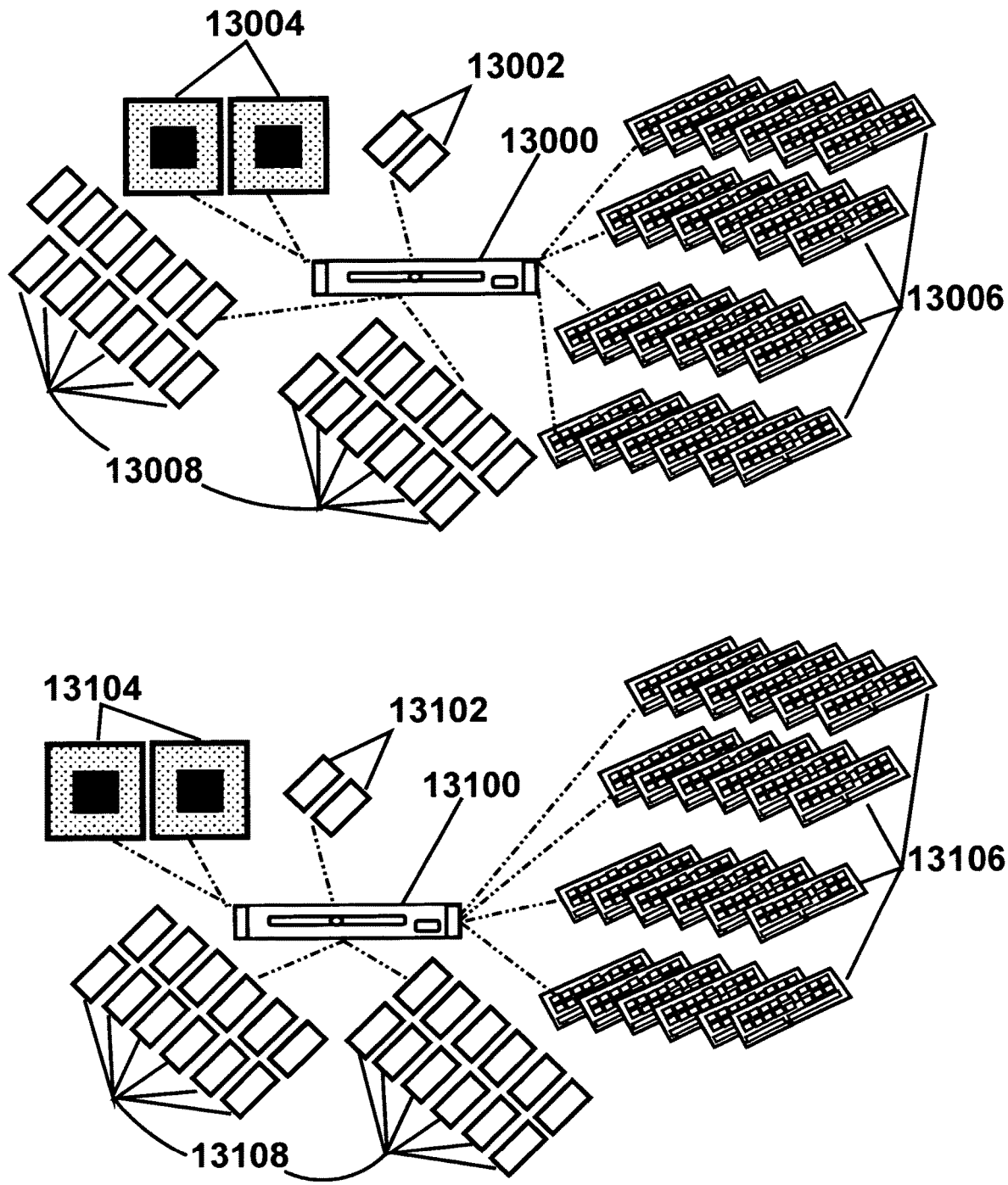
FIGS. 13A-13C illustrate hardware included in the fourth embodiment for each of the physical nodes.
Figure 13B:
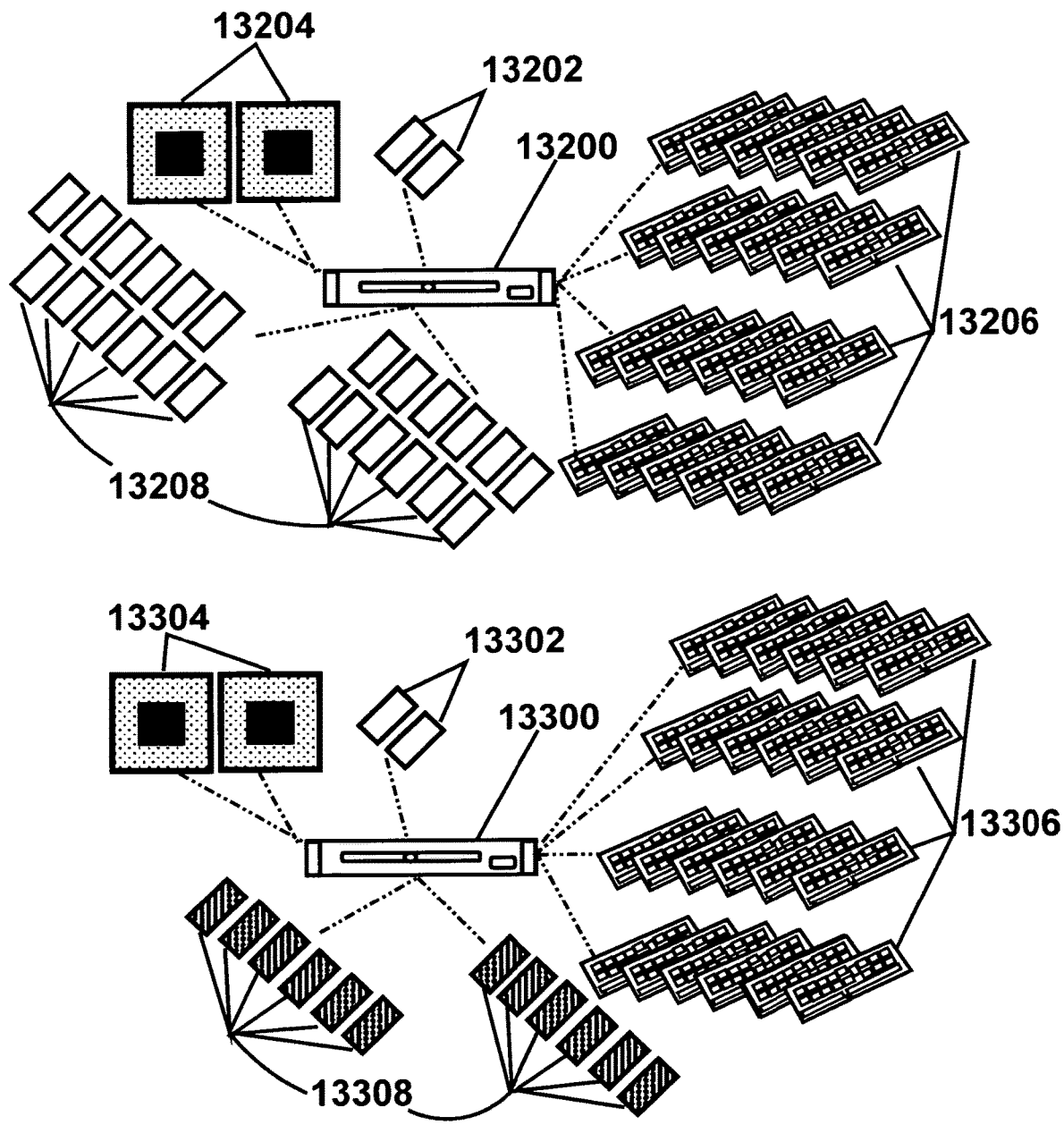
Figure 13C:
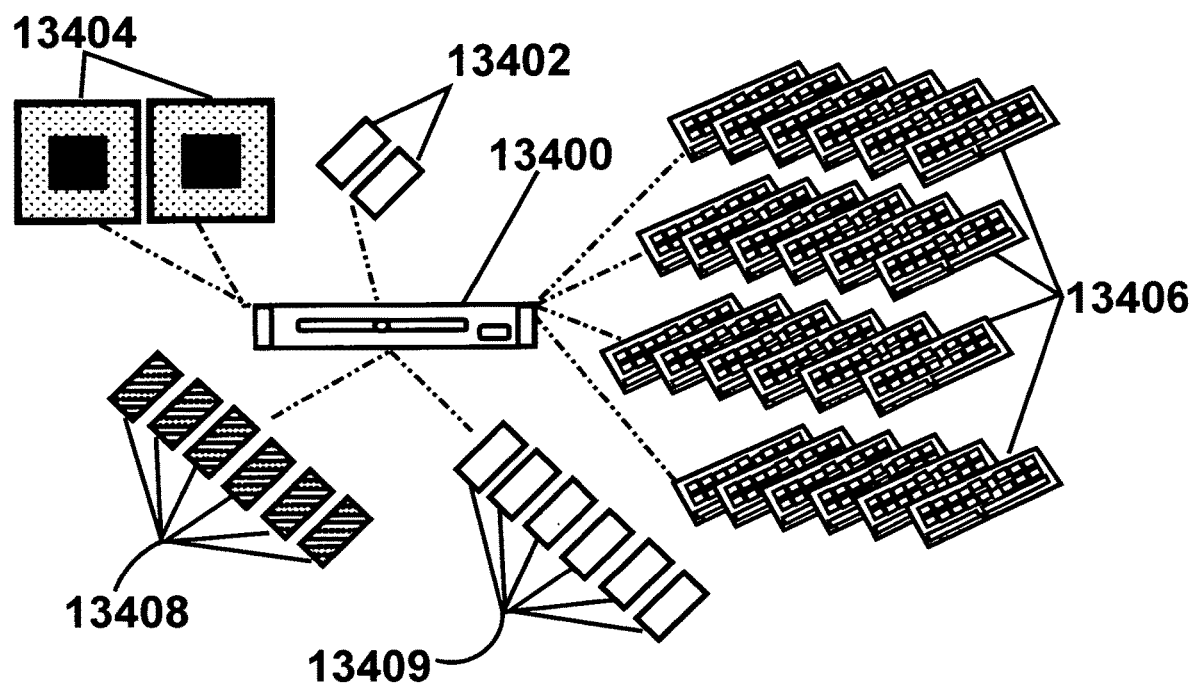

As illustrated in FIG. 12B, the cluster is first initialized (12a) ensuring the computing resources and hardware are sufficient for the job's 1) designed stage data volumes and bandwidth for the pad-, proppant- and closure-window, and 2) the data volume and bandwidth of AME closure labels. The cluster may be designed to have double the volume of data to be collected in the three windows and for the AME closure labels detected in the closure-window. This embodiment is designed for 100 TB data for the total job and a maximum of 1 TB of AME labels. At a predetermined real-time data input, (this embodiment uses 550 MBps), the treatment parameters are acquired and loaded (12b) into the system first memory which has been predetermined from the job data volume and bandwidth, provisioned and initialized in the previous step. The system first memory is comprised of registered memory provisioned from the memory modules which may include (FIGS. 13A-13C) 13006, 13106, 13206 and 13306. This embodiment loads the treatment parameters into the system first memory in 7 second batches before the plurality of processors 13004, 13104, 13204 and 13304 perform any operations or the data is written to disk space. As illustrated in FIGS. 12B-12D & 12K-12O, the treatment parameters are loaded (12b) into the system memory at a predetermined iterative batches, (this embodiment uses 7 seconds). As the treatment parameters are loaded, first operations (12d) performed by the plurality of processors simultaneously create a training set (12e) of input features from the loaded treatment parameters. These first operations (12d) have a latency approximated to one second and are compiled predominantly from C++ and MPI source code into machine code.

Upon the conclusion of step (12b), the raw treatment parameters (12c) are written to a first plurality of persistent, electronic storage media 13308 and 13408 comprised of the 18 hard disk drives with a total approximate write rate of 1,080 MBps which yield an approximate write latency of 3.6 seconds for the 7 second iterative batches. FIGS. 12K-12O show that once step (12b) of sub-processes (12A) and (12B) conclude, step (12b) instantaneously continues in sub-processes (12C) and (12D). Thus, real-time batch processing of the treatment parameters is performed as defined by this schema. Moreover, sub-processes may use 1000 instead of 1024 to convert MBps to GBps and so forth for simplicity.

FIGS. 12B-12D & 12K-12O show that this embodiment calculates the microseismic moment magnitude, microseismic events azimuth and moment tensor of the microseisms (12d). The training set input features and labels of this embodiment share the same definitions, classification protocols and calculation procedures as the first embodiment's operation.

FIGS. 12B-12D & 12K-12O also illustrate that the training set (12e) created in step (12d) by first operations by the plurality of processors are written (12g) from the first memory to a second plurality of persistent, electronic storage media 13008, 13108 and 13208. The second plurality of persistent, electronic storage media has an approximate write rate of 6,120 MBps determined from an approximate write rate of 85 MBps per HDD; thus, step (12g)'s write latency for 3,850 MB is approximately 1 second when conservatively rounded. This write process is repeated until AME closure-window events are detected (12f). As illustrated in FIGS. 12E & 12P-12T, upon detecting AME closure-window events, the now labeled input features from the training set are written (12h) to a third plurality of persistent, electronic storage media 13409 of 6 SSDs. The write latency for a volume of 3,850 MB is approximately 0.63 seconds but this embodiment conservatively designs for 1 seconds.

Figure 12F:
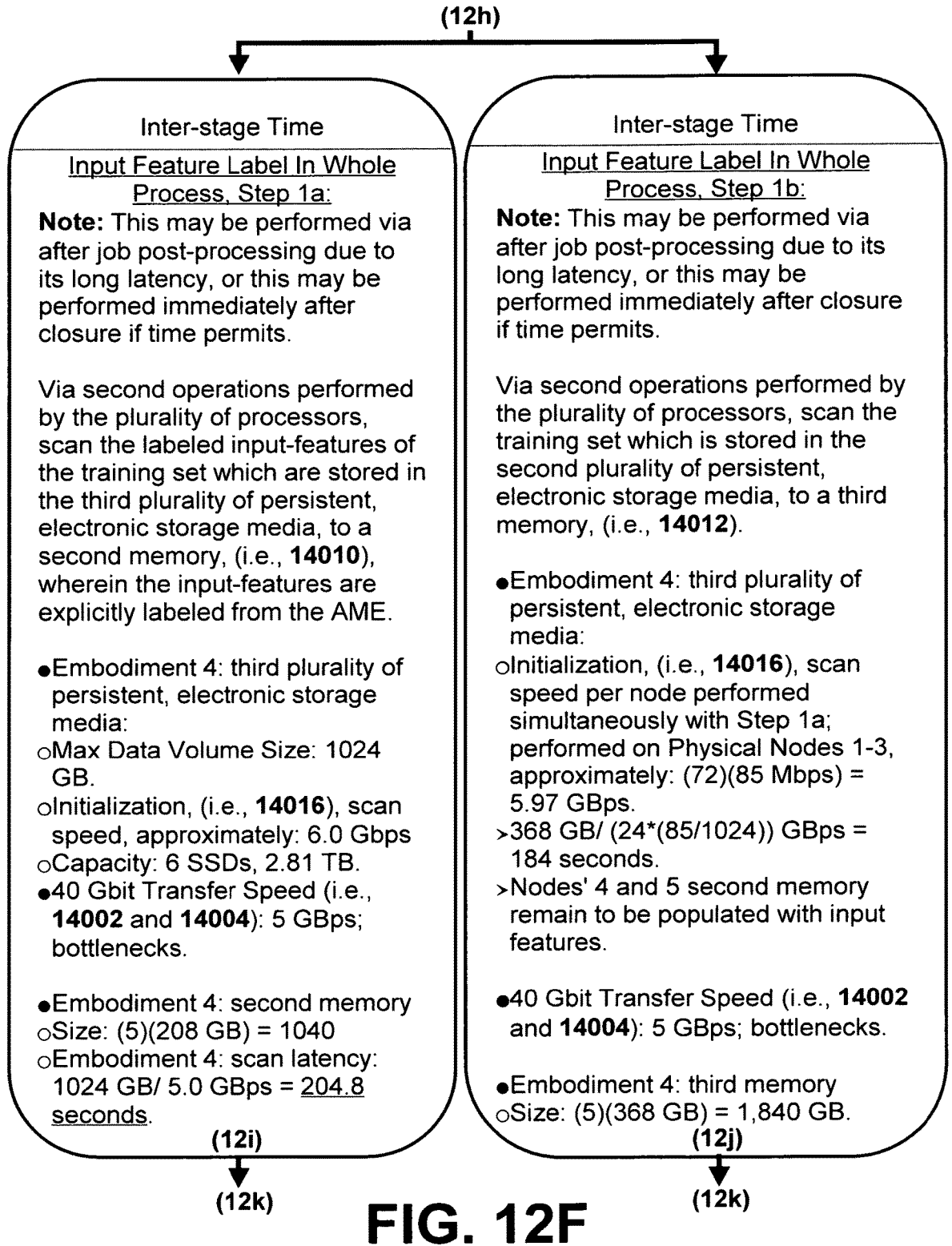
Figure 12G:
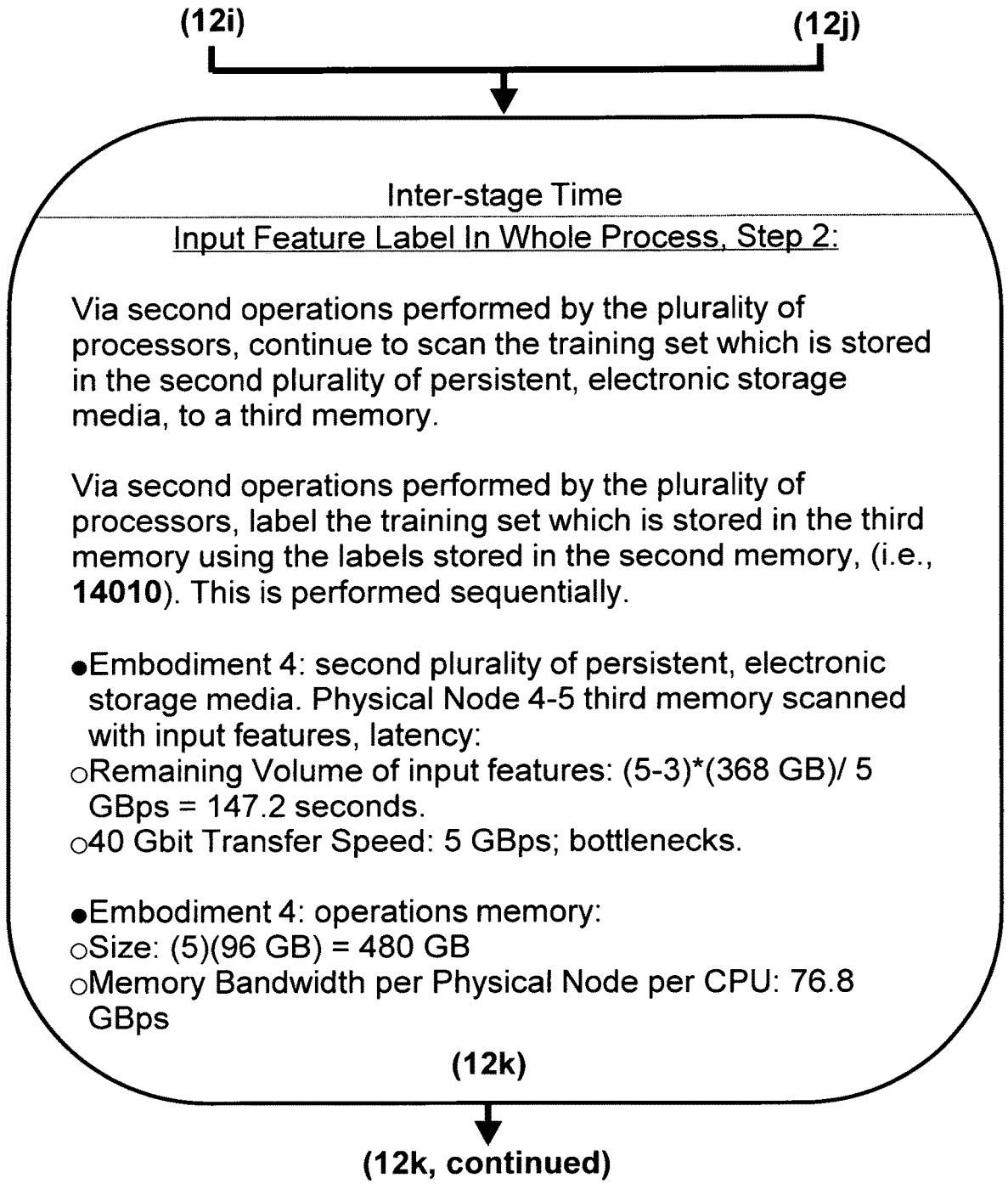
Figure 12L:
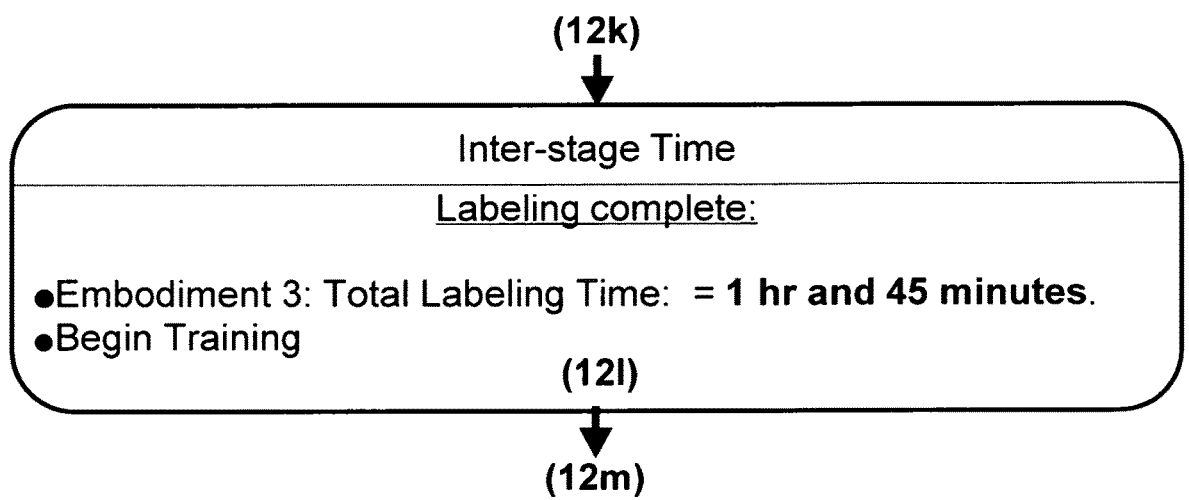
Figure 12K:
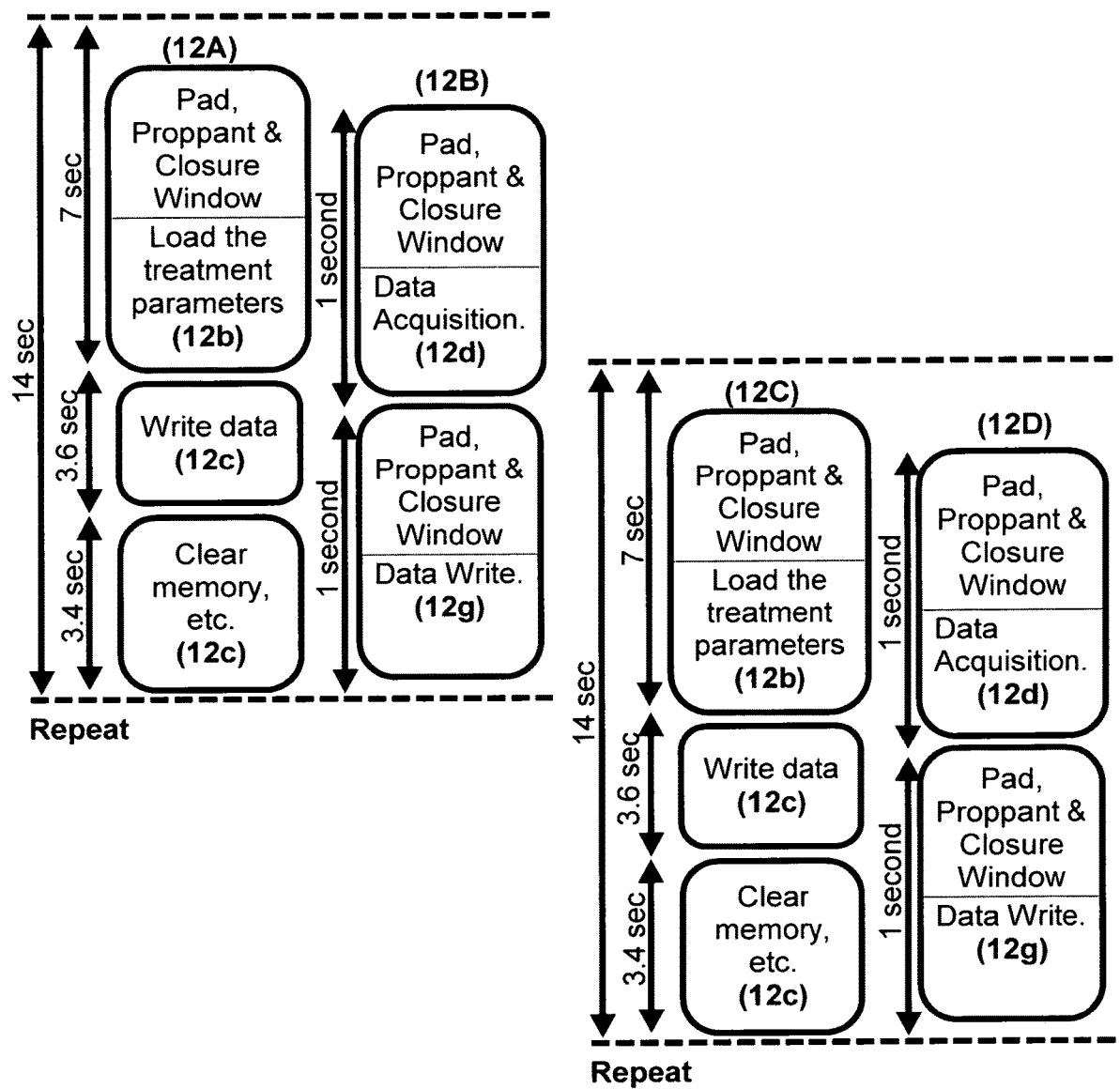
Figure 12L:
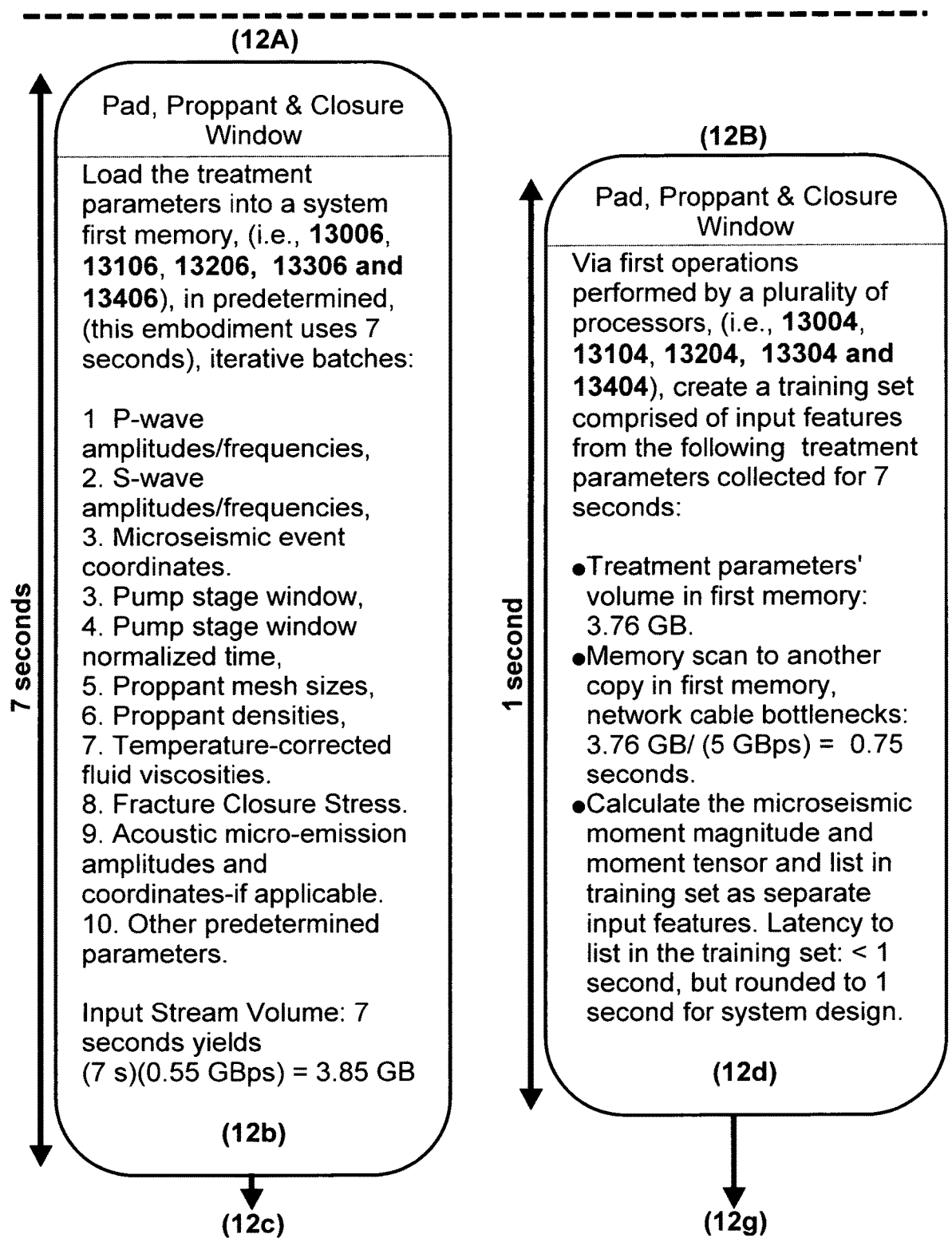
Figure 12M:
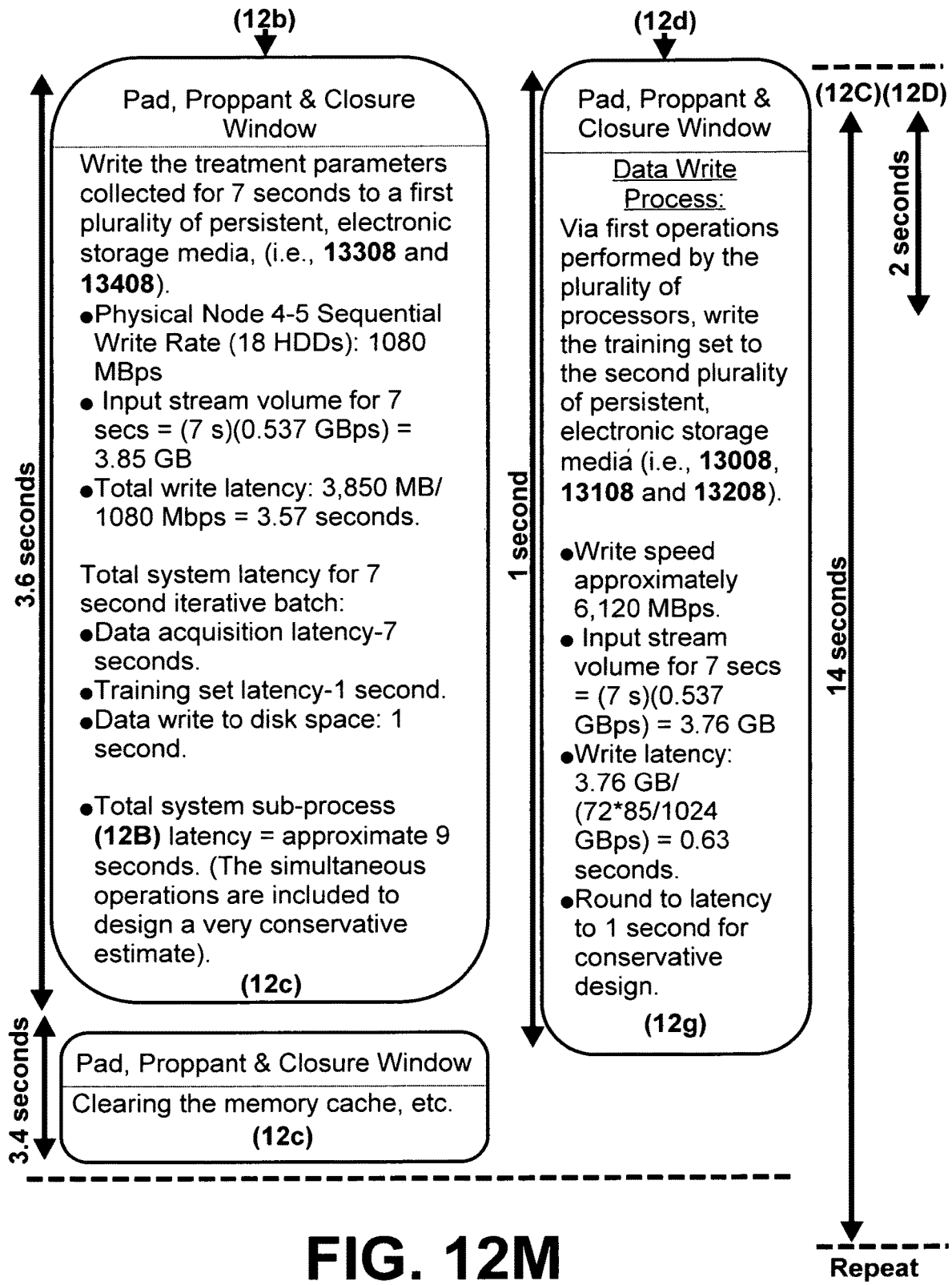
Figure 12N:
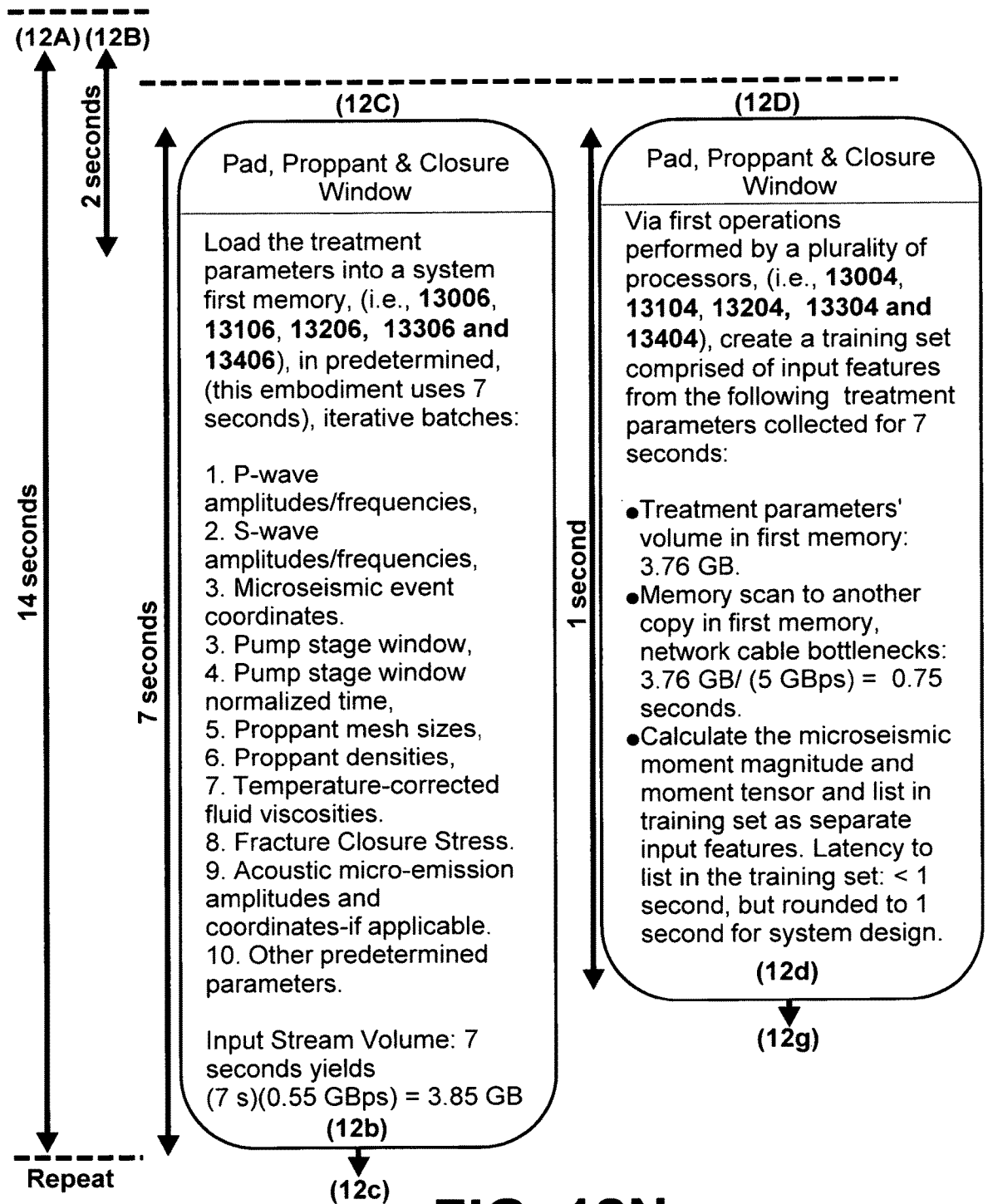
Figure 12O:
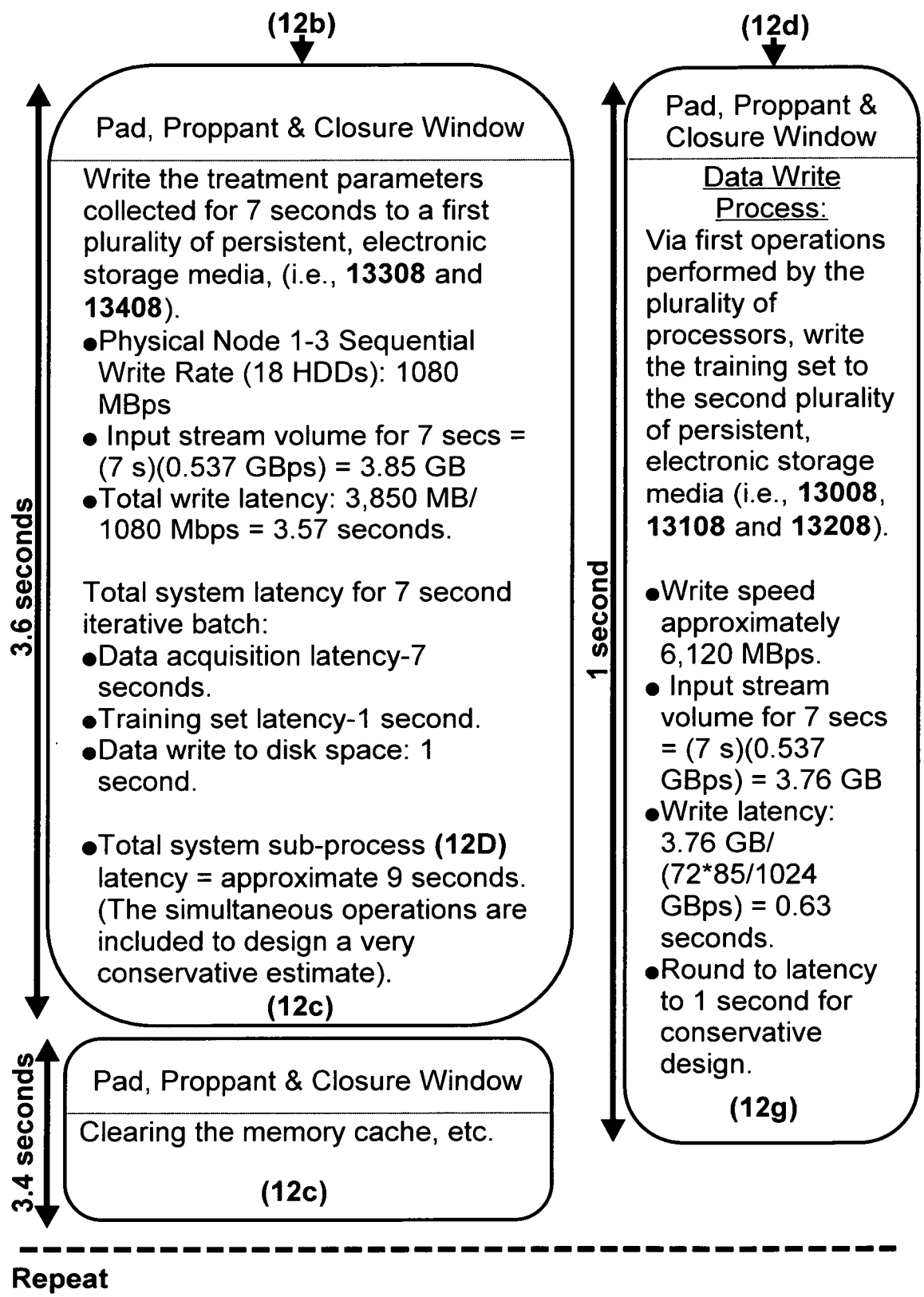
Figure 12P:
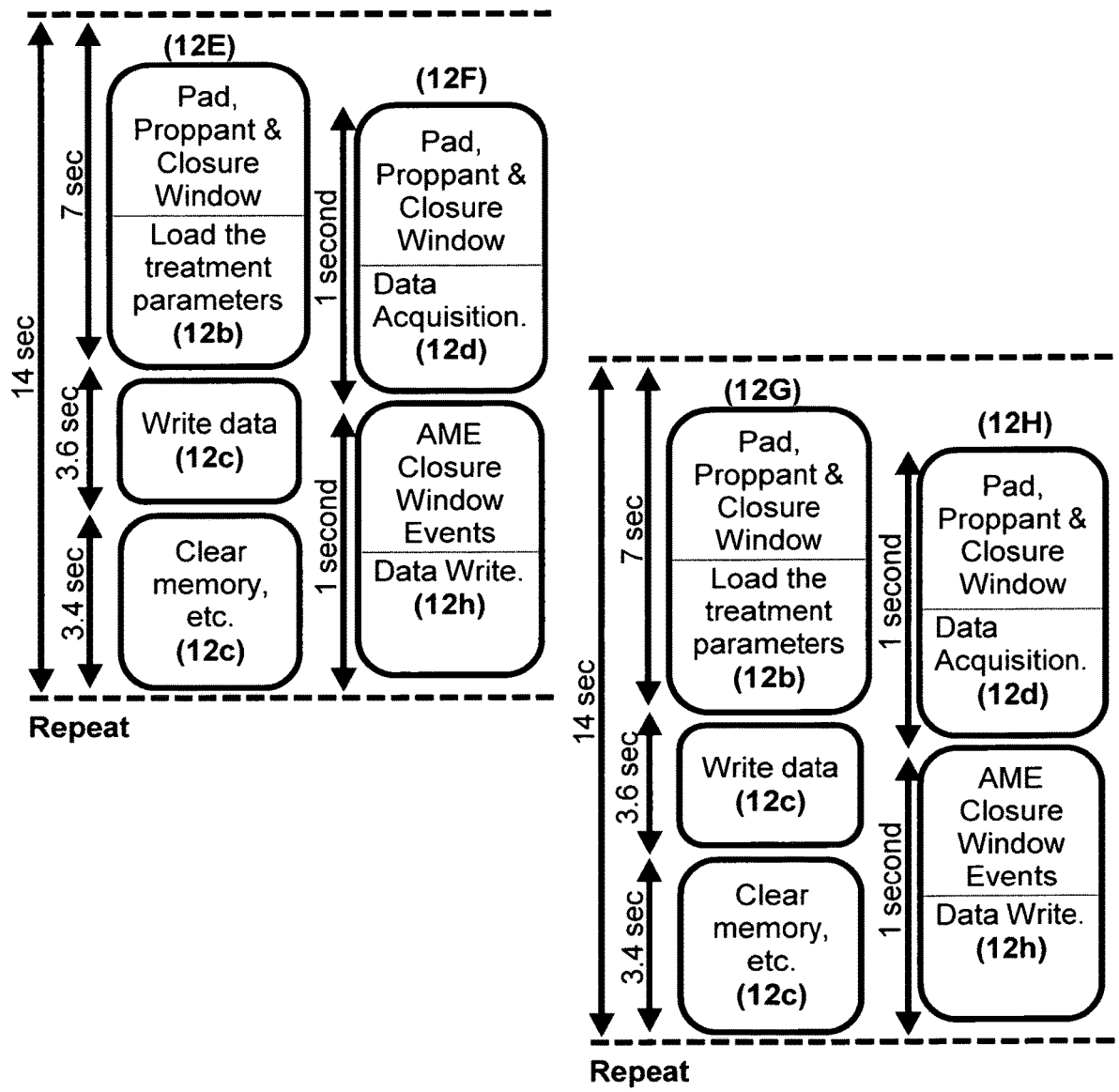
Figure 12Q:
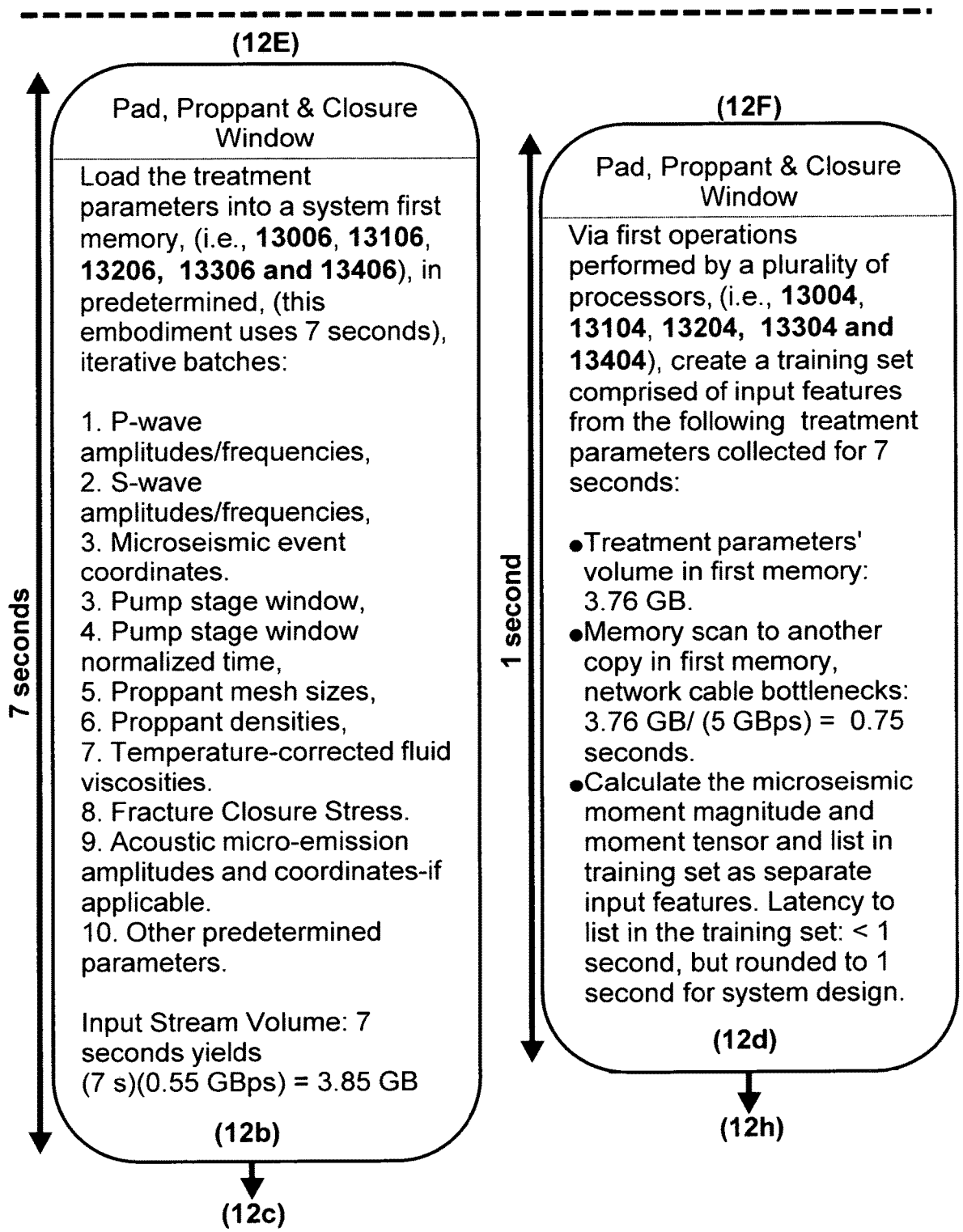
Figure 12R:
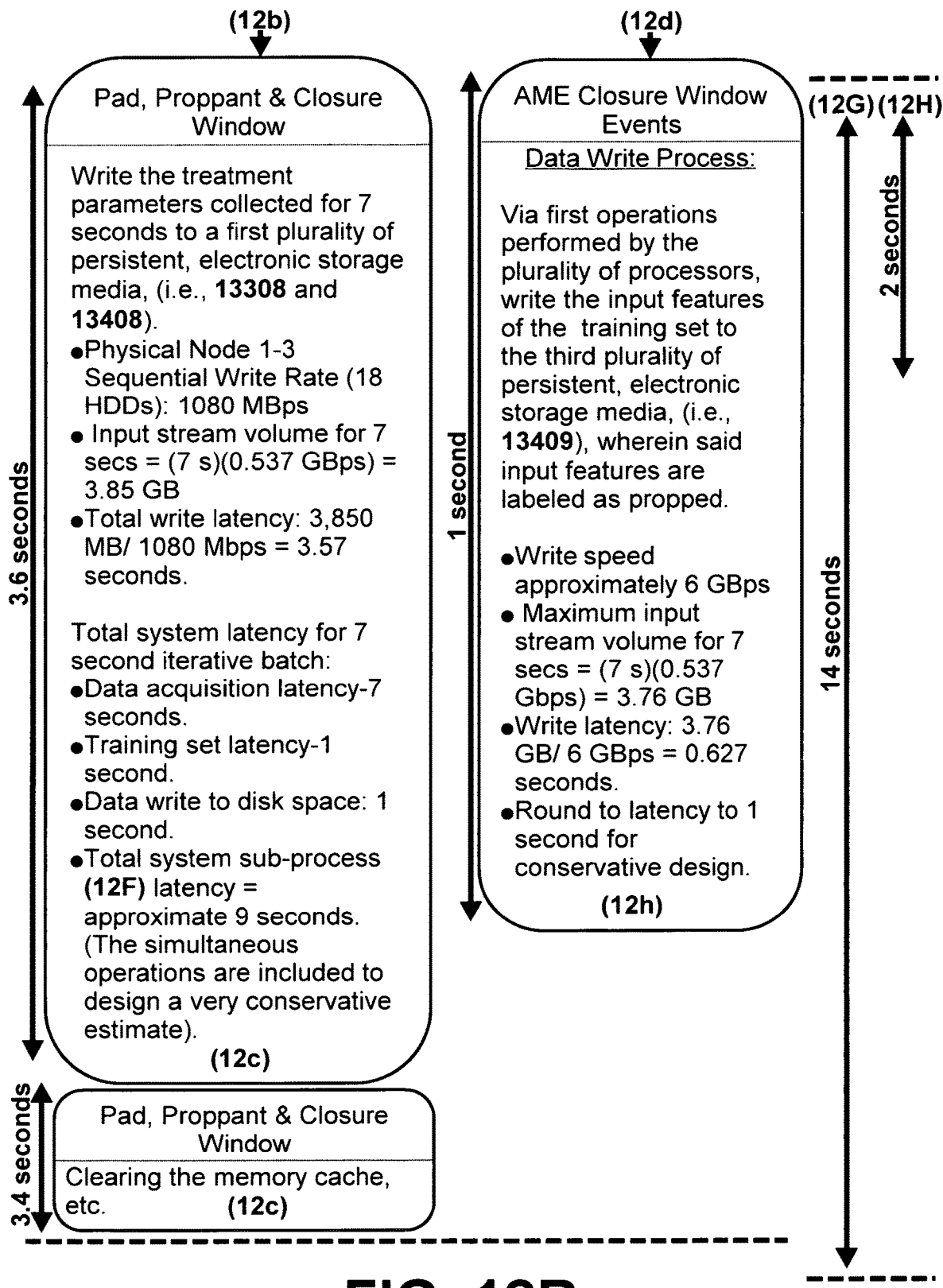
Figure 12S:
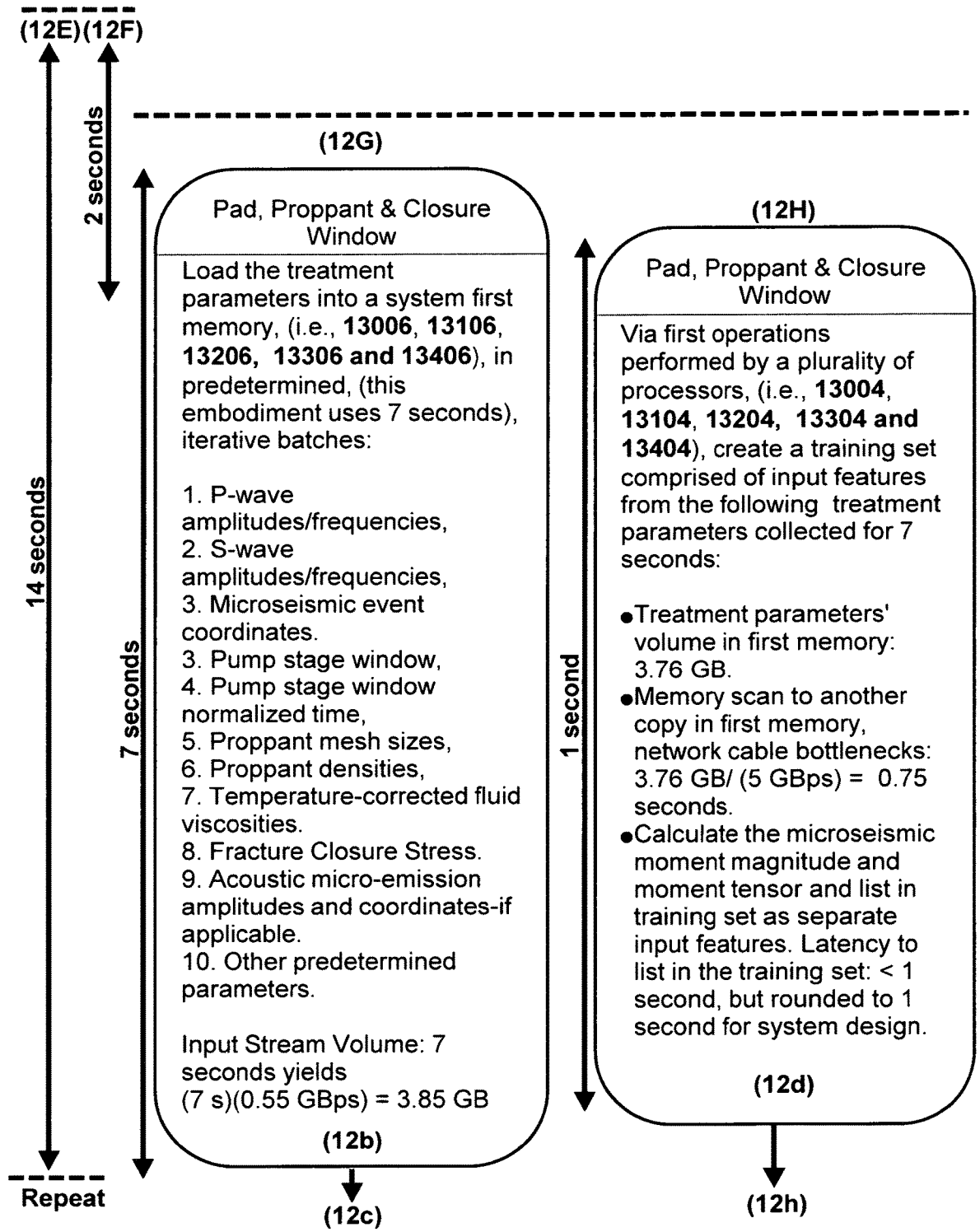
Figure 12T:
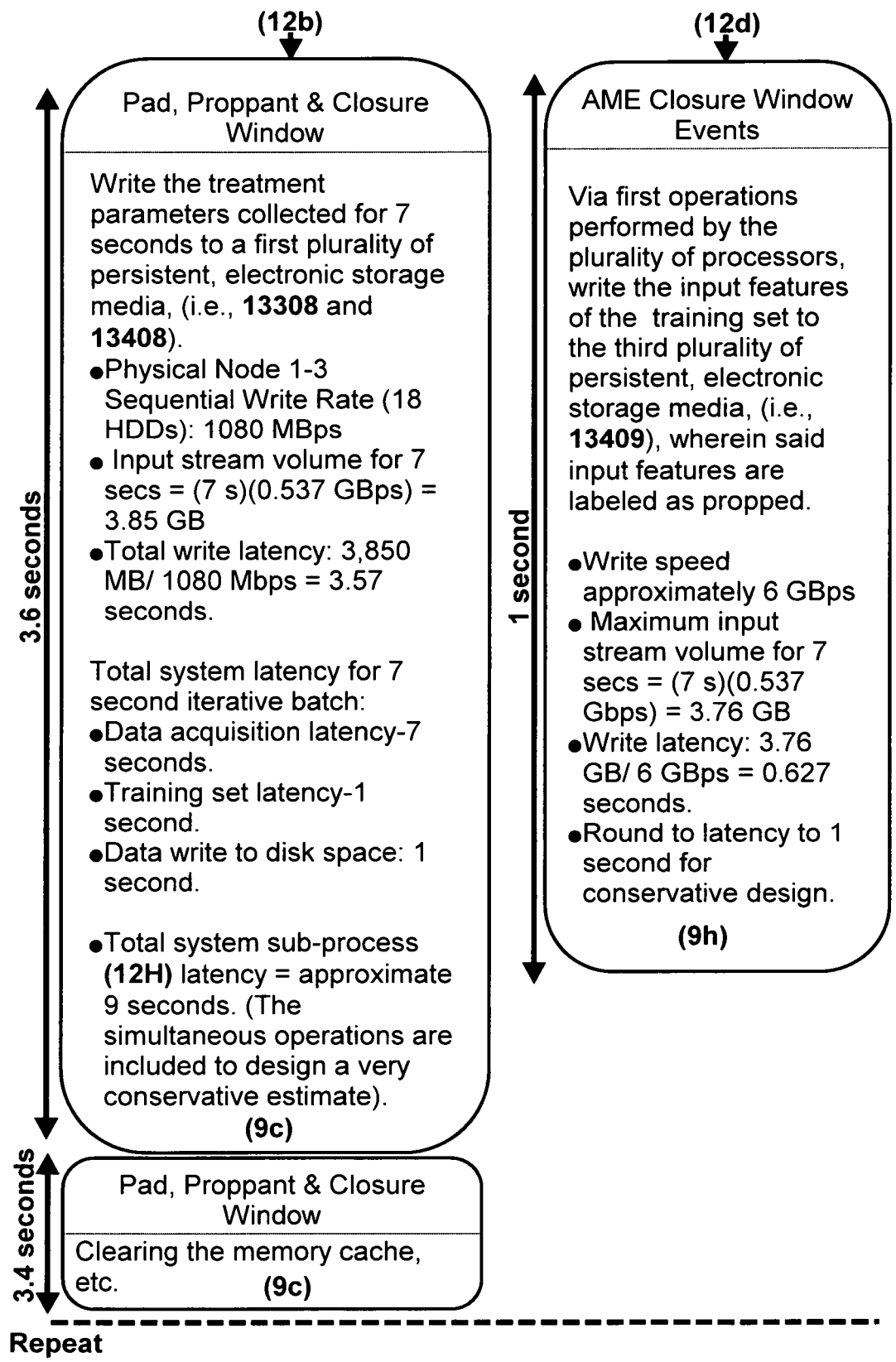
Figure 14A:
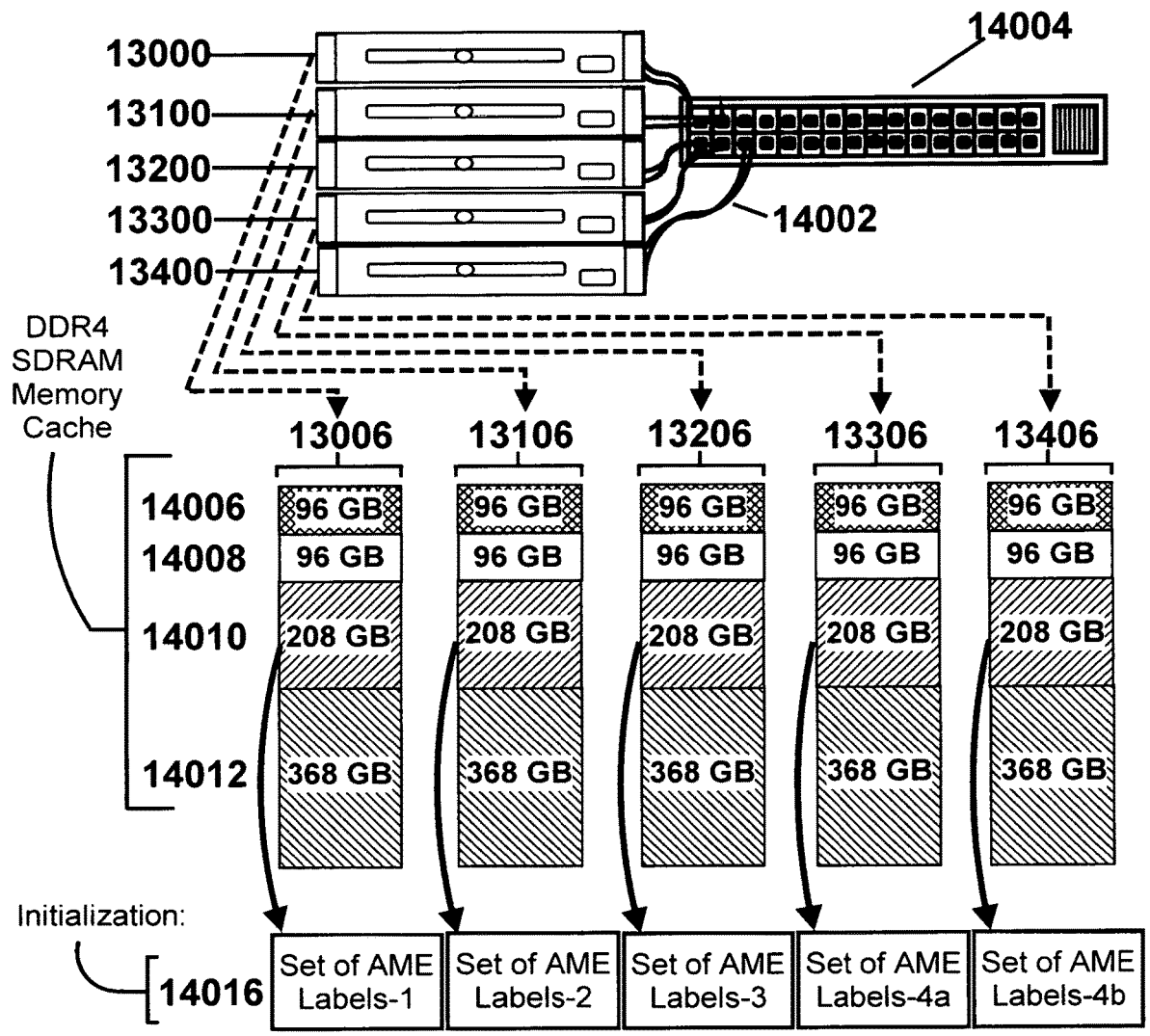
Figure 14B:
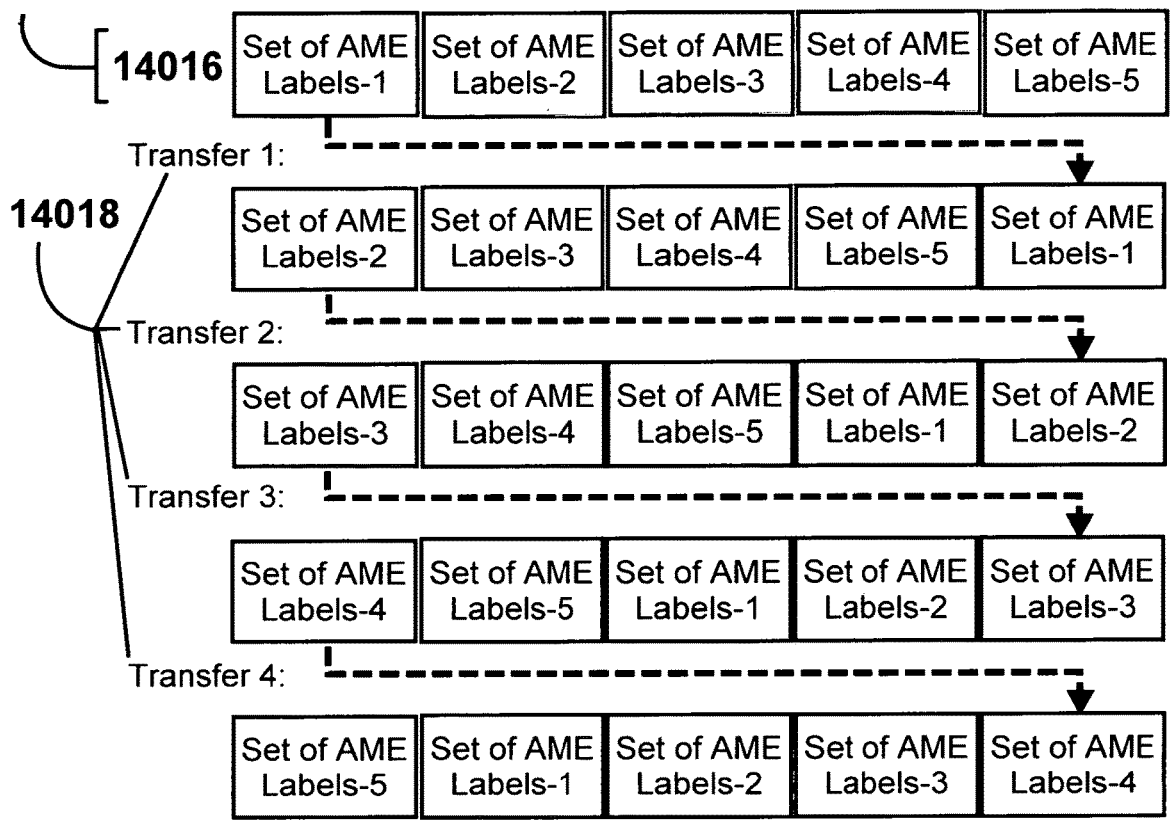

In interstage time, shown in FIG. 12F, second operations performed by the plurality of processors perform both steps (12l) and (12j) simultaneously. The labels (i.e., AME-labeled input features from AME signals 1026) stored in third plurality of persistent, electronic storage media are scanned to a second memory 14010, (FIGS. 14A-14G). The 1024 GB volume of labels are stored on 6 SSDs 13409 with a combined sequential scan rate of approximately 6.0 GBps. However, the network cable transfer rate is the bottleneck as labels are scanned to the second memory stored on nodes 4 and 5 as well. Thus, (12l) the labeled input features set stored in the third plurality of electronic storage media are scanned to the second memory 14010 at an approximate rate of 5 GBps. The network cables 14002 transmit the AME-labeled input features via the switch 14004 to the second memory on nodes 4 and 5 as illustrated in FIGS. 14A-14B; the initialization 14016 latency of (12l) is approximated as 205 seconds.

Simultaneous second operations in step (12j), as shown in FIG. 12F of this embodiment, label 10 TB of unlabeled input features stored in the second plurality of persistent, electronic storage media 13008, 13108 and 13208. Illustrated in FIGS. 14A-14G, in this embodiment, the input features are scanned to a third memory 14012 comprised of memory modules on physical nodes 1-3 (nodes 4 and 5 are scanned to in step (12k)). The third memory is comprised of 368 GB each on nodes 1-5; thus, the third memory has a total capacity of 1,840 GB of registered memory. Physical nodes 1-3's third memory are initialized 14016 in step (12j) simultaneously with (12l) 368 GB/(24*(85/1024)) GBps=184 seconds.

Continuing second operations (12k) after the completion of steps (12l) and (12j), continue to scan the training set which is stored in the second plurality of persistent, electronic storage media, to a third memory. And, continue label the training set which is stored in the third memory using the labels stored in the second memory, (i.e. 14010 (FIGS. 14A-14G)). Scan input features on the second plurality of persistent, electronic storage media to the third memory of nodes 4 and 5. The scan latency is approximately 147.2 seconds. The plurality of processors then continue second operations of labeling the training set with an approximate latency of 9.6 seconds. Illustrated in FIGS. 14A-14B, a memory transfer 14018 of the labels in the second memory is performed on the nodes with an approximate latency of 208 GB/5 GBps=41.6 seconds. Therefore, completing all four transfers: 4*(9.58+41.6) seconds=205 seconds.

The write latency (12k) of a cycle of 1,840 GB of input features from the training set is approximated as 231 seconds, wherein the labeled features of the training set overwrite their unlabeled originals. The third memory can be cleared in approximately 2.4 seconds, enabling new input features from the second plurality of persistent, electronic storage media to be read into the third memory. Repeating the sub-steps of step (12k) yields the total label latency calculated as 5.47*(147.2+9.58+41.6+204.7+231+2.4+147.2+154+1.6)+205+939 seconds=5.47*939.3+205+939 seconds=6,282 seconds=1 hour and 45 minutes. At step (12l) the total labeling time is approximately 1 hour and 45 minutes.

Once the training set has been fully labeled, the memory cache may be cleared with an approximate latency of 3.75 seconds. Training of the machine learning process begins in (12m).

Shown in FIG. 12J, upon completion of step (12l), the entire training set is labeled and may be trained in step (12m) using predetermined hypotheses models, optimization methodologies and testing protocols that are well-known, tested and publicized in the public domain. Upon training machine learning algorithms from the labeled training set, the machine learning process can be used to map the next stage(s) propped fracture dimensions in real-time from the stage(s) input features, enabling real-time conditional testing and optimization of the propped fracture network and dimensions. Stage spacing, pump volumes, fluid viscosity, proppant density, pump rate and so forth may be tested and their effect on the propped fracture dimensions thereby visualized 2004 (FIG. 12B).

CONCLUSION, RAMIFICATIONS & SCOPE

The steps and forms this new art may have but are not limited to these four embodiments. The first embodiment has a total approximate latency of 32 minutes for a 100 TB training set and 1 TB of labels, which is sufficient in many applications to enable labeling, training and mapping of the propped fracture dimensions in 24-hour per day, back-to-back stage completions. The second embodiment is the most expensive embodiment of the four but has an approximate labeling latency of nine minutes for a 100 TB training set and 2 TB of labels. This is an extremely low latency. The third embodiment uses the cheapest hardware of the embodiments but consequently has more steps and has a very long training latency of approximately 9 hours and 15 minutes. Thus, this embodiment is not considered appropriate for labeling, training and mapping of the propped fracture dimensions in 24-hour per day, back-to-back stage completions; however, if the labeling and training may be performed overnight, this embodiment is an option to enable real-time mapping of the propped fracture dimensions. The fourth embodiment has a labeling latency of 1 hour and 45 minutes.

The first plurality of persistent, electronic storage media is not imperative to conduct the training process but is very useful to collect the raw treatment parameters for post-processing testing of new training protocols if so desired.

Moreover, the said training set's input features which are explicitly labeled as propped may or may not be written to a third plurality of persistent, electronic storage media, wherein the explicit label is defined as propped from the acoustic-micro-emitters. The presence of a third plurality of electronic storage media is optional, as embodiment two substantiates. A third plurality of electronic storage media is used if there is not sufficient memory for that stage's labels.

Moreover, hardware provided by various manufactures such as HP, Lenovo, CISCO and so forth may be substituted for other embodiments provided that it can meet performance requirements similar to those hardware exhibited here in these embodiments. Moreover, various parts may be substituted, for LDIMM may be used instead of RDIMM especially for large memory usage.

Also, while these embodiments emphasize performing the processes of this new art via a mobile compute cluster in truck or van, this new art covers the labeling solution after transmitting the data to an offsite compute cluster through fiber optic or copper transmission lines, wireless towers or other telecommunication protocols. That is, this new art is not limited to how the data is transmitted to the compute cluster, provided that data transmission technologies do interfere with the expediency of the new art's labeling solution. Moreover, this new art covers post-processing data to aggregate a training set to be deployed on nearby wells and/or wells with similar enough geology, reservoir and fluid properties, so that the labeling solution with the acoustic micro-emitters may be implemented; the fourth embodiment's system could rationally be used for such an application.

Also, this new art inherently covers data acquisition process(es) necessary to create a training set to implement unsupervised learning methods to map the propped hydraulic fracture dimensions; however, supervised learning methods are much more valuable and are therefore emphasized due to the proppant-form-factor direct diagnostic component.

What is claimed is:

1. A hydraulic fracture labeling system for classifying predetermined input features as corresponding to propped or unpropped fracture dimensions from data acquired from hydraulic fracturing operations, the system comprising:
    (a) a first memory which is configured to store said data streaming in real time as input at predetermined bandwidths and predetermined retention time intervals;
    (b) a plurality of processors which are configured to:
        1) perform first operations to create a training set comprised of said input features labeled in part wherein said labeled input features define the propped fracture dimensions from the presence of proppant-form-factor acoustic micro emissions in said data; and
        2) perform second operations to label in whole said input features of said training set;
    (c) a plurality of persistent, electronic storage media which are configured to 1) store said training set, created from said plurality of processors, and 2) store said training set, modified from said second operations and thereby overwriting said training set's input features which were previously only labeled in part;
    (d) a second memory which is configured to store said training set's input features which are explicitly labeled as propped from the acoustic-micro-emitters, wherein said explicitly labeled input features 1) are scanned from said plurality of persistent, electronic storage media and 2) are stored at predetermined bandwidths and predetermined retention time intervals; and
    (e) a third memory which is configured to store said training set, modified from said second operations, wherein said training set is stored at predetermined bandwidths and predetermined retention time intervals; whereby a predetermined machine learning process trains from said training set, wherein said training set is labeled in whole, to determine and map subsequent treatment stages' propped and unpropped fracture dimensions in real time as measured.

2. The hydraulic fracture labeling system of claim 1 further including an additional plurality of persistent, electronic storage media which are able to store said data independent of the created training set.

3. The hydraulic fracture labeling system of claim 1 further including an additional plurality of persistent, electronic storage media which are able to store said training set's input features which are explicitly labeled as propped from the acoustic micro emitters.

4. The hydraulic fracture labeling system of claim 1 further including an audio-visual display which is able to display 1) a real-time representation of the wellbore and a map of acoustic events correlated to hydraulic fracturing induced deformation, wherein said hydraulic fracturing induced deformation is classified as propped or unpropped as determined from said first and second operations of said plurality of processors.

5. A method of labeling predetermined input-features from data acquired from a hydraulic fracturing stage so that a predetermined machine learning process is trained to determine the propped and unpropped fracture dimensions as measured, the method comprising:
  (a) storing said data in a first memory wherein said data is streaming in real-time as input at predetermined bandwidths and predetermined retention time intervals;
  (b) performing first operations via a plurality of processors and thereby creating a training set comprised of said input-features labeled in part wherein said input-features' labels classify hydraulic fracturing-induced deformation as propped or unpropped from acoustic micro-emissions;
  (c) storing, in a second memory, said training set, wherein said training set is sequentially stored at predetermined bandwidths and predetermined retention time intervals;
  (d) writing said training set to a plurality of persistent, electronic storage media, via operations performed by said plurality of processors;
  (e) performing second operations via said plurality of processors and thereby labeling in whole the said input features of the said training set;
  (f) storing, in a second memory, said training set's input features which are explicitly labeled as propped from the acoustic-micro-emitters, wherein said explicitly labeled input features are stored in the second memory at predetermined bandwidths and predetermined retention time intervals;
  (g) storing, in a third memory, said training set modified from said second operations, wherein said training set is sequentially stored at predetermined bandwidths and predetermined retention time intervals;
  (h) storing, in said plurality of persistent, electronic storage media, said training set's input-features modified from said second operations and thereby overwriting said training set's input features which were previously only labeled in part;
whereby a predetermined machine learning process trains from said training set, wherein the training set is labeled in whole, to determine and map subsequent treatment stages' propped and unpropped fracture dimensions in real time as measured.

6. The method of claim 5, further displaying a real time representation of the wellbore and a map of acoustic events correlated to hydraulic fracturing induced deformation, wherein said hydraulic fracturing induced deformation is classified as propped or unpropped as determined from said first and second operations of said plurality of processors performed first operations.

7. The method of claim 5, further displaying in real time said propped and unpropped fracture dimensions as measured and determined by said machine learning process performed by subsequent operations for each stage via said plurality of processors, wherein said machine learning process is trained by said training set.

* * * * *